United States Patent
Long et al.

(10) Patent No.: US 11,287,366 B2
(45) Date of Patent: Mar. 29, 2022

(54) SCANNING MICROWAVE ELLIPSOMETER AND PERFORMING SCANNING MICROWAVE ELLIPSOMETRY

(71) Applicant: Government of the United States of America, as represented by the Secretary of Commerce, Gaithersburg, MD (US)

(72) Inventors: Christian John Long, Westminster, CO (US); Nathan Daniel Orloff, Louisville, CO (US); Nina Popovic Basta, Boulder, CO (US); Edward Joseph Garboczi, Arvada, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 139 days.

(21) Appl. No.: 16/864,466

(22) Filed: May 1, 2020

(65) Prior Publication Data
US 2020/0348224 A1    Nov. 5, 2020

Related U.S. Application Data

(60) Provisional application No. 62/841,612, filed on May 1, 2019.

(51) Int. Cl.
*G01N 21/21*     (2006.01)
*G01N 22/02*     (2006.01)

(52) U.S. Cl.
CPC .......... *G01N 21/211* (2013.01); *G01N 22/02* (2013.01)

(58) Field of Classification Search
CPC ..................................................... G01N 21/211
(Continued)

(56) References Cited

U.S. PATENT DOCUMENTS 5,886,534 A    3/1999   Bakhtiari et al.
7,453,562 B1 *  11/2008  Kaack ............... G01N 21/33
                                                356/237.2
(Continued)

FOREIGN PATENT DOCUMENTS

WO    WO-2008006825 A1 *  1/2008  ............... G01V 3/12

OTHER PUBLICATIONS

Yurgartis, S.W., "Measurement of Small Angle Misalignments in Continuous Fiber Composites", Composites Science and Technology, 1987, p. 279-293, vol. 30.
Anwer, A., et al., "Multi-functional flexible carbon fiver composites with controlled fiber alignment using additive manufacturing", Additive Manufacturing, 2018, p. 360-367, vol. 22.
Li, Z., et al., "Principles and Applications of Microwave Testing for Woven and Non-Woven Carbon Fibre-Reinforced Polymer Composites: a Topical Review", 2018, p. 965-982, vol. 25.
(Continued)

*Primary Examiner* — Tarifur R Chowdhury
*Assistant Examiner* — Omar H Nixon
(74) *Attorney, Agent, or Firm* — Office of Chief Counsel for National Institute of Standards and Technology

(57) ABSTRACT

A scanning microwave ellipsometer includes: a microwave ellipsometry test head including: a polarization controller; a transmission line; and a sensor that produces sensor microwave radiation, subjects a sample to the sensor microwave radiation, receives a sample reflected microwave radiation from the sample that results from subjecting the sample with the sample reflected microwave radiation, and produces a sensor-received microwave radiation from the sample reflected microwave radiation, wherein a polarization of the sensor microwave radiation is controlled by the polarization controller; an electrical signal measurement system that produces an electrical readout signal such that a magnitude of reflection coefficient Γ and an angle of reflection coefficient Γ of the sample reflected microwave radiation is (Continued)

determined from the electrical readout signal; and a position controller that adjusts a relative position of the sensor and the sample.

19 Claims, 53 Drawing Sheets

(58) Field of Classification Search
USPC .......................................................... 356/364
See application file for complete search history.

(56) References Cited

U.S. PATENT DOCUMENTS

| 8,771,443 | B2 | 7/2014 | Clemen, Jr. | |
|---|---|---|---|---|
| 10,099,465 | B2 | 10/2018 | Clemen, Jr. | |
| 2003/0015493 | A1* | 1/2003 | Grasshoff | H01L 21/67253 216/59 |
| 2014/0125978 | A1* | 5/2014 | Feiler | G01N 21/8422 356/369 |
| 2015/0292866 | A1* | 10/2015 | Sasaki | G01B 11/0641 356/369 |
| 2016/0146722 | A1* | 5/2016 | Koerner | G01B 9/02091 356/301 |
| 2020/0401040 | A1* | 12/2020 | Khusnatdinov | H01L 21/0271 |

OTHER PUBLICATIONS

Heuer, H., et al., "Review on quality assurance along the CFRP value chain—Non-destructive testing of fabrics, preforms and CFRP by HF radio wave techniques" Composites Part B, 2015, p. 494-501, vol. 77.

Bardl, G., et al., "Automated detection of yarn orientation in 3D-draped carbon fiber fabrics and preforms form eddy current data", Composites Part B, 2016, p. 312-324, vol. 96.

Gambou, F., et al., "Characterization of Material Anisotropy Using Microwave Ellipsometry", Microwave and Optical Technology Letters, 2011, p. 1996-1998, vol. 53 No. 9.

Sagnard, F., et al., In Situ Measurments of the Complex Permittivity of Materials Using Reflection Ellipsometry in the Microwave Band: Theory (Parl I), IEEE Transactions on Instrumentation and Measurement, 2005, p. 1266-1273, vol. 54 No. 3.

Sagnard, F., et al., In Situ Measurments of the Complex Permittivity of Materials Using Reflection Ellipsometry in the Microwave Band: Theory (Parl II), IEEE Transactions on Instrumentation and Measurement, 2005, p. 1274-1282, vol. 54 No. 3.

Schultz, J.W., et al., "A Comparison of Material Measurement Accuracy of RF Spot Probes to a Lens-Based Focused Beam System", Proc. 2014 AMTA Symp, 2014, 2014, p. 421-427.

Compass Technology Group, "SP218 CTG", https://compasstech.com/core-technologies/, accessed Apr. 23, 2019.

* cited by examiner

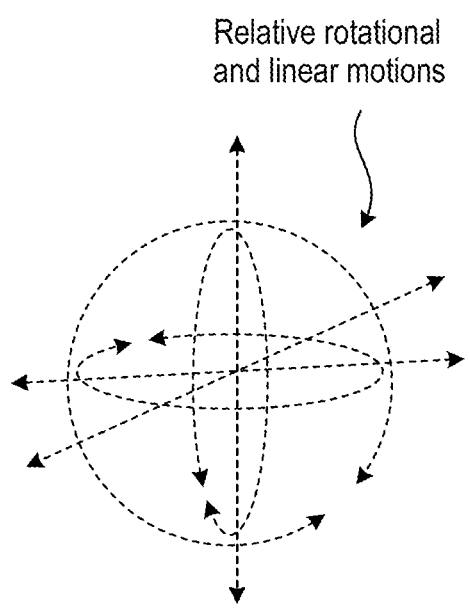
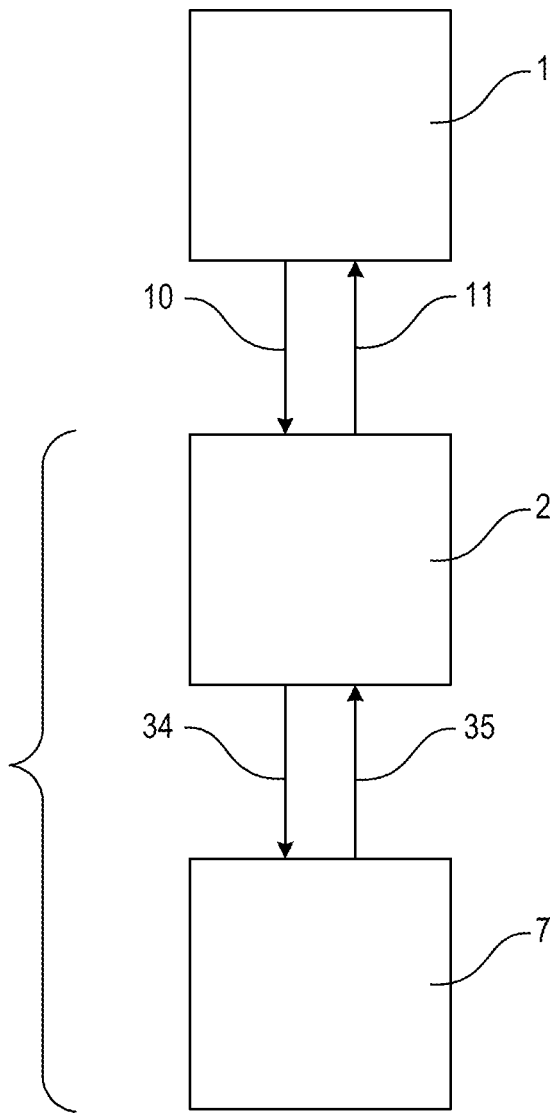
FIG. 1

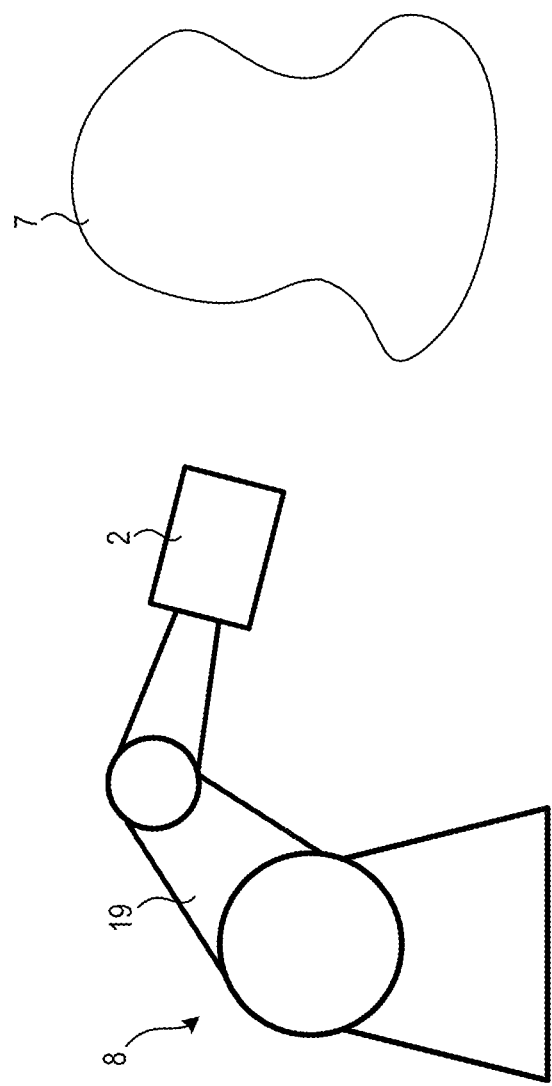
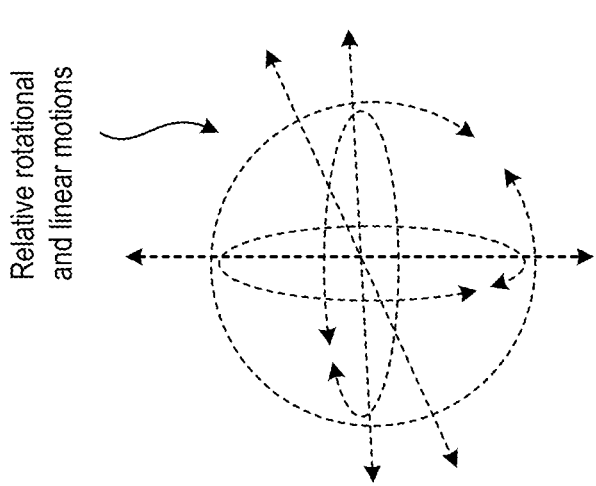
FIG. 15

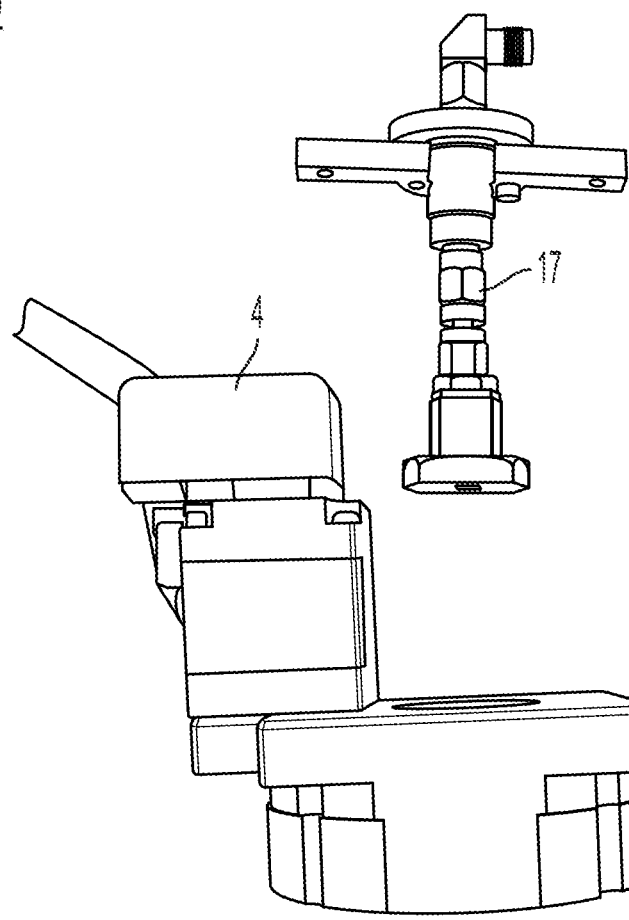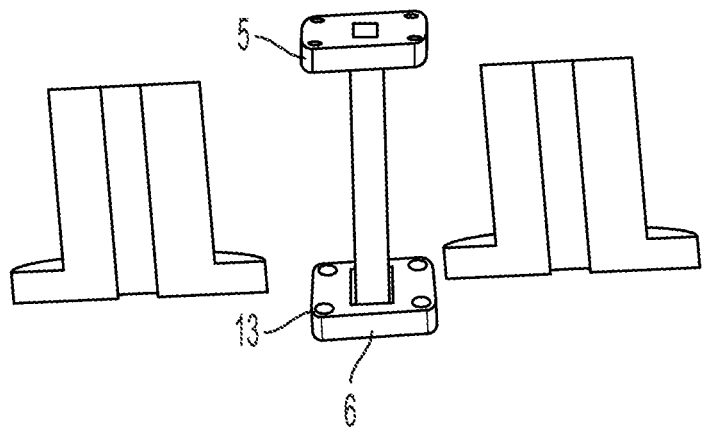
FIG. 18

| Wafer number | Measured MoSi$_2$ thickness (nm) | MoSi$_2$ sheet resistance ($\Omega$/?) | Measured Au layer thickness (nm) |
|---|---|---|---|
| Wafer #1 | (185.1 ± 5.2) | (43.9 ± 1.8) | (226.5 ± 5.2) |
| Wafer #2 | (79.7 ± 4.5) | (87.0 ± 4.5) | (231.0 ± 7.2) |
| Wafer #3 | (45.0 ± 3.8) | (172.7 ± 4.7) | (279.0 ± 8.6) |
| Wafer #4 | (20.6 ± 1.7) | (340.4 ± 11.8) | (228.3 ± 3.7) |

FIG. 27

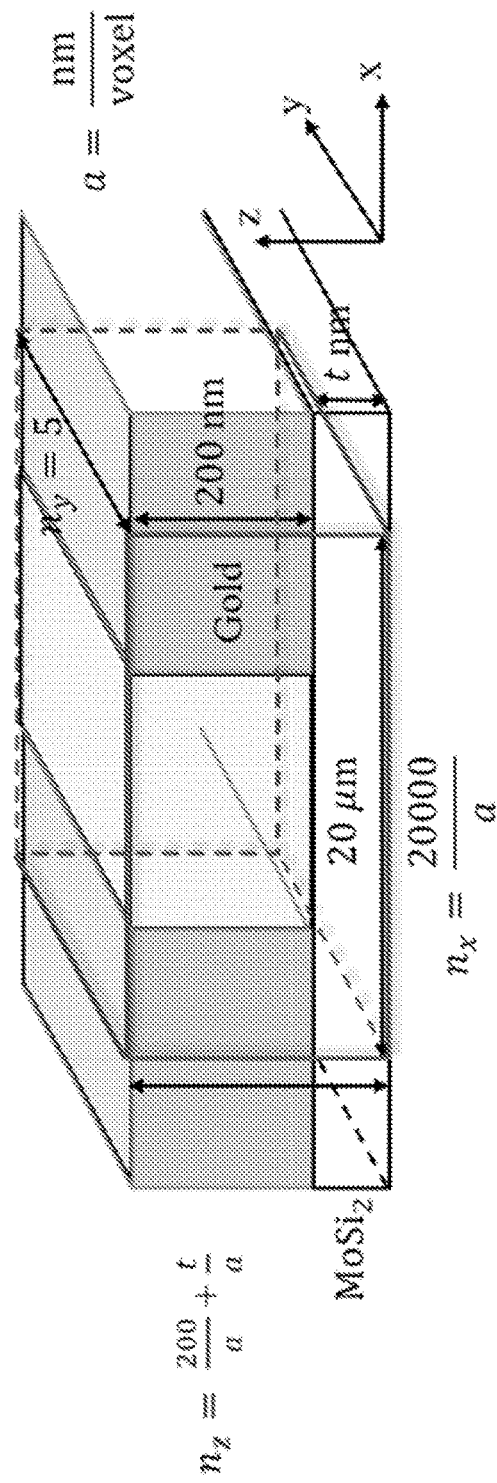
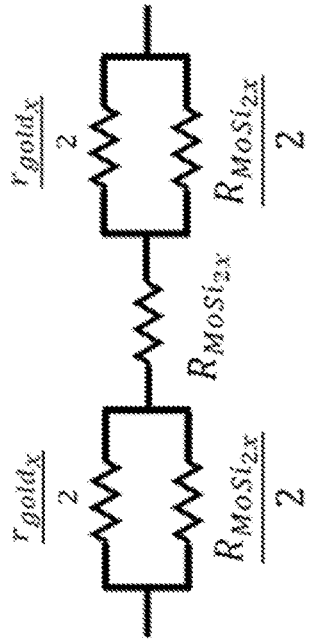
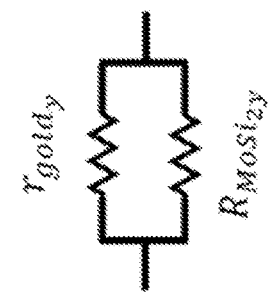
FIG. 28

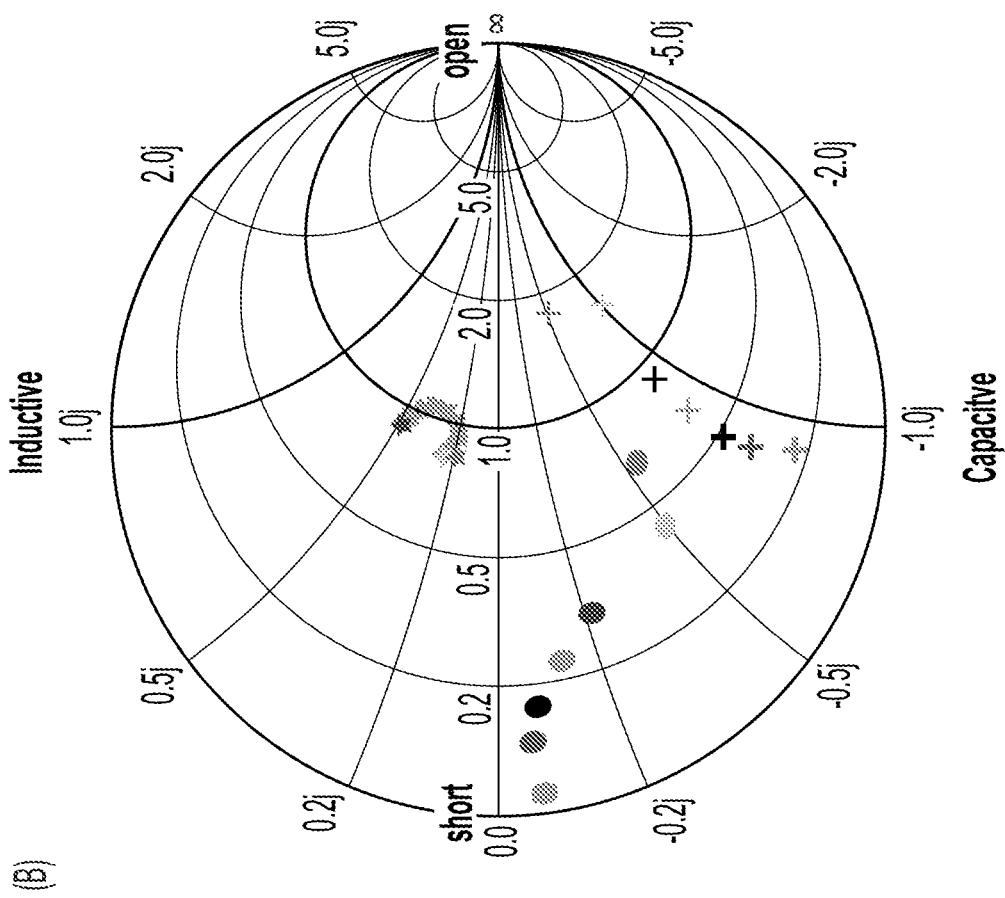
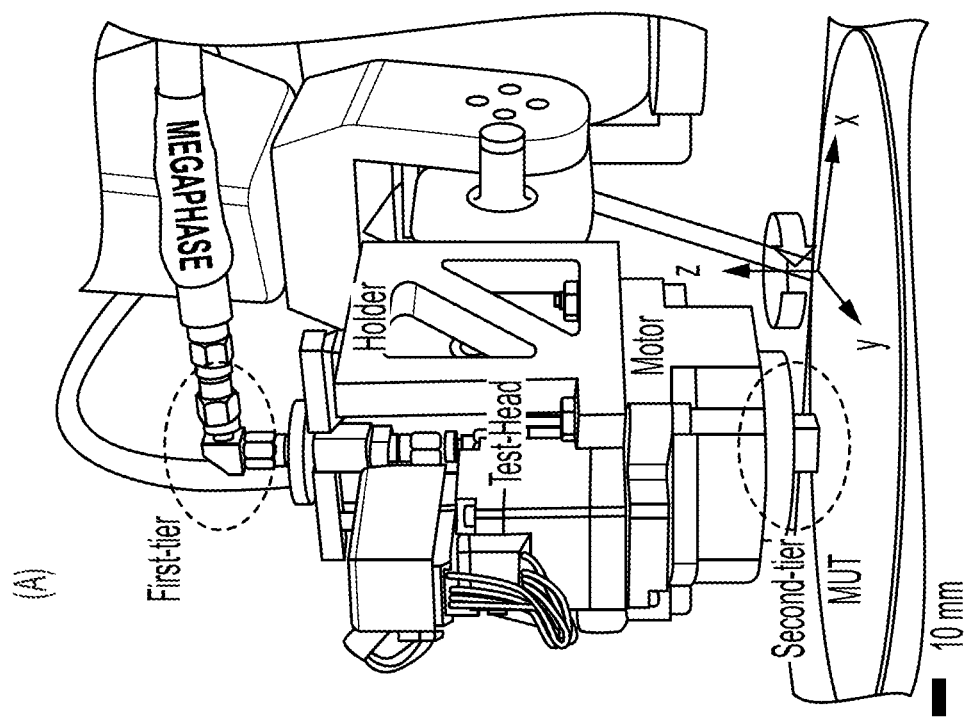
FIG. 30

| Sample | Circuit Model | | | DC Simulation | | | Mapping Function |
|---|---|---|---|---|---|---|---|
| | $R_{sx}$ ($\Omega/\square$) | $R_{sy}$ ($\Omega/\square$) | | $R_{sx}$ ($\Omega/\square$) | $R_{sy}$ ($\Omega/\square$) | | $R_{sx}$ ($\Omega/\square$) |
| Bare Au stripes | $\infty$ | 0.25 | | $\infty$ | 0.25 | | 1337.32 ± 67.04 |
| Wafer #1 | 19.52 ± 0.26 | 0.54 ± 0.004 | | 19.84 ± 0.25 | 0.26 ± 0.003 | | 20.83 ± 2.11 |
| Wafer #2 | 45.07 ± 0.26 | 0.91 ± 0.005 | | 45.38 ± 0.80 | 0.26 ± 0.004 | | 43.57 ± 2.87 |
| Wafer #3 | 80.08 ± 0.26 | 1.43 ± 0.005 | | 80.36 ± 1.29 | 0.26 ± 0.004 | | 84.82 ± 3.41 |
| Wafer #4 | 181.46 ± 0.26 | 2.89 ± 0.006 | | 180.32 ± 1.62 | 0.26 ± 0.002 | | 163.21 ± 8.82 |

FIG. 32

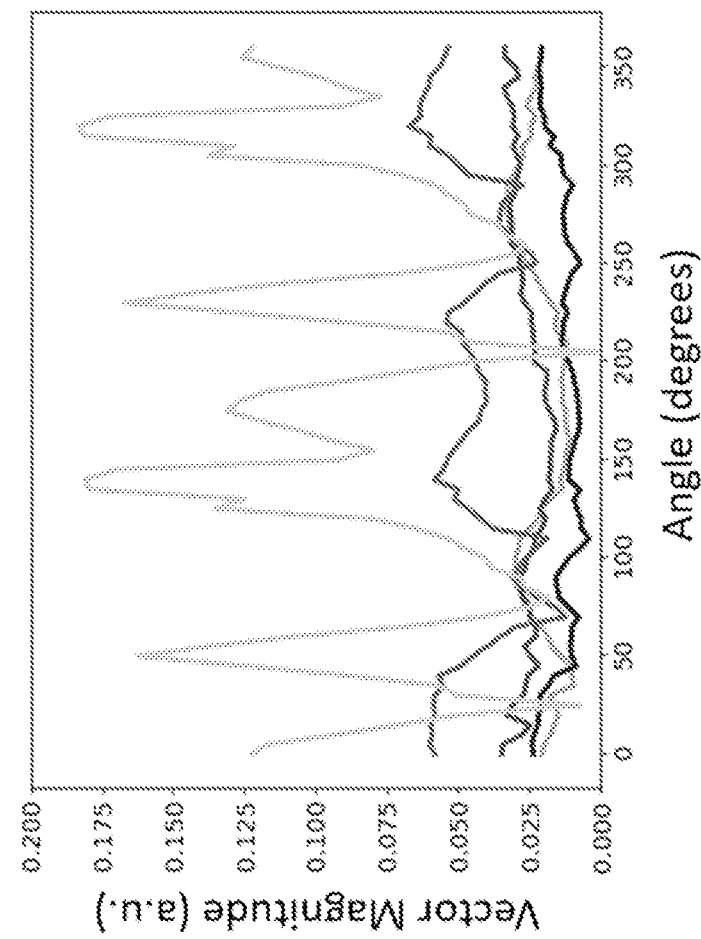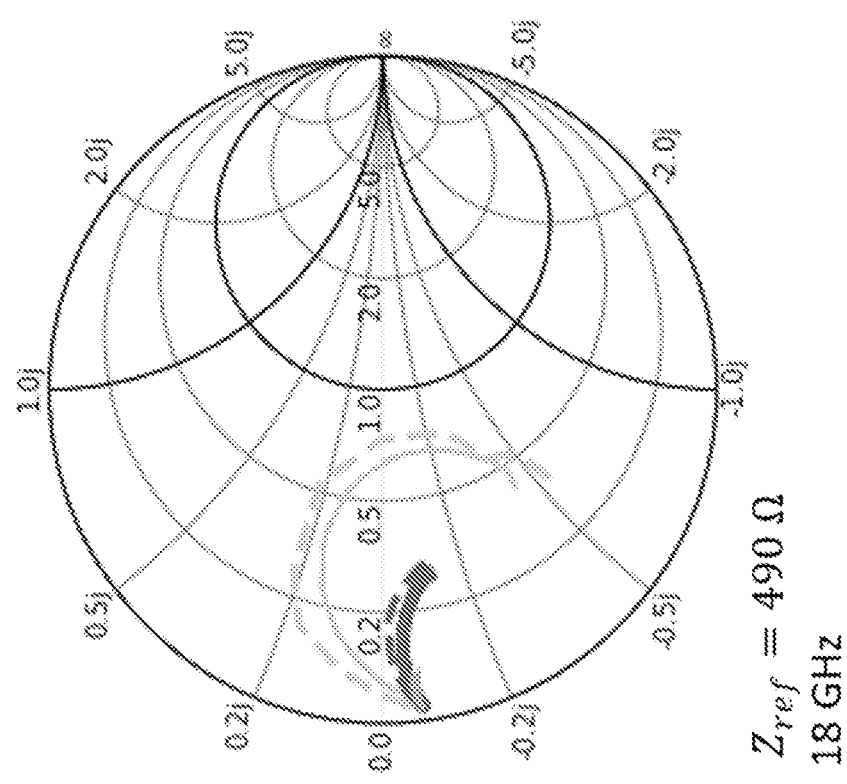
FIG. 33

Table I. Blind samples results for orientation ($\theta_o$) and alignment for ($\chi_{ab}$). Uncertainties are rounded up.

| Name | Concluded description after measurement | Orientation, $\theta_o$ [°] | | Alignment, $\chi_{ab}$ [a.u.] | |
|---|---|---|---|---|---|
| | | Side A | Side B | Side A | Side B |
| Control | Nominally aligned | 0.5 ± 1.2 | NA | 0.37 ± 0.01 | NA |
| Sample #1 | Nominally aligned | 0.4 ± 1.1 | −0.2 ± 1.0 | 0.36 ± 0.01 | 0.37 ± 0.01 |
| Sample #2 | All layers rotated by 5° | 5.4 ± 1.2 | −5.3 ± 1.3 | 0.40 ± 0.01 | 0.40 ± 0.01 |
| Sample #3 | One middle layer rotated by 5° | 1.0 ± 1.1 | −0.1 ± 1.0 | 0.38 ± 0.01 | 0.37 ± 0.01 |
| Sample #4 | One middle layer rotated by 15° | 4.6 ± 1.1 | −3.3 ± 1.4 | 0.27 ± 0.01 | 0.26 ± 0.01 |

FIG. 41

| Sample | % Error on spatial spot | Orientation (°) | $R_{sy}$ ($\Omega$/?) | $R_{sx}$ ($\Omega$/?) |
|---|---|---|---|---|
| Single layer SCFC | 6.7 % | 89.76 ± 1.45 | 0.40 ± 0.06 | 1.39 ± 0.01 |
| Multiple layer SCFC | 4.2 % | 91.36 ± 2.19 | 0.21 ± 0.24 | 3.49 ± 3.64 |
| Single layer CCFC | 4.0 % | 89.34 ± 0.47 | 1.39 ± 0.11 | 0.53 ± 0.17 |
| Multiple CCFC | 1.9 % | 89.42 ± 0.24 | 0.40 ± 0.07 | 1.30 ± 0.08 |

FIG. 44

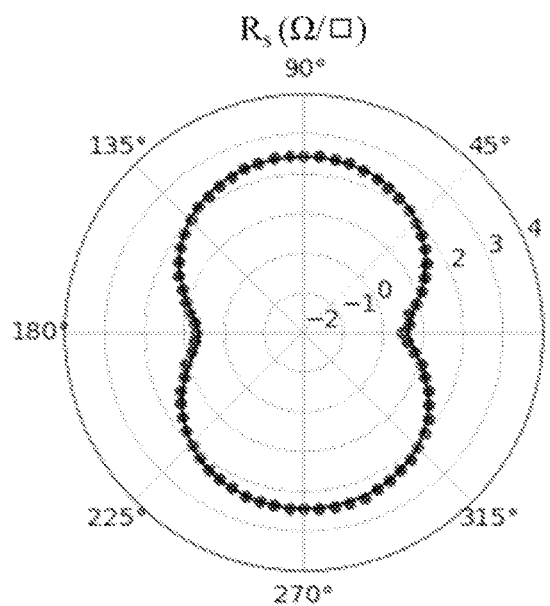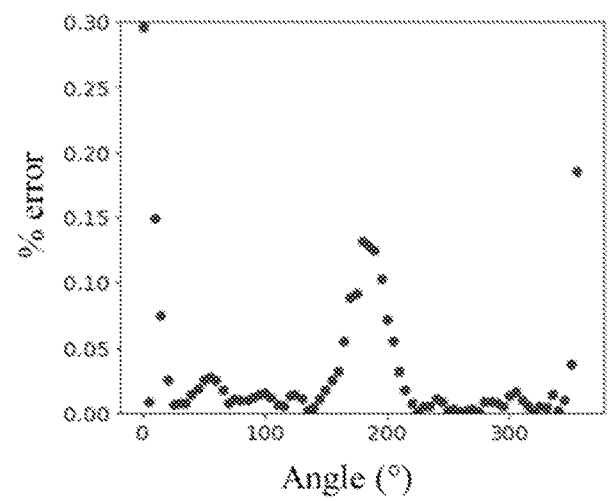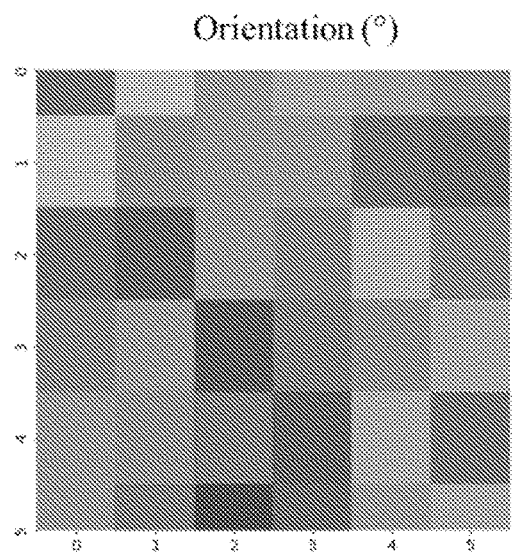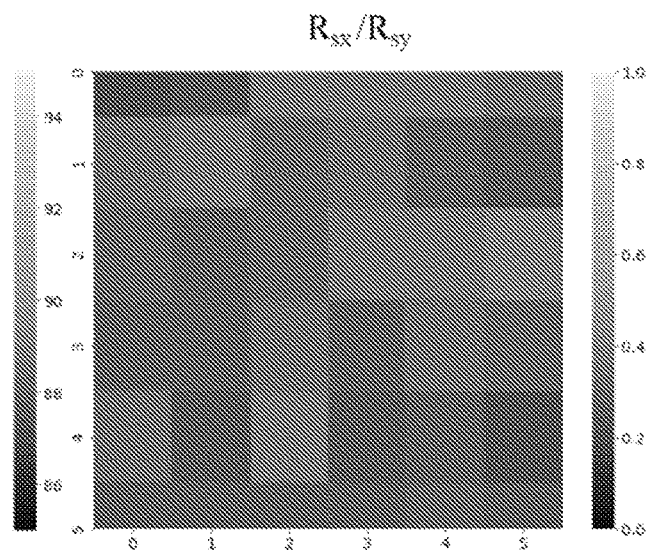
FIG. 50

SCANNING MICROWAVE ELLIPSOMETER AND PERFORMING SCANNING MICROWAVE ELLIPSOMETRY

CROSS REFERENCE TO RELATED APPLICATIONS

The application claims priority to U.S. Provisional Patent Application Ser. No. 62/841,612 filed May 1, 2019, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov; reference NIST Docket Number 19-040US1.

BRIEF DESCRIPTION

Disclosed is a scanning microwave ellipsometer comprising: a microwave ellipsometry test head comprising: a polarization controller that receives an input electrical signal, produces a polarization-controlled microwave radiation from the input electrical signal, receives reflected microwave radiation resulting from the polarization-controlled microwave radiation, and produces output electrical signal from reflected microwave radiation; a transmission line in communication with the polarization controller and that receives the polarization-controlled microwave radiation from the polarization controller, produces transmitted microwave radiation from the polarization-controlled microwave radiation, receives sensor-received microwave radiation resulting from the transmitted microwave radiation, and produces a reflected microwave radiation from the sensor-received microwave radiation; and a sensor in communication with the transmission line and that receives the transmitted microwave radiation from the transmission line, produces sensor microwave radiation from the transmitted microwave radiation, subjects a sample to the sensor microwave radiation, receives a sample-reflected microwave radiation from the sample that results from subjecting the sample with sensor microwave radiation, and produces a sensor-received microwave radiation from the sample-reflected microwave radiation, wherein a polarization of the sensor microwave radiation is controlled by the polarization controller; an electrical signal measurement system in electrical communication with the microwave ellipsometry test head and that produces the input electrical signal, communicates the input electrical signal to the microwave ellipsometry test head, receives the output electrical signal from the microwave ellipsometry test head, produces an electrical readout signal from the output electrical signal such that a magnitude of reflection coefficient $\Gamma$ and an angle of reflection coefficient $\Gamma$ of the sample reflected microwave radiation reflected from the sample is determined from the electrical readout signal, and produces a position control signal; and a position controller in communication with the electrical signal measurement system and that receives the position control signal from the electrical signal measurement system, adjusts a relative position of the sensor and the sample based on the position control signal, and moves the sensor relative to the sample so that the sensor scans a surface of the sample.

Disclosed is a microwave ellipsometer calibrant to calibrate a scanning microwave ellipsometer, the microwave ellipsometer calibrant comprising: a substrate and a plurality of sectors disposed on the substrate, wherein each sector provides a known material and known positional anisotropy of microwave reflection coefficient $\Gamma$, wherein the plurality of sectors comprises: a first sector that comprises a first material disposed as first stripes and a second material disposed as second stripes such that the first stripes and the second stripes are alternatingly disposed to provide a first anisotropic sheet resistivity; a second sector that comprises a third material disposed as third stripes and a fourth material disposed as fourth stripes such that the third stripes and the fourth stripes are alternatingly disposed to provide a second anisotropic sheet resistivity; a third sector that comprises a fifth material disposed to provide a first isotropic sheet resistivity; and a fourth sector that comprises a sixth material disposed to provide a second isotropic sheet resistivity.

Disclosed is a process for performing scanning microwave ellipsometry with the scanning microwave ellipsometer, the process comprising: receiving, by the polarization controller, the input electrical signal; producing, by the polarization controller, the polarization-controlled microwave radiation from the input electrical signal; receiving, by the polarization controller, the reflected microwave radiation resulting from the polarization-controlled microwave radiation; producing, by the polarization controller, the output electrical signal from the reflected microwave radiation; receiving, by the transmission line, the polarization-controlled microwave radiation from the polarization controller; producing, by the transmission line, transmitted microwave radiation from the polarization-controlled microwave radiation; receiving, by the transmission line, the sensor-received microwave radiation resulting from the transmitted microwave radiation; producing, by the transmission line, the reflected microwave radiation from the sensor-received microwave radiation; receiving, by the sensor, the transmitted microwave radiation from the transmission line; producing, by the sensor, the sensor microwave radiation from the transmitted microwave radiation; controlling the polarization of the sensor microwave radiation by the polarization controller; subjecting the sample to the sensor microwave radiation; receiving, by the sensor, the sample-reflected microwave radiation from the sample that results from subjecting the sample with the sensor microwave radiation; producing, by the sensor, the sensor-received microwave radiation from the sample-reflected microwave radiation; producing, by the electrical signal measurement system, the input electrical signal; communicating, by the electrical signal measurement system, the input electrical signal to the microwave ellipsometry test head; receiving, by the electrical signal measurement system, the output electrical signal from the microwave ellipsometry test head; producing, by the electrical signal measurement system, the electrical readout signal from the output electrical signal; producing, by the electrical signal measurement system, the position control signal; receiving, by the position controller, the position control signal from the electrical signal measurement system; adjusting the relative position of the sensor and the sample based on the position control signal; and scanning over the surface of the sample with the sensor microwave radiation from the sensor as the sensor is moved relative to the sample to perform scanning microwave ellipsometry of the sample.

BRIEF DESCRIPTION OF THE DRAWINGS

The following description should not be considered limiting in any way. With reference to the accompanying drawings, like elements are numbered alike.

FIG. 1 shows a scanning microwave ellipsometer;
FIG. 15 shows a scanning microwave ellipsometer;
FIG. 18 shows an exploded view of a scanning microwave ellipsometer;
FIG. 27 shows physical properties of test wafers;
FIG. 28 shows composite theory with a (a) schematic of the anisotropic composite where the dimensions are defined by voxels (length in nm divided by the voxel edge length a). The simulated volume has voxel dimensions $n_x=20000/a$, $n_y=5$, and $n_z=200/a+t/a$, where the substrate has a thickness t. (b) The circuit model associated with the conductivity in the $\hat{y}$-direction and (c) the circuit model associated with the conductivity in the $\hat{x}$-direction. The resistance is dependent on the direction of interest, the subscripts x and y indicate that direction.

FIG. 30 shows an overview of a calibration process with (a) a test-head with the reference planes labeled (first-tier and second-tier) and (b) on a Smith chart with all isotropic materials measured including the controls: gold, fused silica, absorber, and the $MoSi_2$ on the test wafers. The symbols indicate raw S-parameters, S-parameters calibrated to the end of the 2.4 mm coaxial cable before the test-head (first-tier), and the S-parameters calibrated to the edge of the WR-42 waveguide (second-tier), respectively. The S-parameters are shown for one angle, where the change over angle is small compared to the size of the plot markers;

FIG. 32 shows sheet resistance tensor components from circuit model analysis, 3d composite simulation, and the mapping function;

FIG. 33 shows a comparison of measured and simulated S-parameters (a) on a Smith chart with measured (solid line) and simulated (dotted line) lines for three of the anisotropic materials, gold stripes on bare fused silica, 20 nm, and 185 nm. (b) The vector magnitude between the measured and simulated S-parameters for each angle between 0° and 360° for all five anisotropic materials;

FIG. 41 shows data for blind samples results for orientation ($\theta_o$) and alignment for ($\chi_{ab}$). Uncertainties were rounded up;

FIG. 44 shows data for carbon fiber composite samples with extracted parameters;

FIG. 50 shows a single layer SCFC with (a) the mapped data with fit for one spatial position, (b) the percent error as a function of angle for the same spatial position (c) a plot of the orientation for each spatial position and (d) a plot of the ratio between the sheet resistance across and along the fibers ($R_{sx}/R_{sy}$);

DETAILED DESCRIPTION

Figure 2:
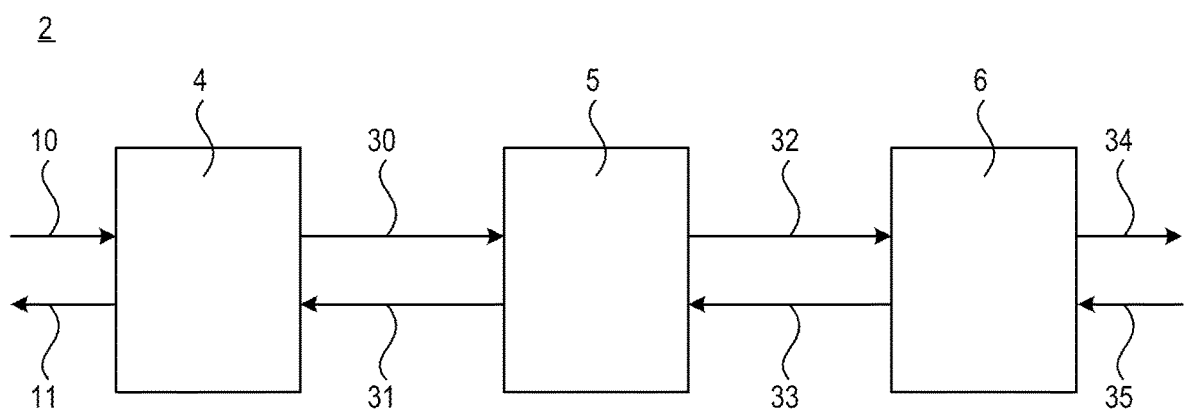
FIG. 2 shows a microwave ellipsometry test head.
Figure 3:
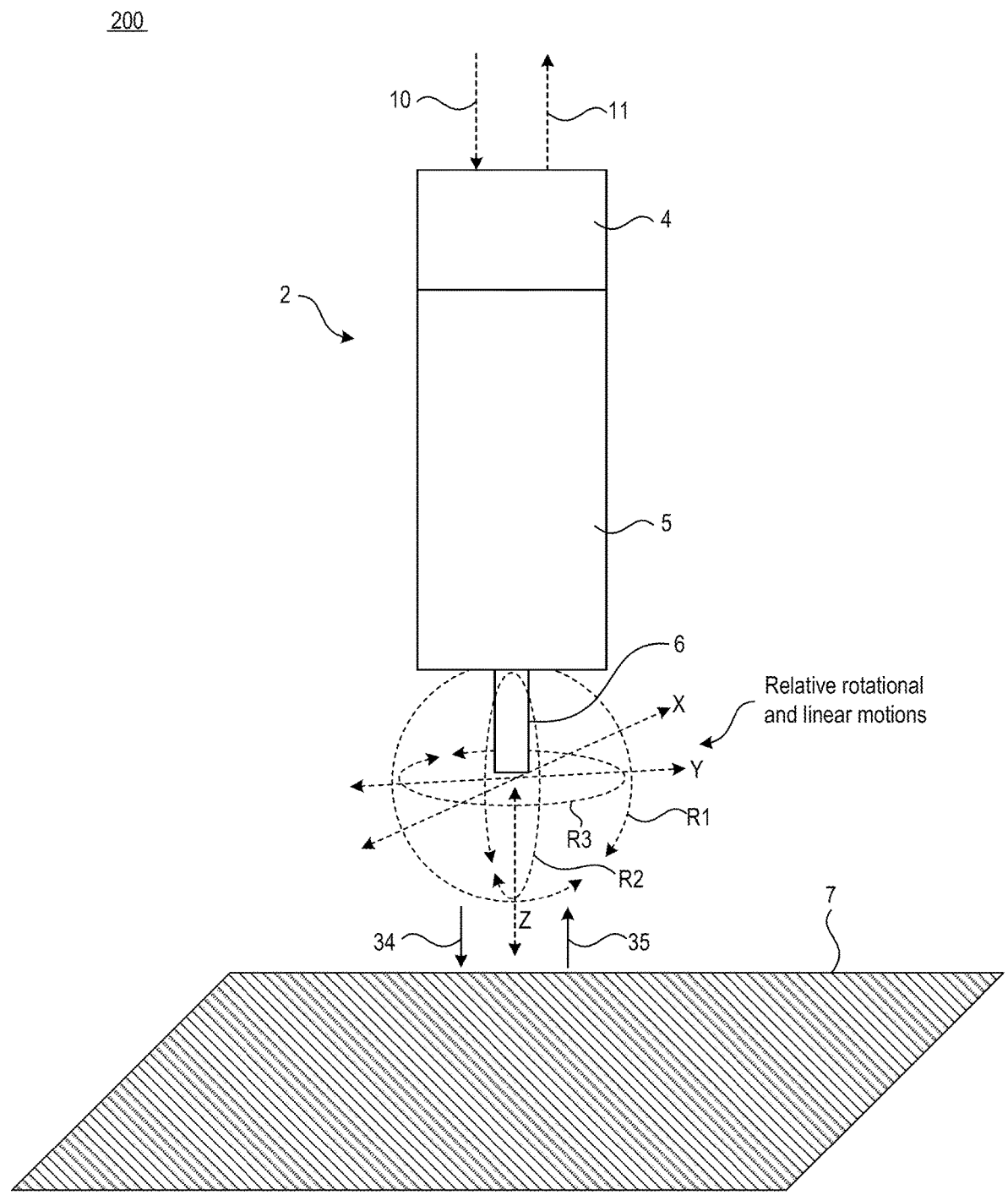
FIG. 3 shows a scanning microwave ellipsometer.
Figure 4:
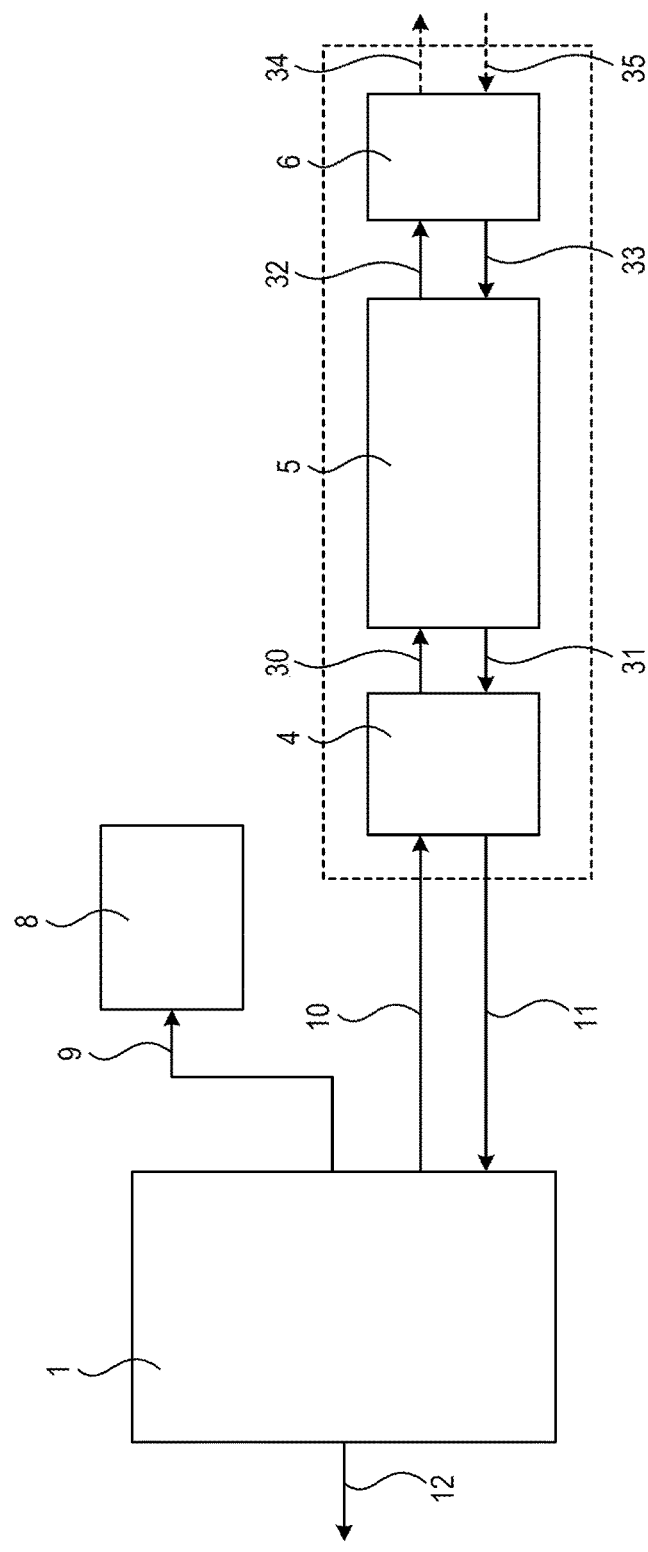
FIG. 4 shows a scanning microwave ellipsometer.
Figure 5:
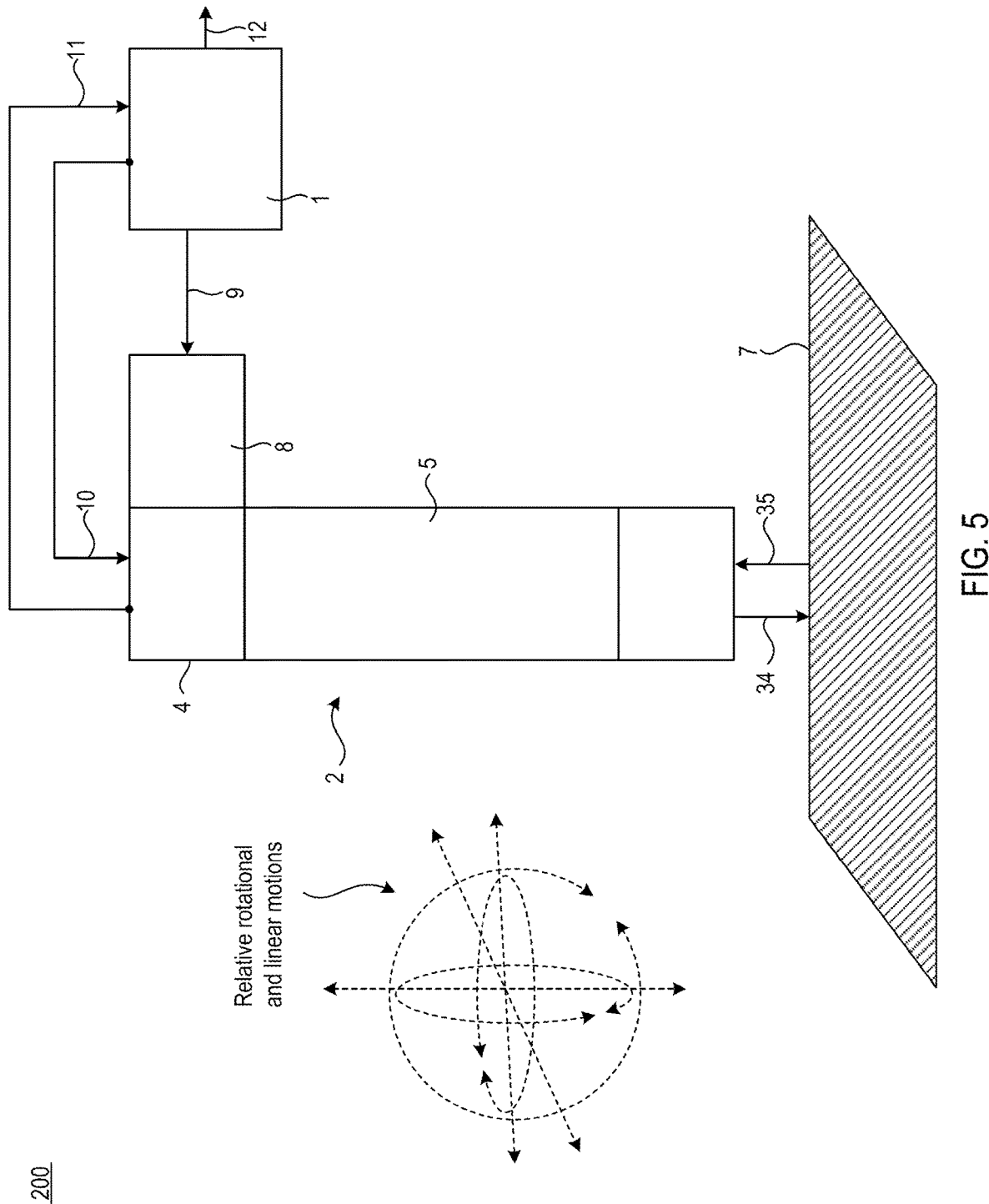
FIG. 5 shows a scanning microwave ellipsometer.
Figure 6:
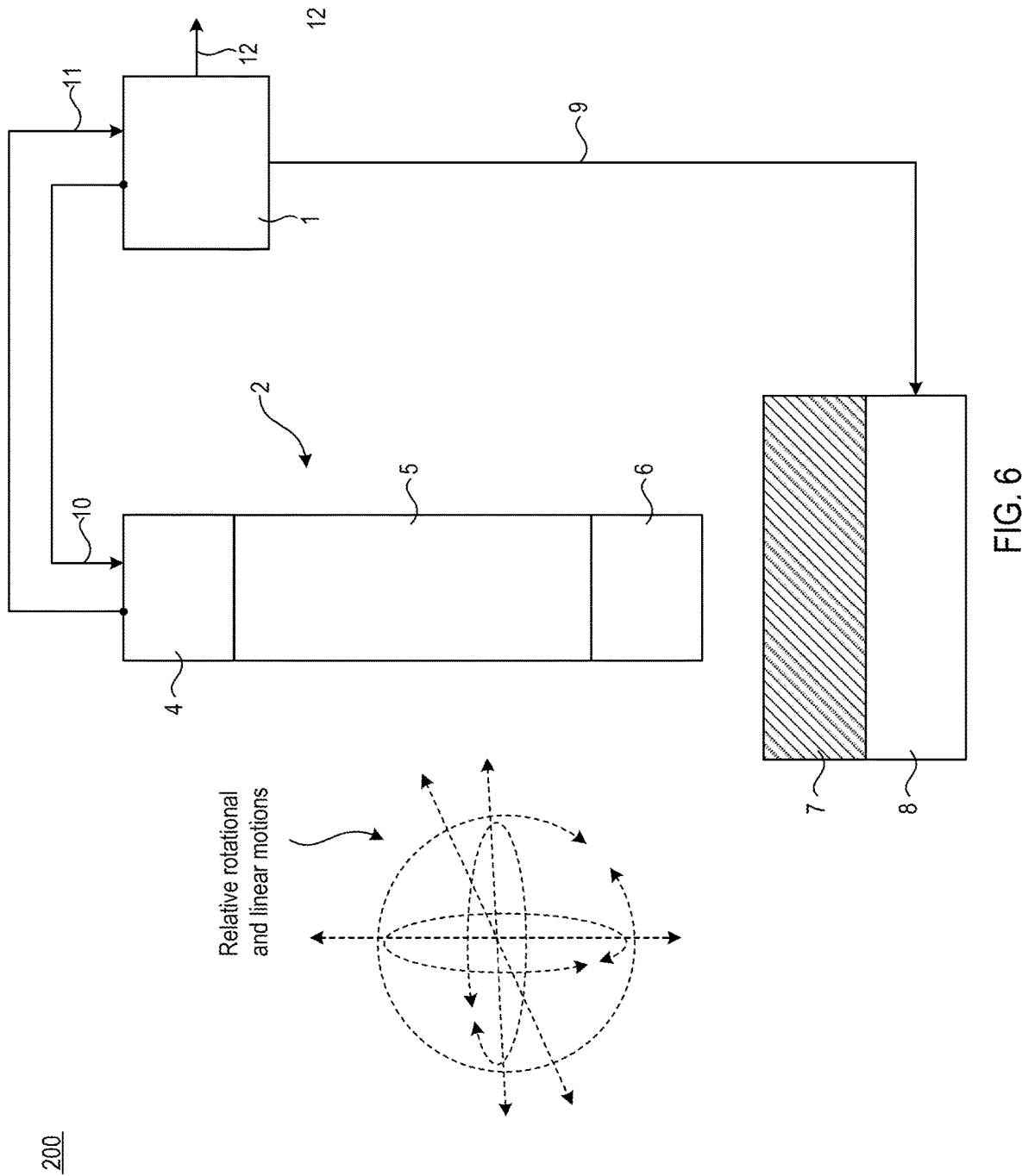
FIG. 6 shows a scanning microwave ellipsometer.
Figure 7:
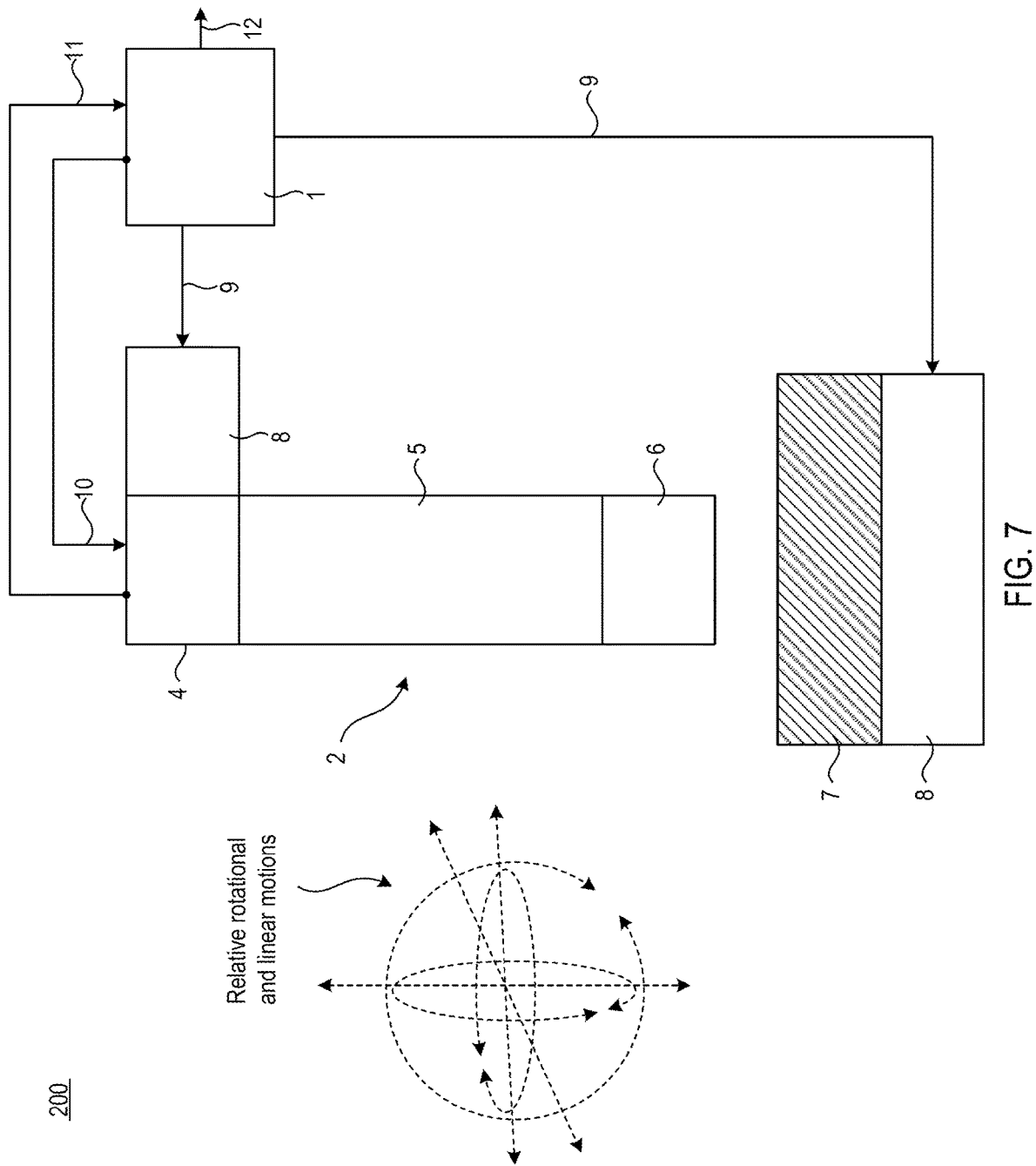
FIG. 7 shows a scanning microwave ellipsometer.
Figure 8:
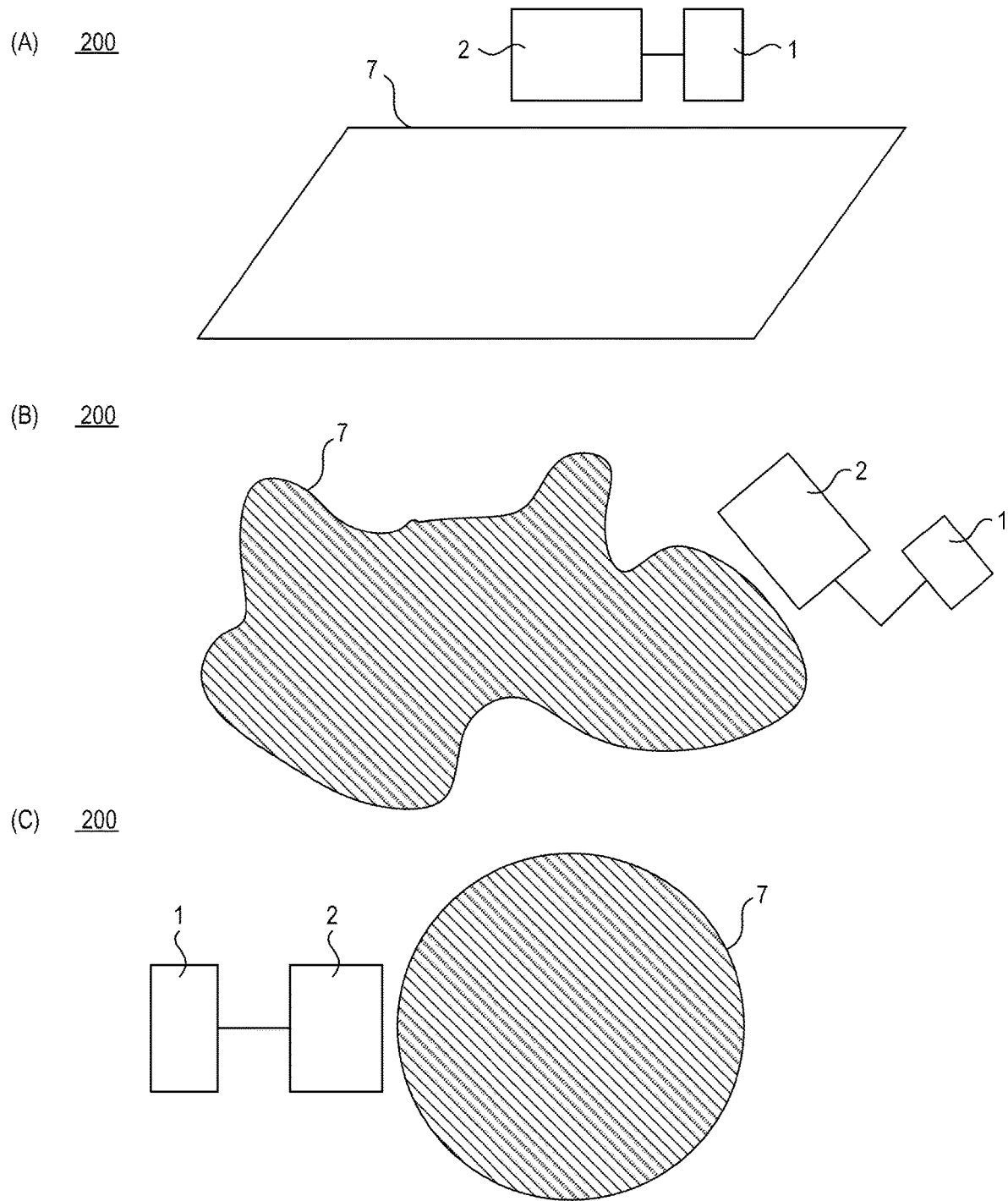
FIG. 8 shows a scanning microwave ellipsometer with a sample for a two-dimensional surface of the sample in panel A, for an irregular three-dimensional surface of the sample in panel B, and for a regular three-dimensional surface of the sample in panel C.
Figure 9:
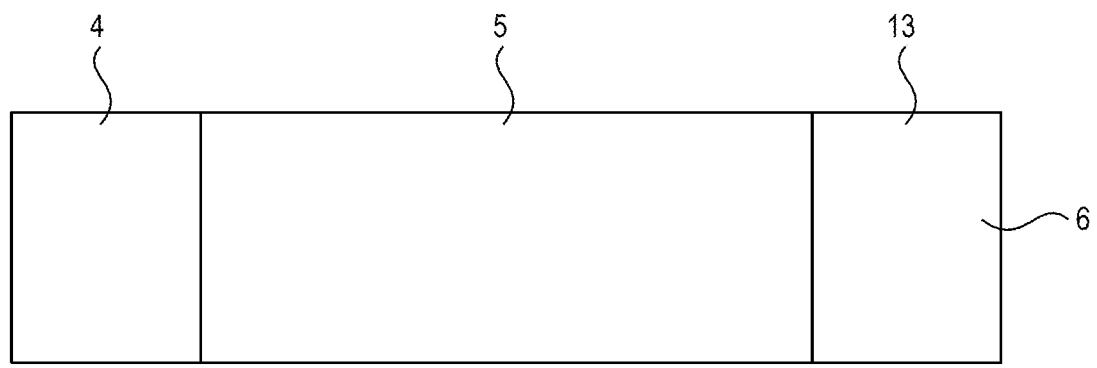
FIG. 9 shows a microwave ellipsometry test head.
Figure 10:
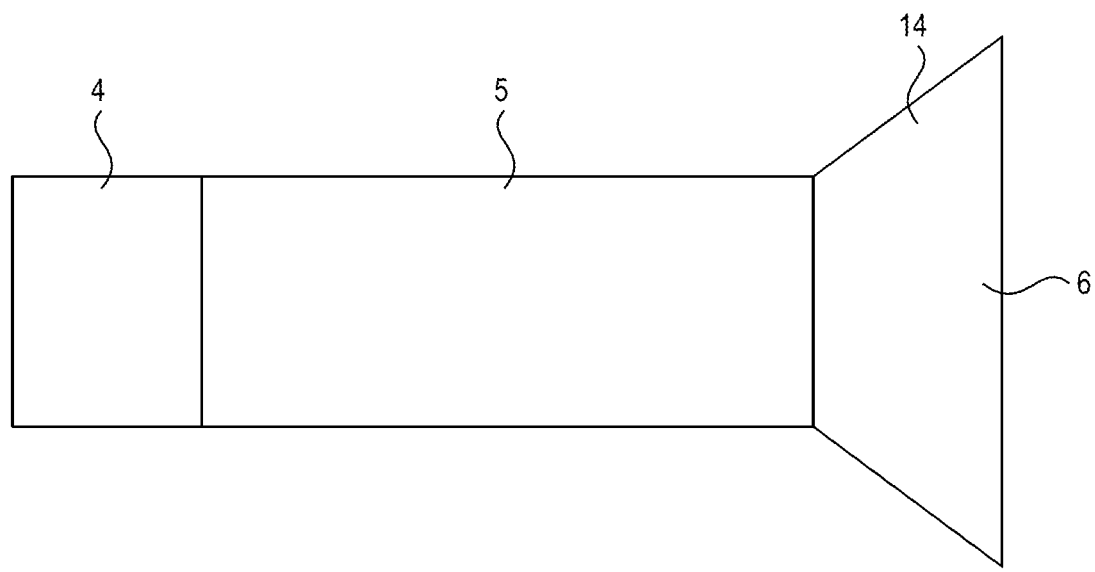
FIG. 10 shows a microwave ellipsometry test head.
Figure 11:
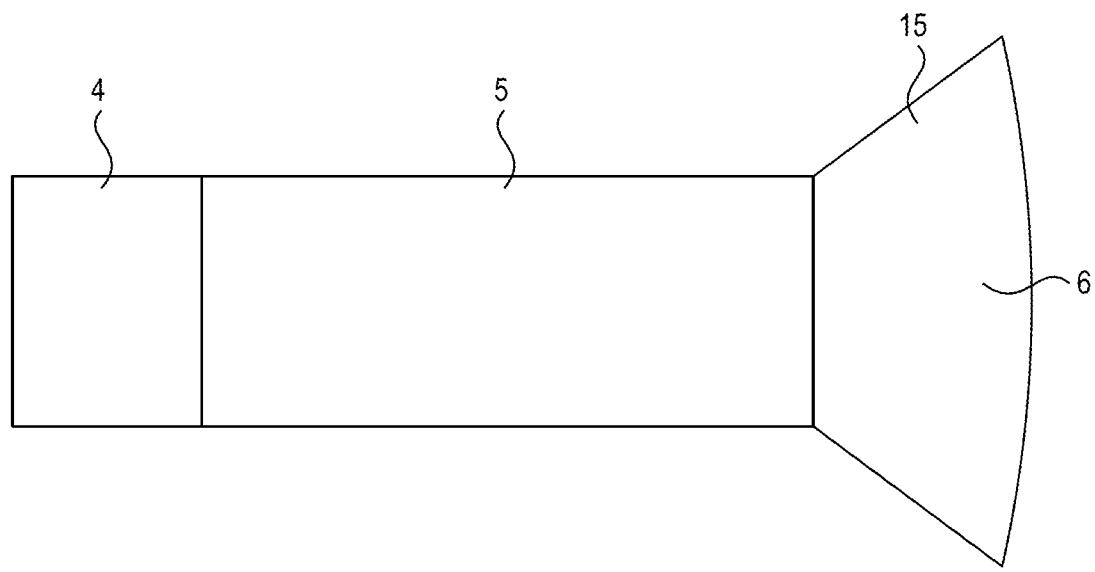
FIG. 11 shows a microwave ellipsometry test head.
Figure 12:
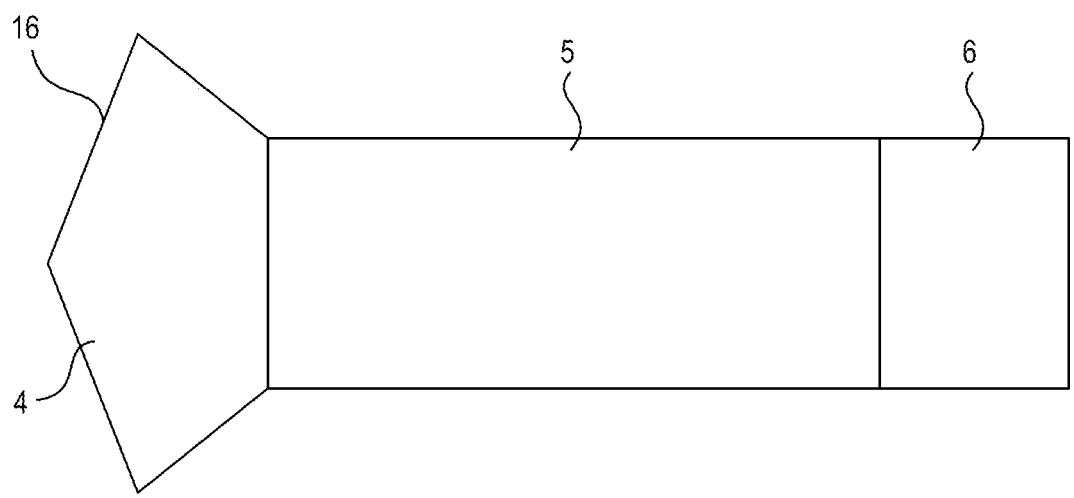
FIG. 12 shows a microwave ellipsometry test head.
Figure 13:
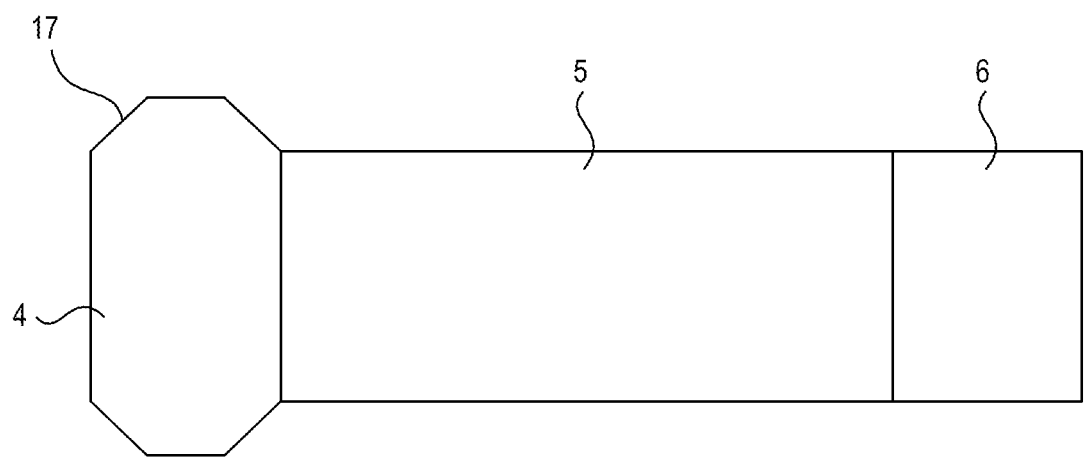
FIG. 13 shows a microwave ellipsometry test head.
Figure 14:
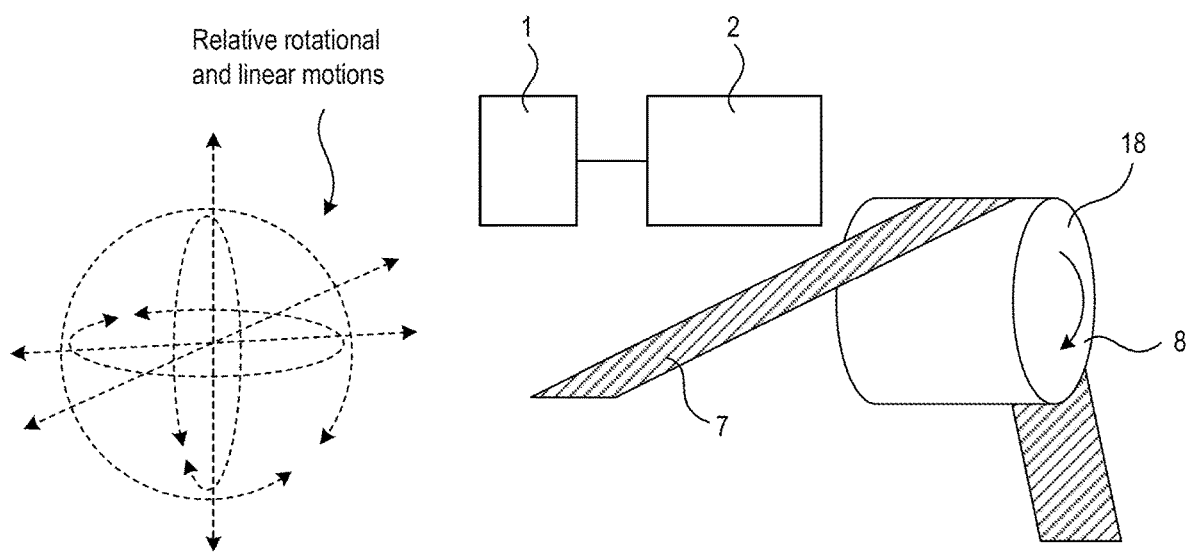
FIG. 14 shows a scanning microwave ellipsometer.
Figure 16:
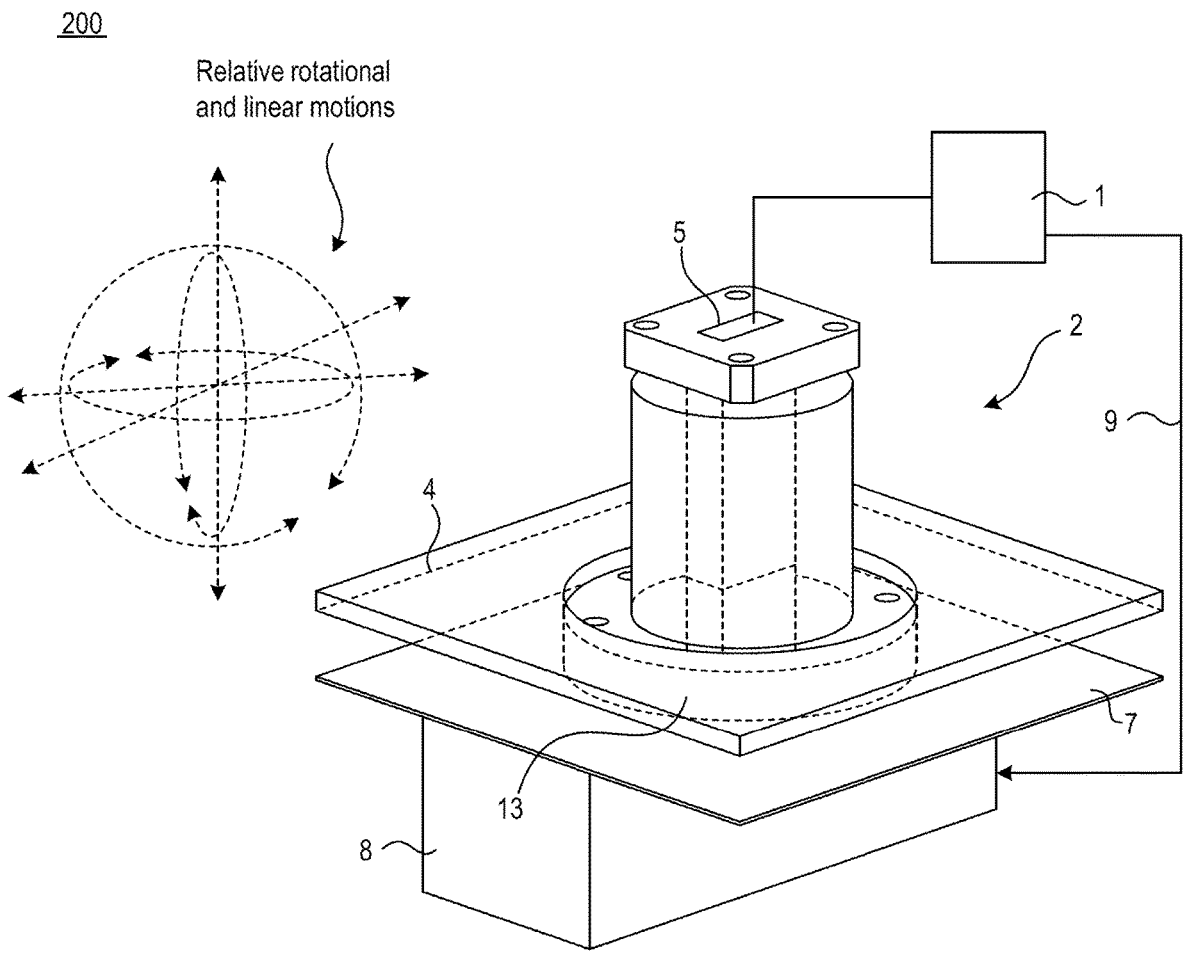
FIG. 16 shows a scanning microwave ellipsometer.

A detailed description of one or more embodiments is presented herein by way of exemplification and not limitation.

New strong, light, and compact formed carbon fiber components involve short, high-aspect ratio carbon fibers. Short carbon fibers are aligned to provide a desired tensile strength. Conventional tools fail to accurately characterize carbon fiber alignment for inline quality assurance or for verification of alignment in 3D parts. Advantageously, a scanning microwave ellipsometer overcomes this problem by providing scanning microwave ellipsometry. The scanning microwave ellipsometer provides a polarized electric microwave field and measures reflection of the polarized electric microwave field from a sample as a function of angle. Resulting reflected power plotted versus measured angle on a polar plot has an elliptical shape. The scanning microwave ellipsometer includes a test head that rotates the electric microwave field relative to the sample. The test head is rastered over the sample, e.g., by a 6-axis robotic arm or other motion manipulator. A process for performing microwave ellipsometry acquires data, fits the microwave ellipsometry data, and produces discrete measurands that can be plotted as a function of position in three dimensions, two dimensions, or one dimension. The discrete measurands can include a maximum value, a minimum value, an alignment value, and an orientation value. Scanning microwave ellipsometry is broadly applicable where large-scale imaging of material properties is useful as well as single testing cases.

It has been discovered that scanning microwave ellipsometer 200 subjects a sample to scanning microwave ellipsometry. In an embodiment with reference to FIG. 1 to FIG. 20, scanning microwave ellipsometer 200 includes scanning microwave ellipsometer 200 including: microwave ellipsometry test head 2 including: polarization controller 4 that receives input electrical signal 10, produces polarization-controlled microwave radiation 30 from input electrical signal 10, receives reflected microwave radiation 31 resulting from polarization-controlled microwave radiation 30, and produces output electrical signal 11 from reflected microwave radiation 31; transmission line 5 in communication with polarization controller 4 and that receives polarization-controlled microwave radiation 30 from polarization controller 4, produces transmitted microwave radiation 32 from polarization-controlled microwave radiation 30, receives sensor-received microwave radiation 33 resulting from transmitted microwave radiation 32, and produces reflected microwave radiation 31 from sensor-received microwave radiation 33; and sensor 6 in communication with transmission line 5 and that receives transmitted microwave radiation 32 from transmission line 5, produces sensor microwave radiation 34 from transmitted microwave radiation 32, subjects sample 7 to sensor microwave radiation 34, receives sample-reflected microwave radiation 35 from sample 7 that results from subjecting sample 7 with sensor microwave radiation 34, and produces sensor-received microwave radiation 33 from sample-reflected microwave radiation 35, wherein a polarization of sensor microwave radiation 34 is controlled by polarization controller 4; electrical signal measurement system 1 in electrical communication with microwave ellipsometry test head 2 and that produces input electrical signal 10, communicates input electrical signal 10 to microwave ellipsometry test head 2, receives output electrical signal 11 from microwave ellipsometry test head 2, produces electrical readout signal 12 from output electrical signal 11 such that the polarization, magnitude of reflection coefficient Γ, and angle of reflection coefficient Γ of sample-reflected microwave radiation 35 reflected from sample 7 is determined from electrical readout signal 12, and produces position control signal 9; and position controller 8 in communication with electrical signal measurement system 1 and that receives position control signal 9 from electrical signal measurement system 1, adjusts a relative position of sensor 6 and sample 7 based on position control signal 9, and moves sensor 6 relative to sample 7 so that sensor 6 scans a surface of sample 7.

In an embodiment, position controller 8 adjusts the relative position by moving sensor 6 relative to sample 7 selectively along three orthogonal linear directions and in three independent angular coordinates. According to an embodiment, position controller 8 is in mechanical communication with microwave ellipsometry test head 2 through disposition of microwave ellipsometry test head 2 on position controller 8. In an embodiment, position controller 8 is in mechanical communication with sample 7 through disposition of sample 7 on position controller 8. In some embodiments, sample 7 is disposed on first position controller 8.1, and microwave ellipsometry test head 2 is disposed on second position controller 8.2, wherein first position controller 8.1 and second position controller 8.2 are independently controlled by electrical signal measurement system 1 respectively via first position control signal 9.1 and second position control signal 9.2.

Sample 7 can be an arbitrary sample such as metal, plastic, glass, ceramic, polymer, alloy, liquid, and the like. Sample 7 can be a single material, or it can be a composite of multiple materials in an arbitrary arrangement. A shape of sample 7 can include a planar surface, a regular three-dimensional surface (e.g., a sphere, parallelepiped, icosahedron, truncated shape, and the like), or an irregular three-dimensional surface that is subject to sensor microwave radiation 34 from sensor 6.

In an embodiment, sensor 6 includes waveguide aperture 13, waveguide horn antenna 14, waveguide spot-focusing or gaussian-beam antenna 15, or a combination of at least one of the foregoing sensors 6. In an embodiment, polarization controller 4 includes an orthomode transducer 16, waveguide rotary joint 17, or a combination of at least one of the foregoing sensors 6. In an embodiment, position controller 8 includes roller 18 on which sample 7 is disposed, wherein roller 18 rotates to move sample 7 relative to sensor 6 of microwave ellipsometry test head 2. In an embodiment, position controller 8 includes robotic arm 19 on which sensor 6 is disposed, wherein robotic arm 19 moves sensor 6 relative to sample 7.

According to an embodiment, scanning microwave ellipsometer 200 includes microwave ellipsometer calibrant 20 in communication with sensor 6 from which scanning microwave ellipsometer 200 is calibrated. Microwave ellipsometer calibrant 20 includes: substrate 21 and a plurality of sectors disposed on substrate 21. Each sector provides a known material and known positional anisotropy of microwave reflection coefficient Γ. The plurality of sectors includes: first sector 22 that includes a first material disposed as first stripes 26 and a second material disposed as second stripes 27 such that first stripes 26 and second stripes 27 are alternatingly disposed to provide a first anisotropic sheet resistivity; second sector 23 that includes a third material disposed as third stripes 28 and a fourth material disposed as fourth stripes 29 such that third stripes 28 and fourth stripes 29 are alternatingly disposed to provide a second anisotropic sheet resistivity; third sector 24 that includes a fifth material disposed to provide a first isotropic sheet resistivity; and fourth sector 25 that includes a sixth material disposed to provide a second isotropic sheet resistivity.

In an embodiment, electrical signal measurement system 1 includes a microwave source and a microwave detector, wherein input electrical signal 10 and output electrical signal 11 are microwave radiation. In an embodiment, electrical signal measurement system 1 includes a vector network analyzer, and input electrical signal 10 and output electrical signal 11 are microwave radiation. In an embodiment, electrical signal measurement system 1 includes a scalar network analyzer, and input electrical signal 10 and output electrical signal 11 are microwave radiation. In an embodiment, the electrical signal measurement system 1 includes a computer that controls a vector network analyzer, scalar network analyzer, microwave source, or microwave detector.

In an embodiment, transmission line 5 supports multiple polarizations. Transmission line 5 supports polarized microwave radiation and can be an arbitrary transmission line, e.g., circular waveguide, rectangular waveguide, ridge waveguide, and the like.

As used herein, "microwave" refers to a frequency in from 300 Hz to 3 THz. In an embodiment, microwave radiation is above a cutoff frequency for waveguides in test head 2 and below a frequency at which any waveguide in test head 2 supports more than one propagating mode.

Scanning microwave ellipsometer 200 can be made in various ways. In an embodiment, a process for making scanning microwave ellipsometer 200 includes providing sensor 6; connecting transmission line 5 to sensor 6; connecting polarization controller 4 to transmission line 5 so that sensor 6 is in communication with polarization controller 4 via transmission line 5; connecting polarization controller 4 to electrical signal measurement system 1 so that electrical signal measurement system 1 and polarization controller 4 are in communication; connecting electrical signal measurement system 1 to position controller 8 so that electrical signal measurement system 1 and position controller 8 are in communication; optionally disposing sensor 6 proximate to sample 7 so that sensor 6 can subject sample 7 to sensor microwave radiation 34 and so that sensor 6 can receive sample reflected microwave radiation 35 form sample 7; and optionally disposing sensor 6 or sample 7 on a position manipulator so that sensor 6 and sample 7 move relative to one another for scanning sensor microwave radiation 34 from sensor 6 over sample 7.

In an embodiment with reference to FIG. 17 through FIG. 20, a process for performing microwave ellipsometry includes characterizing the S-parameters of the test head as a function of polarization. The S-parameters of the test head as a function of polarization are characterized by performing a first-tier one-port coaxial calibration (e.g., a Short-Open-Load calibration) at the end of a coaxial cable that carries an input electrical signal 10 to the test head and carries an output electrical signal 11 from the test head, followed by a second-tier rectangular-waveguide calibration (e.g., a Short-Open-Load calibration) at the end of waveguide aperture 13 for each polarization. The S-parameters of test head 2 are directly obtained from the second-tier calibration error box. This step is performed once for a given test head 2 and is not required every time waveguide ellipsometry is performed if the S-parameters of the test head do not drift appreciably and are retained for future use.

In an embodiment, with reference to FIG. 17 through FIG. 20, the process for performing microwave ellipsometry includes performing a first-tier one-port coaxial calibration (e.g., a Short-Open-Load calibration) at the end of a coaxial cable that carries an input electrical signal 10 to the test head and carries an output electrical signal 11 from the test head, followed by cascading the S-parameters of the test head obtained in the first step with the first-tier calibration error box. This step can be repeated to correct for drift in the systematic errors introduced by electrical signal measurement system 1. This step includes installation of an electronic calibration unit at the end of a coaxial cable that carries an input electrical signal 10 to the test head and carries an output electrical signal 11 from the test head.

In an embodiment, with reference to FIG. 17 through FIG. 20, the process for performing microwave ellipsometry includes placing the sample between the waveguide flange and the dielectric spacer (e.g., Rohacell) (FIG. 19) and aligning microwave ellipsometry test head 2 normal to sample 7. The dielectric spacer can be optional but can simplify implementation of the absorber in simulations, making it advantageous to include for simulations to be performed.

Figure 17:
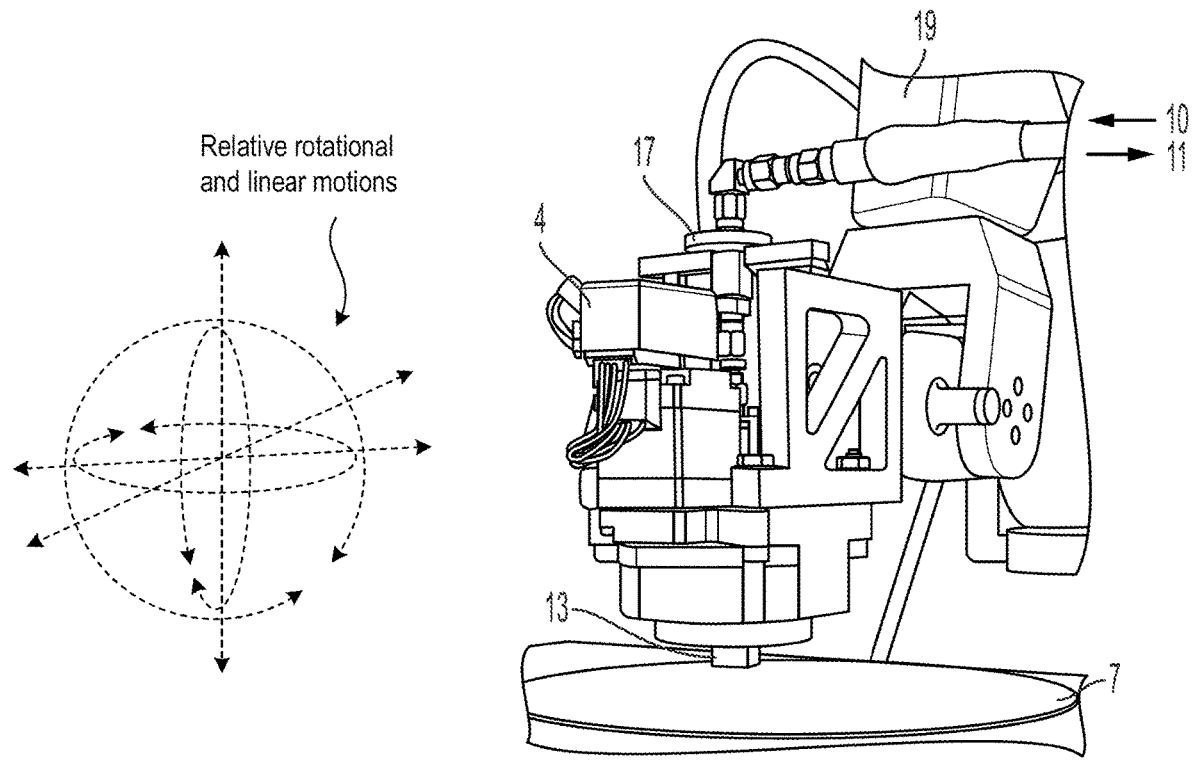
FIG. 17 shows a scanning microwave ellipsometer.
Figure 20:
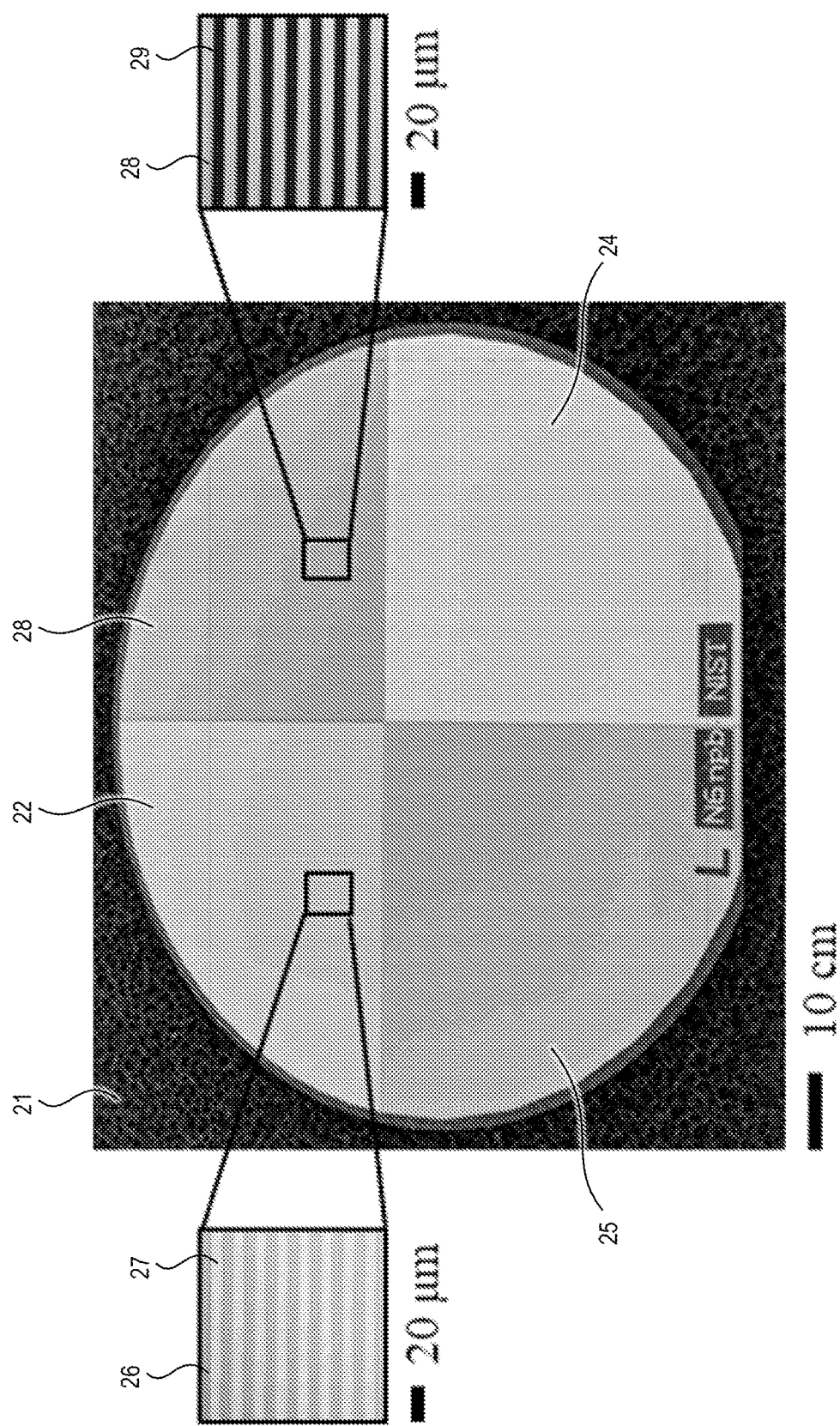
FIG. 20 shows a microwave ellipsometer calibrant.
Figure 21:
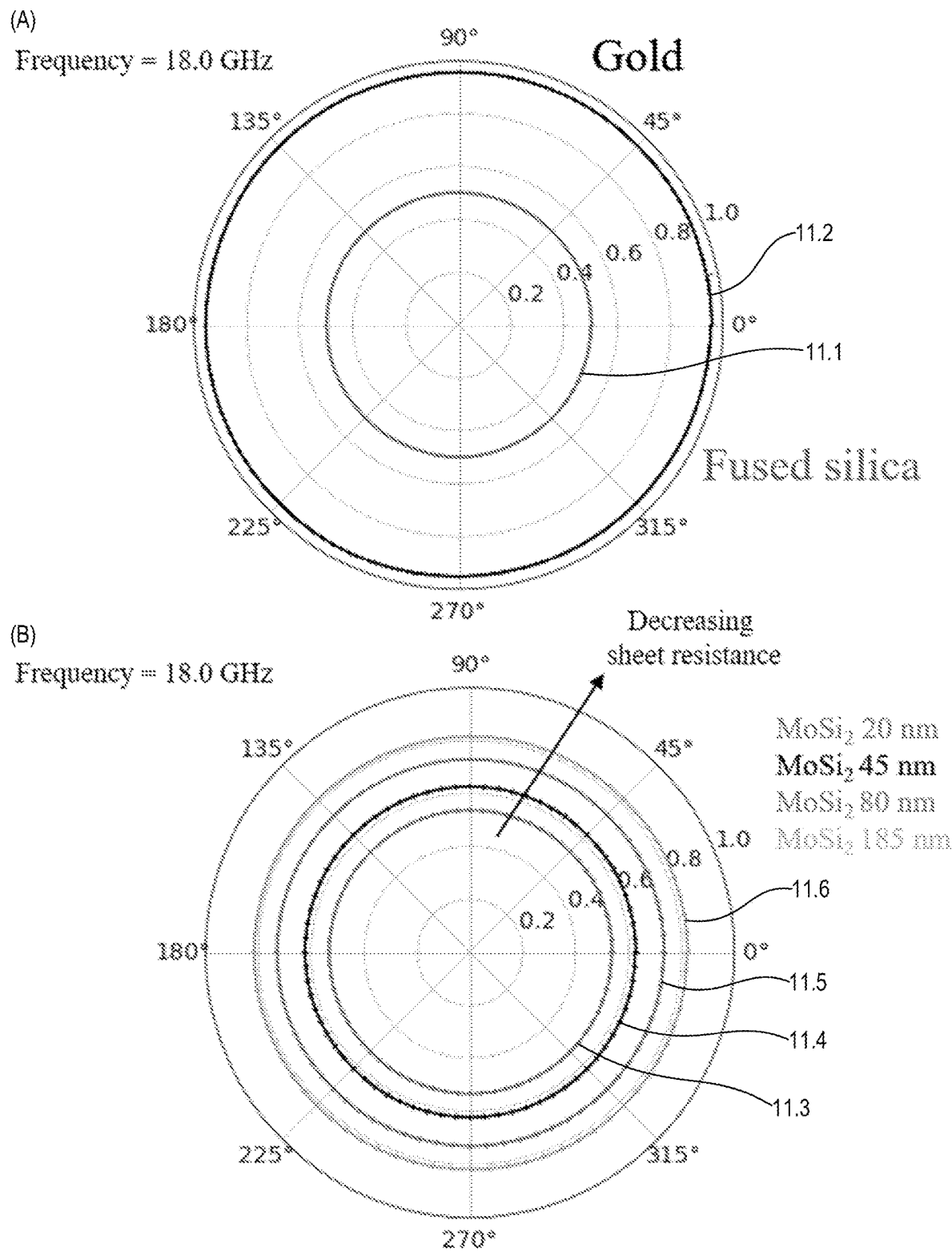
FIG. 21 shows magnitude data as a function of angle for isotropic samples, wherein panel A shows data for gold and fused silica samples, and panel B shows data for various $MoSi_2$ samples.
Figure 22:
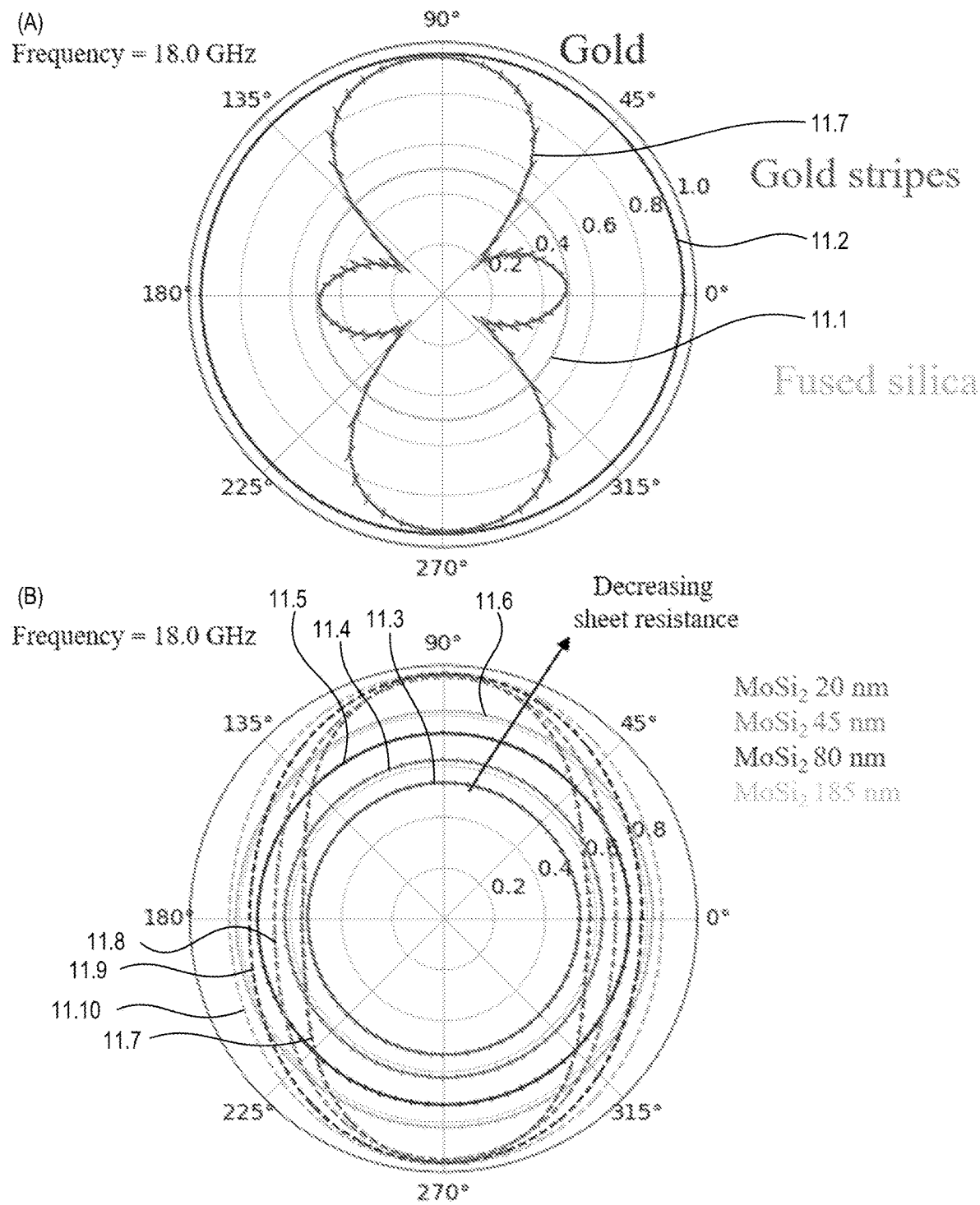
FIG. 22 shows magnitude data as a function of angle for anisotropic samples, wherein panel A shows data for gold stripes and fused silica samples, and panel B shows data for various $MoSi_2$ samples.
Figure 23:
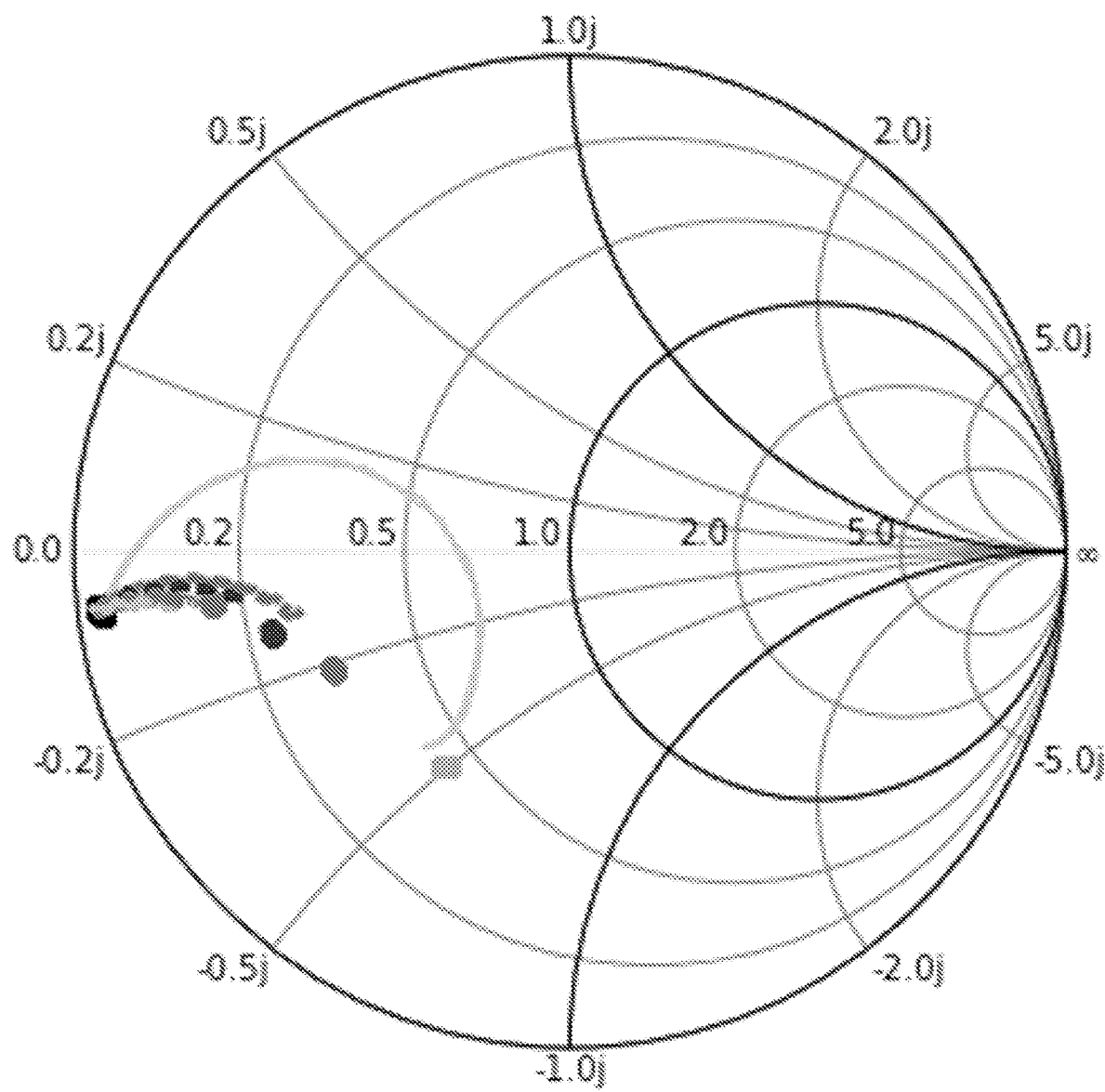
FIG. 23 shows complex data plotted on a smith chart.
Figure 24:
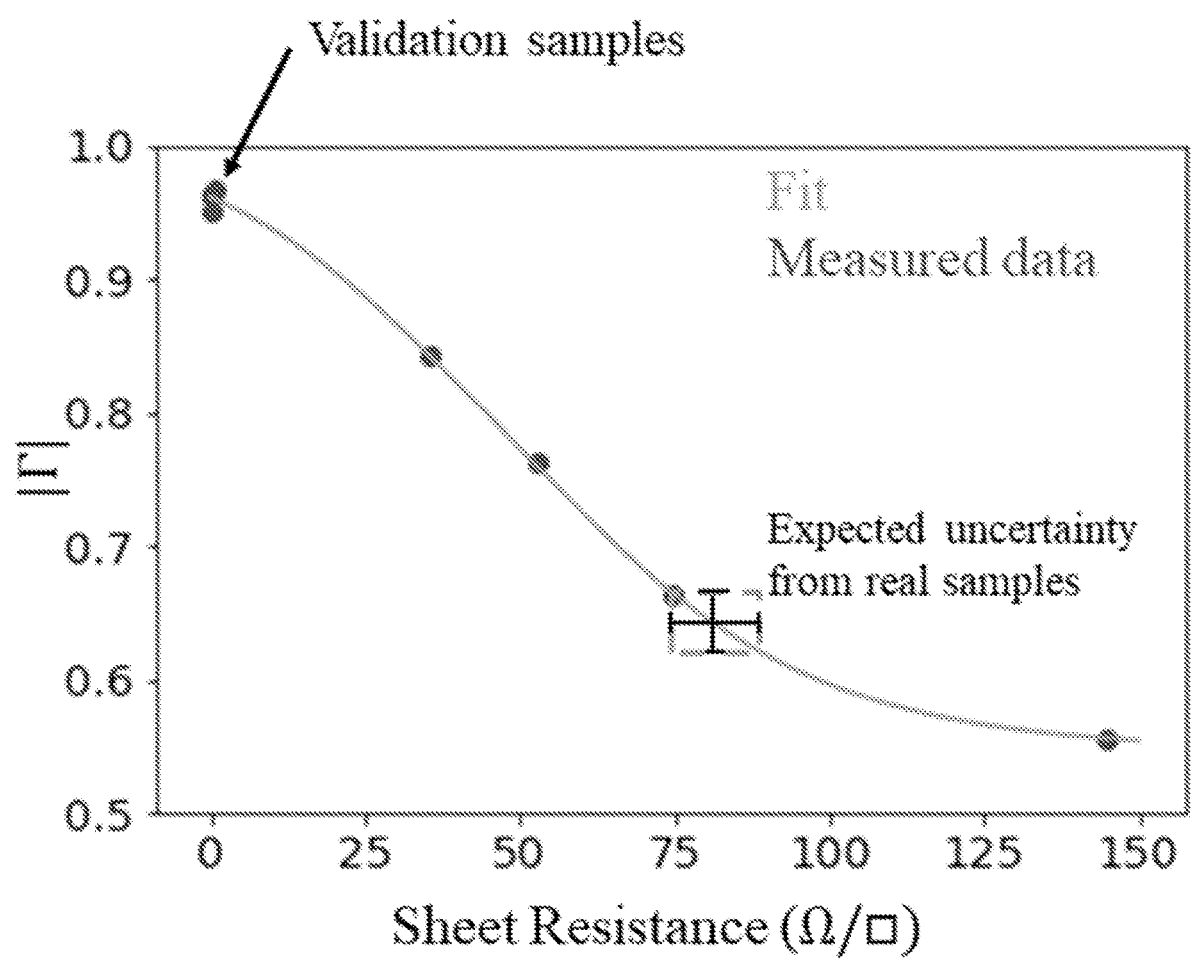
FIG. 24 shows a graph of a magnitude of reflection coefficient $\Gamma$ for output electrical signal versus sheet resistance that provides a calibration curve to map reflection coefficient magnitude to sheet resistance.
Figure 25:
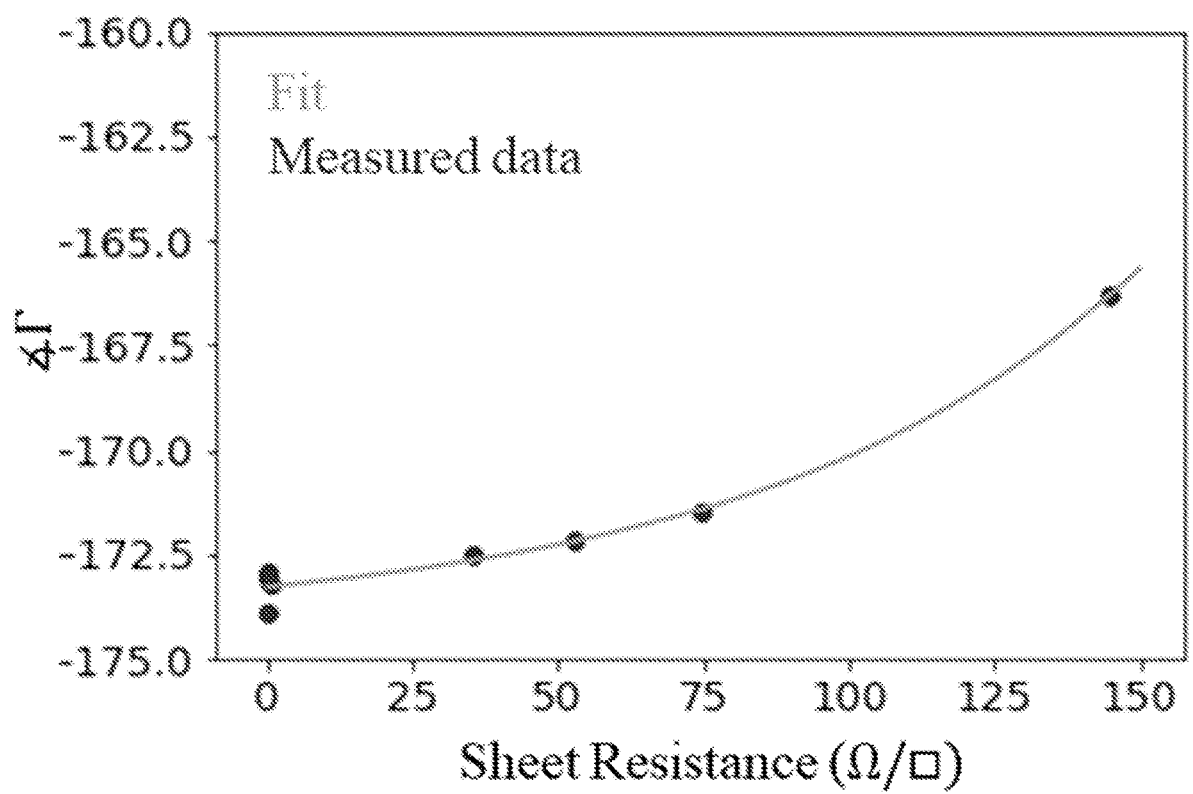
FIG. 25 shows a graph of an angle of reflection coefficient $\Gamma$ for output electrical signal versus sheet resistance that provides a calibration curve to map reflection coefficient angle to sheet resistance.
Figure 26:
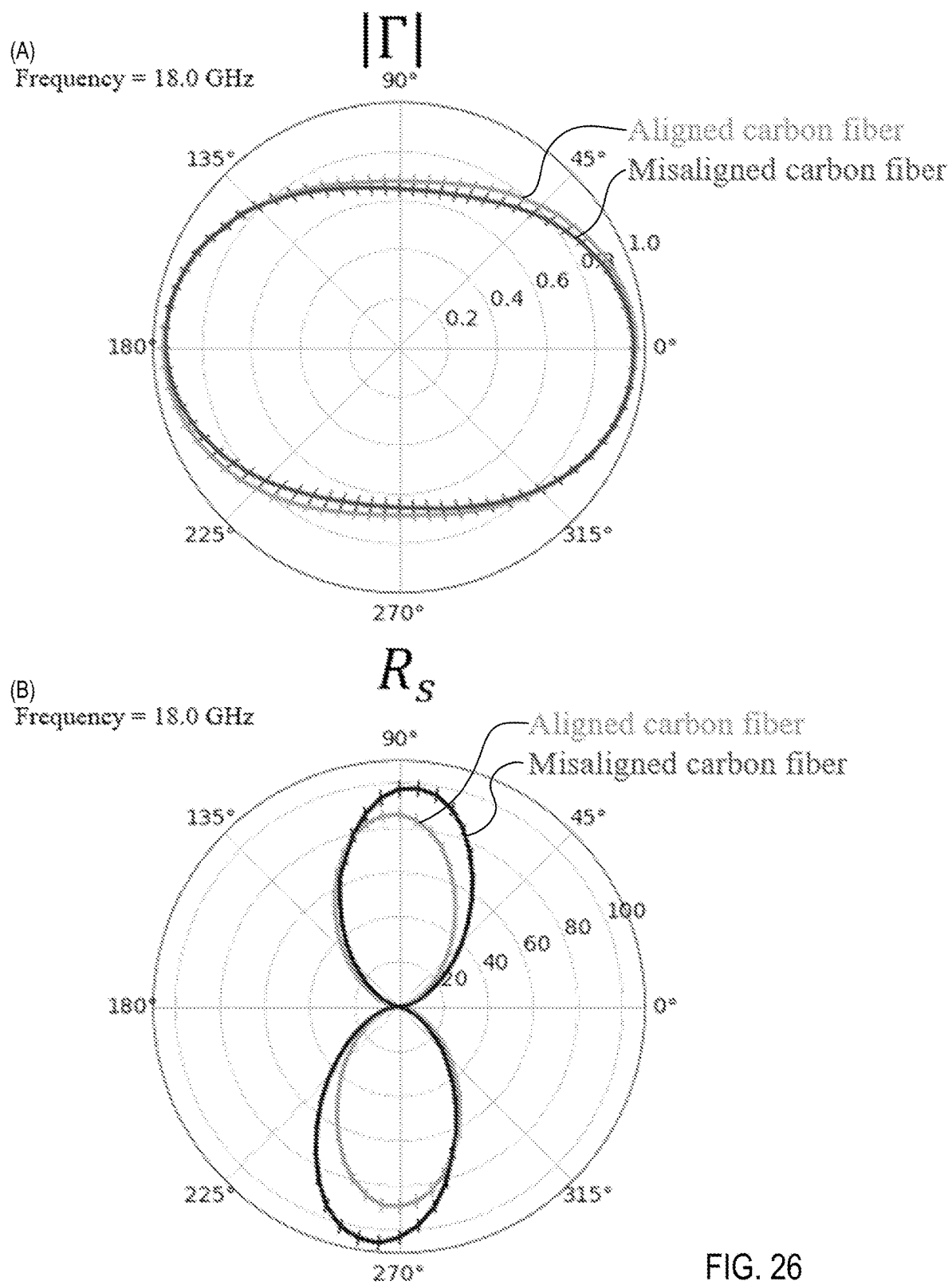
FIG. 26 shows, in panels A and B, measurements of an aligned and misaligned carbon fiber sample before and after mapping to sheet resistance.

In an embodiment, with reference to FIG. 17 through. FIG. 20, the process for performing microwave ellipsometry includes measuring a raw complex reflection coefficient at a polarization and with a distance between sensor 6 and sample 7, at a location on sample 7. A raw complex reflection coefficient is error corrected with the first-tier error box of the prior step cascaded with the S-parameters of the test head from step 1 to obtain an error-corrected magnitude of reflection coefficient $\Gamma$ and an angle of reflection coefficient $\Gamma$ for the material under test.

In an embodiment, with reference to FIG. 17 through FIG. 20, the process for performing microwave ellipsometry includes an optional step of repeating the immediate prior two steps for a plurality of sectors of calibrant 20.

In an embodiment, with reference to FIG. 17 through FIG. 20, the process for performing microwave ellipsometry includes an optional step of optimizing a finite element simulation to match the measurements of calibrant 20. Optimized parameters can include a distance between the sample 7 and the waveguide aperture 13, a thickness and complex permittivity of the dielectric spacer, and a boundary condition corresponding to the absorber under the dielectric spacer.

In an embodiment, with reference to FIG. 17 through FIG. 20, the process for performing microwave ellipsometry optionally includes implementing the sample in a finite-element simulation and the material properties of the simulated material-under-test are varied until the simulated error-corrected magnitude of reflection coefficient $\Gamma$ and an angle of reflection coefficient $\Gamma$ for the material under test match the corresponding measured quantities.

Scanning microwave ellipsometer 200 has numerous advantageous and unexpected benefits and uses. In an embodiment, with reference to Example 1, Example 2, and Example 3, a process for performing scanning microwave ellipsometry with scanning microwave ellipsometer 200 includes: receiving, by polarization controller 4, input electrical signal 10; producing, by polarization controller 4, polarization-controlled microwave radiation 30 from input electrical signal 10; receiving, by polarization controller 4, reflected microwave radiation 31 resulting from polarization-controlled microwave radiation 30; producing, by polarization controller 4, output electrical signal 11 from reflected microwave radiation 31; receiving, by transmission line 5, polarization-controlled microwave radiation 30 from polarization controller 4; producing, by transmission line 5, transmitted microwave radiation 32 from polarization-controlled microwave radiation 30; receiving, by transmission line 5, sensor-received microwave radiation 33 resulting from transmitted microwave radiation 32; producing, by transmission line 5, reflected microwave radiation 31 from sensor-received microwave radiation 33; receiving, by sensor 6, transmitted microwave radiation 32 from transmission line 5; producing, by sensor 6, sensor microwave radiation 34 from transmitted microwave radiation 32; controlling polarization of sensor microwave radiation 34 by polarization controller 4; subjecting sample 7 to sensor microwave radiation 34; receiving, by sensor 6, sample-reflected microwave radiation 35 from sample 7 that results from subjecting sample 7 with sample-reflected microwave radiation 35; producing, by sensor 6, sensor-received microwave radiation 33 from sample reflected microwave radiation 35; producing, by electrical signal measurement system 1, input electrical signal 10; communicating, by electrical signal measurement system 1, input electrical signal 10 to microwave ellipsometry test head 2; receiving, by electrical signal measurement system 1, output electrical signal 11 from microwave ellipsometry test head 2; producing, by electrical signal measurement system 1, electrical readout signal 12 from output electrical signal 11; producing, by electrical signal measurement system 1, position control signal 9; receiving, by position controller 8, position control signal 9 from electrical signal measurement system 1; adjusting relative position of sensor 6 and sample 7 based on position control signal 9; and scanning over surface of sample 7 with sensor microwave radiation 34 from sensor 6 as sensor 6 is moved relative to sample 7 to perform scanning microwave ellipsometry of sample 7.

The process further can include determining, from electrical readout signal 12, the polarization of reflected microwave radiation 31, magnitude of reflection coefficient $\Gamma$, and angle of reflection coefficient $\Gamma$ of sample reflected microwave radiation 35 from sample 7. The process can include adjusting, by position controller 8, relative position by moving sensor 6 relative to sample 7 selectively along three orthogonal linear directions and in three independent angular coordinates.

In an embodiment, the process includes calibrating scanning microwave ellipsometer 200 with microwave ellipsometer calibrant 20 by scanning sensor 6 over sectors over microwave ellipsometer calibrant 20 as microwave ellipsometer calibrant 20 is subjected to sensor microwave radiation 34; acquiring sample reflected microwave radiation 35 from microwave ellipsometer calibrant 20; and determining angle of reflection coefficient Γ and magnitude of reflection coefficient Γ for input electrical signal 10 acquired from output electrical signal 11 for sample reflected microwave radiation 35 from microwave ellipsometer calibrant 20 to produce correction factors to apply to an arbitrary output electrical signal 11 acquired from a sample 7.

Scanning microwave ellipsometer 200 and processes disclosed herein have numerous beneficial uses, including real-time process control and quality control for composite manufacturing, non-destructive imaging, sub-surface defect detection, and quantitative characterization of anisotropic electrical sheet resistance. These capabilities provide characterizing alignment and orientation of short conductive fibers in composite materials. Composites containing short conductive fibers (e.g., carbon fibers and carbon nanotubes) are involved in next-generation automotive and aerospace applications, where they offer improved mechanical and electrical performance and reduced weight. Unfortunately, the structural and electrical integrity of composite parts containing short conductive fibers can be limited by variation in the quality of the feedstock with which they are built. To avoid catastrophic failure, engineers can assume a worst-case performance for a batch of composite material. Material-screening provided by scanning microwave ellipsometer 200 is beneficial to tighten tolerance on composite feedstock and formed parts and provide lower cost, lower rate of catastrophic failure, or tighter tolerance for high-performance parts.

A conventional characterization technique for composites is eddy-current inspection that may not operate at high frequencies where the size of the eddy-current-excitation coil becomes comparable to the wavelength of the probing radiation. Increasing measurement frequency above the eddy-current excitation limit can be favorable when the thickness of a material under test is much less than the skin depth at the upper-frequency-limit of the eddy current technique. Scanning microwave ellipsometer 200 overcomes this frequency limitation, offering access to an advantageous frequency range. In addition, the sensitivity of an eddy-current technique decreases rapidly as the distance between an eddy-current-probe coil and a material-under-test increases. In an embodiment of scanning microwave ellipsometer 200 where sensor 6 is waveguide spot-focusing or gaussian-beam antenna 15, the distance between sensor 6 and sample 7 can be large compared to the distances available in an eddy-current technique, overcoming the sample-distance limitation.

Another conventional practice characterizing short-carbon-fiber composites is to image the material on a light table, but light table imaging does not provide quantitative sheet resistance data for analysis and light table imaging can fail when the host matrix is not optically transparent or if the material is too dense, which scanning microwave ellipsometer 200 overcomes.

Scanning microwave ellipsometer 200 and processes herein unexpectedly facilitate evaluation of composite materials and formed composite parts. This evaluation includes qualitative information about the alignment and orientation of conducting fibers in an insulating host matrix and quantitative evaluation of anisotropic electromagnetic materials properties. The capability to perform a unique combination of spatially-resolved, anisotropic electrical conductivity measurements, at microwave frequencies, with the option to incorporate a substantial standoff distance between the test head and a material under test, while also allowing for complex formed parts represents a novel departure from conventional processes. Moreover, the measurement speed of scanning microwave ellipsometer 200 is compatible with real-time composite manufacturing techniques, enabling real-time process optimization.

The articles and processes herein are illustrated further by the following Examples, which are non-limiting.

EXAMPLES

Example 1. Microwave Measurements for Anisotropic Materials Measurement

Applications of anisotropic composite materials range from construction composites to electric circuit boards. Anisotropic conductivity is one of the many important measurands for anisotropic composites for identifying misalignment. However, there are only a few non-destructive, non-contact techniques available. Here, we explore waveguide ellipsometry, a new electromagnetic characterization technique, and its application to conductive anisotropic composites. We demonstrate waveguide ellipsometry and discuss the design and implementation of a novel rotation test-head on a robotic arm. To validate our technique, we designed and fabricated test wafers with ideal anisotropic composites consisting of gold stripes on materials with varying sheet resistances. Finally, we map the measured scattering (S-) parameters to simulated S-parameters with help from composite theory and circuit modeling. Broader impacts of microwave ellipsometry include in-line measurement and conductivity imaging of large-scale and three-dimensional parts for nondestructive evaluation.

Typical anisotropic composites include two or more phases where the final material may have a blend of the properties (chemical, mechanical, or electrical) of the original constituents or even a property that is not present in either of the constituent materials (e.g., metamaterials). Narrowing the scope, there are several examples of thin conducting anisotropic composites, which include sheets of aligned carbon fibers, sheets of aligned carbon nanotubes, and metasurfaces. In these composites, the electrical conductivity can carry critical information about the anisotropic mechanical and thermal properties, making electrical characterization a useful engineering and quality control tool. More broadly, electromagnetic characterization is applicable when at least one material property (e.g., permittivity, permeability, or conductivity) is directional.

Specific electromagnetic characterization techniques for anisotropic materials include far-field free-space measurements and electromagnetic probing. Perhaps the first example of electromagnetic characterization applied to directionally dependent materials is microwave polarimetry. Microwave polarimetry is a radar technique where a transmitter or receiver rotates and results in an image of the environment (e.g., precipitation) between the two antennas. After microwave polarimetry, free-space techniques are extensive in literature, including work on two-port measurements, oblique incidence reflection measurements, one-port frequency shift measurements, and non-destructive inspection. There are reports of applications with non-destructive rectangular waveguide probing on uniaxial anisotropic dielectric materials, and biaxial anisotropic materials where both the permittivity and permeability are tensors.

More specific to thin conducting anisotropic composites, much of scientific literature focuses on eddy-current techniques. These techniques characterize anisotropic conductive composites by measuring the impedance of a coil of wire or multiple coils of wire in proximity to a material-under-test (MUT). In this case, the coil is treated as a lumped-element. This approximation breaks down as the wavelength of the probing radiation approaches the size of the probe coil, limiting the technique to lower frequencies (~100 MHz).

The scanning microwave ellipsometer herein characterizes conductively anisotropic materials, including composites, which we called waveguide ellipsometry and probes the conductive anisotropy of the MUT by measuring the reflection coefficient of a linearly polarized electric field ($\vec{E}$-field) incident on the MUT. The magnitude and phase of the reflected electromagnetic wave depend on the relative orientation of the anisotropic MUT and the polarization of the incident wave. Sweeping the incident polarization direction allows us to probe the material's bulk conductivity tensor (and potentially the permittivity or permeability for broader impact). The test-head includes a rotation joint to control the incident polarization direction. Finite-element simulation and composite theory analysis are employed to compute the waveguide fields in lieu of analytic expressions. The measurements and analysis are automated as a function of angle.

Waveguide ellipsometry is a non-contact, electromagnetic characterization technique (FIG. 19) to characterize material properties.

We designed, fabricated, and measured four different test wafers with quadrants designed to mimic both ideal isotropic and ideal anisotropic materials (FIG. 27). The test wafer substrates were 150 mm diameter fused silica wafers. The metal layers on top of the fused silica were gold (Au) and molybdenum disilicide ($MoSi_2$). We chose gold for its high conductivity and we chose $MoSi_2$ because the range of thicknesses available in our cleanroom produced a suitable range of sheet resistances. These sheet resistances were targeted to maximize the coverage of a smith chart relative to the $TE_{10}$ waveguide impedance.

Each test wafer had four quadrants of different conductor geometries (FIG. 27). Quadrant #1 had (10.0±0.5) µm wide continuous gold stripes on $MoSi_2$ on a fused silica substrate, quadrant #2 had (10.0±0.5) µm continuous gold stripes deposited on the fused silica substrate, quadrant #3 was a continuous layer of $MoSi_2$ with no gold stripes, quadrant #4 was a continuous layer of gold. The gold stripes had a center-to-center distance of (20.0±0.5) µm and were aligned to the defined $\hat{y}$-direction. These gold stripes served as an idealized representation of the conductive fibers in a composite material. Each of the four test wafers had the same four quadrant pattern, however, the thickness of the $MoSi_2$, both under the stripes (quadrant #1) and by itself (quadrant #3) ranged from 185 nm to 20 nm to achieve linearly spaced values of the magnitude of the reflection coefficient ($|\Gamma|$) between the test wafers (FIG. 27).

We fabricated the test wafers in a Class-100 cleanroom. All four test wafers used a two-layer deposition process, where layer one was $MoSi_2$ and layer two was Au. We started with a fused silica wafer that was cleaned with an $O_2$ plasma to remove organic contaminants from the surface. Next, we spun on a 1 µm lift-off resist (LOR) and 1 µm negative image resist stack to reduce fencing. We then exposed the photoresist with the pattern for layer one ($MoSi_2$) with a maskless aligner (MLA) and developed the resist in an auto-developer to remove resist in the regions for deposition. We deposited the first layer ($MoSi_2$) with a sputtering tool to have better control over deposition thickness compared to other available tools. Next, we performed a standard lift-off process including a wafer wash and a 60 s plasma clean before the deposition of the second layer. Before adding the photoresist, exposing the pattern, and developing the resist for second layer, we spun on a thin layer of adhesion promoter. We note that the plasma clean and adhesion promoter were critical for adhesion of photoresist to $MoSi_2$. The second layer consisted of a thin layer (20±5) nm of titanium (Ti) for adhesion and a thicker layer (approximately 200±10) nm of gold (FIG. 27). The gold was deposited with an electron beam evaporation tool. FIG. 27 lists measured values for the $MoSi_2$ thickness, the $MoSi_2$ sheet resistance, and the second layer (Au and Ti) thickness with the standard deviation for six measurements taken at different locations over the wafers.

The test wafers were designed to mimic the electrical behavior of real composites. In a fiber-reinforced composite the gold stripes are akin to the conducting fibers and the $MoSi_2$ is akin to a combination of conducting fibers that are misaligned, an electrical percolation network between aligned or misaligned fibers, and the conductivity of the matrix material. For the WR-42 waveguide aperture in this work, the smallest dimension of the waveguide is approximately 4.3 mm. This dimension is much larger than the fiber diameter in many conductive-fiber composites and also much larger than the width of the gold stripes in our test wafers. Since the fibers are small compared to the sampled volume, it is reasonable to average out these small features and treat the whole composite as an effective medium with an effective anisotropic conductivity tensor.

As implemented, our technique measured the complex reflection coefficient ($S_{11}$) as a function of angle for a conductive MUT. We used DC composite theory and finite-element simulations to verify the measurement with known material properties. For both the DC composite theory and the finite element modeling, we represented the MUT as a bulk effective medium with an anisotropic conductivity tensor. The effective medium was defined over a volume that included the gold stripes, the space between the stripes, and a thickness of $MoSi_2$ (FIG. 28).

With a suitable choice of axes, the bulk conductivity tensor can always be represented as a diagonal matrix, $$\sigma = \begin{pmatrix} \sigma_x & 0 & 0 \\ 0 & \sigma_y & 0 \\ 0 & 0 & \sigma_z \end{pmatrix} \tag{1}$$

where $\sigma_x$, $\sigma_y$, and $\sigma_z$ are the $\hat{x}$, $\hat{y}$, and $\hat{z}$ components of the conductivity tensor respectively. However, in the waveguide ellipsometry measurements, the direction of the electric field changes as the test head spins. To represent the orientation of the of the test wafer with respect to the test head, the conductivity tensor must be rotated by applying a rotation matrix. After applying a rotation matrix around the z-axis by some angle θ, the new conductivity tensor $\sigma_{rot}$ is, $$\sigma_{rot} = \begin{pmatrix} A & F & 0 \\ F & B & 0 \\ 0 & 0 & \sigma_z \end{pmatrix} \tag{2}$$

where A, B, and F are functions of the conductivity tensor components $\sigma_x$ and $\sigma_y$ and θ is the relative angle between the incident $\vec{E}$-field polarization and the fiber direction. These coefficients have the form:

$$A = \sigma_x \cos^2(\theta) + \sigma_y \sin^2(\theta),$$

$$B = \sigma_x \sin^2(\theta) + \sigma_y \cos^2(\theta),$$

$$F = \sin(\theta)\cos(\theta)(\sigma_x - \sigma_y). \quad (3)$$

where θ is the relative angle between the incident $\vec{E}$-field polarization and the fiber direction. This angle rotated conductivity tensor allows us to validate waveguide ellipsometry with full-wave modeling by simplifying the finite-element simulations in the next section. We can also use this form to extract the components $\sigma_x$ and $\sigma_y$ with DC simulation and equivalent circuit modeling.

To solve for the effective medium's conductivity tensor with DC composite theory, we modeled our anisotropic composite as a structure (green box in FIG. 28) with periodic boundary conditions. The volume was divided into cubic voxels with an edge length, a, of 5 nm. In the ŷ-direction, parallel to the gold stripes, there were $n_y=5$ voxels. This number was arbitrary, as the fields were taken to be constant along this direction. In the x̂-direction, perpendicular to the gold fibers, there were $n_x=4000$ voxels, corresponding to 20. The boundary condition in the x̂-direction was placed in the middle of the gold stripe, resulting in two 5 gold stripes on either side of a 10 gap of air (FIG. 3(a)). Finally, the ẑ-direction had $n_z=40+t/a$ voxels, corresponding to 200 nm of gold, and a thickness t (nm) of MoSi$_2$ (FIG. 27).

Each voxel was assigned an effective conductivity based on the ratio between gold and MoSi$_2$. The first four anisotropic materials we modeled and measured had some thickness, t, of MoSi$_2$. The conductivity of gold ($\sigma_{gold}=3.95 \cdot 10^7$ S/m) and MoSi$_2$ was normalized by the MoSi$_2$ conductivity ($\sigma_{MoSi_2}=1.39 \cdot 10^5$ S/m). The conductivity of the deposited gold was measured with an on-wafer multiline TRL technique and the conductivity of the MoSi$_2$ was measured with a four-point probe on the blanket films of each test wafer (quadrant #3 in FIG. 20). In the DC composite theory simulations, we took the conductivity ratio between gold and MoSi$_2$ to be 280:1 ($\tilde{\sigma}_{gn}:\tilde{\sigma}_{Mn}$, respectively).

The DC composite theory simulation computed the bulk conductivity tensor from the model of the composite (FIG. 28) and the conductivity ratio. The simulation calculated the voltage at each node and solved the current continuity equations to satisfy the boundary conditions and minimize the dissipated energy over the full system.

To verify the DC composite theory simulation, and to make the analysis more available, we derived circuit models to calculate the conductivity tensor. Although the models in FIG. 28 were simple, they qualitatively agree with our understanding of how the current spreads out into the composite when the $\vec{E}$-field is parallel and perpendicular to the stripes.

The resistances of each material in the circuit model are related to their length (l), area (A) defined by voxels (FIG. 28), and normalized material conductivity ($\tilde{\sigma}_{material}$):

$$R = \frac{l}{\tilde{\sigma}_{material} A} \quad (4)$$

The relationship between the circuit model resistivity and the effective circuit conductivity in a given direction is:

$$\sigma_c = \frac{1/R}{\left(\sigma_{material}\left(\frac{A}{l}\right)_{material}\right)\left(\frac{l}{A}\right)_{total}} \quad (5)$$

where $\sigma_{(x, y, \text{ or } z)} = \tilde{\sigma} \cdot \sigma_{MoSi_2}$, and R is the total resistance of the circuit model. We used the dimensions defined in FIG. 28 to find the A and l components of the circuit conductivity in the ŷ-direction ($\sigma_{yc}$) and simplified the expression:

$$\tilde{\sigma}_{yc} = \tilde{\sigma}_{gn}\left(\frac{\left(\frac{10000}{a}\right)\left(\frac{200}{a}\right)}{n_y}\right) \quad (6)$$

$$+ \tilde{\sigma}_{Mn}\left(\frac{\left(\frac{t}{a}\right)\left(\frac{200000}{a}\right)}{n_y}\right)\left(\frac{n_y}{\left(\frac{200}{a}+\frac{t}{a}\right)\left(\frac{20000}{a}\right)}\right)$$

$$= \frac{(100)\tilde{\sigma}_{gn}+(t)\tilde{\sigma}_{Mn}}{200+t}$$

Earlier, we defined $\tilde{\sigma}_{gn}=280$ and $\tilde{\sigma}_{Mn}=1$, therefore for small values of t, $\tilde{\sigma}_{yc} \approx \tilde{\sigma}_{gn}/2$, while for our largest values of t, $\tilde{\sigma}_{yc} \approx \tilde{\sigma}_{gn}/4$. A similar approach was implemented to calculate the conductivity $\tilde{\sigma}_{xc}$ (FIG. 28), where along the x-axis, the gold and MoSi$_2$ are first in parallel with some parallel resistance, $R_p$, which is in series with a section of $R_{MoSi_2}$, again in series with a parallel resistance, $R_p$:

$$\sigma_{xc} = (2R_p + R_{MoSi_{2x}} + 2R_p)\left(\frac{l}{A}\right)_{total} \quad (7)$$

$$= \frac{2t(200\ \tilde{\sigma}_{gn}+t)}{(2t+200\ \tilde{\sigma}_{gn})(200+t)}$$

where the parallel circuit has a resistance $R_p$, based on the physical dimensions along the x-axis:

$$R_p = \frac{n_x}{n_y\left(\frac{200\ \tilde{\sigma}_{gn}}{a}+\frac{t\ \tilde{\sigma}_{gn}}{a}\right)} \quad (8)$$

and the MoSi$_2$ resistance ($R_{MoSi_2}$) is:

$$R_{MoSi_{2x}} = \frac{n_x}{n_y\left(\frac{t\ \tilde{\sigma}_{Mn}}{a}\right)} \quad (9)$$

The above results are specifically for the anisotropic materials with a layer of MoSi$_2$. The last anisotropic material (quadrant #2) had gold stripes on fused silica with no MoSi$_2$. In this case, the DC composite theory simulation breaks down because it was based on conductivity ratios and there was only a single material with a finite conductivity in the simulation. For this case, we took $\sigma_y=\sigma_{gold}/2$ because the space between the Au stripes was equal to the width of the stripes, reducing the effective conductivity by half. We also took $\sigma_x=0$ S/m because the Au stripes were not electrically connected in the x direction in the absence of MoSi$_2$ layer. Finally, we compare measurement to theory with the help of full-wave finite-element-method (FEM) simulation.

Figure 29:
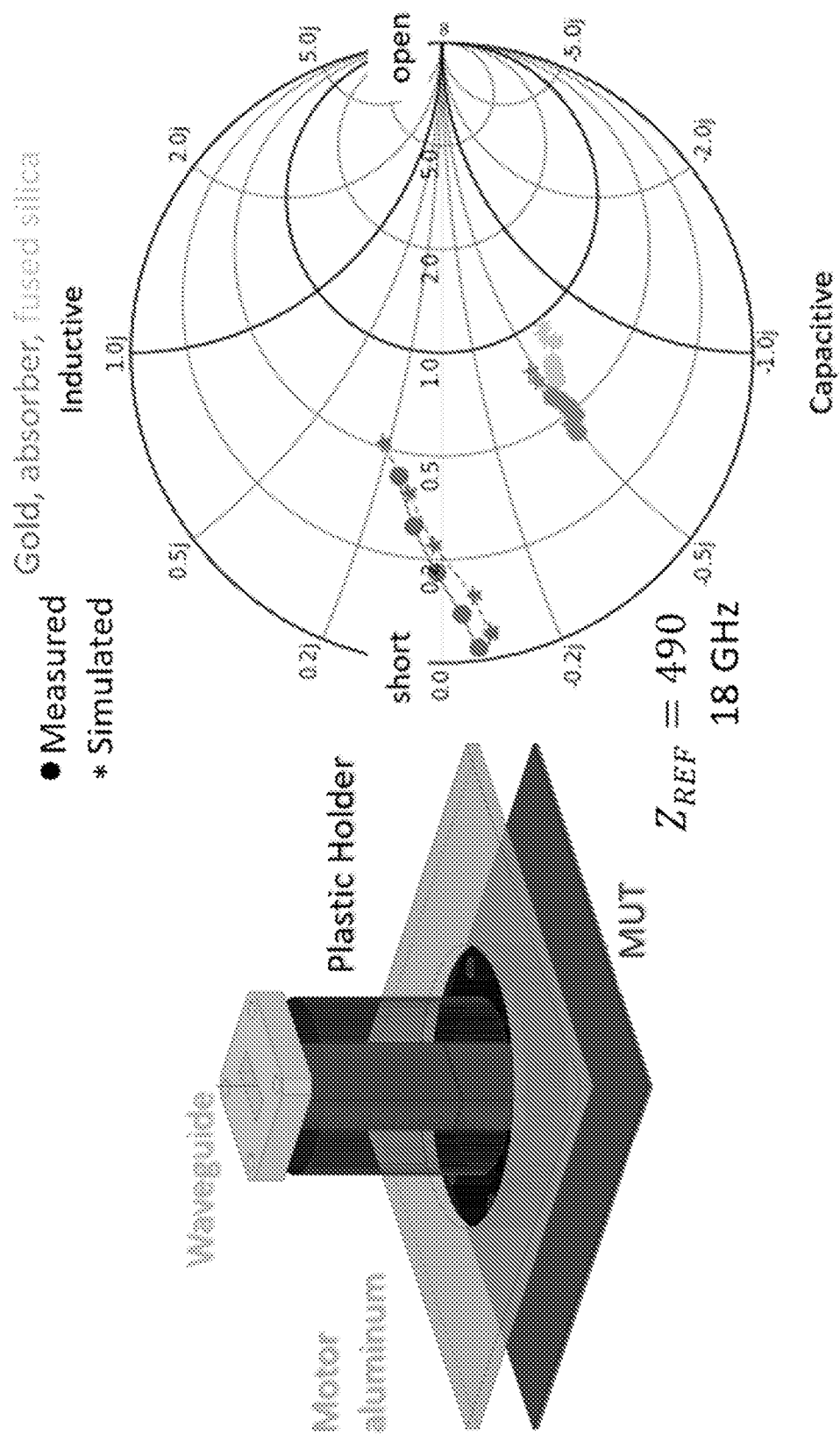
FIG. 29 shows an overview of a full wave simulation with a (a) schematic of the full wave simulation including the material-under-test, the waveguide, the plastic holder, and a box representing the aluminum motor, and (b) match between measurement (solid line with circles) and simulation (dotted line with stars) for the control samples (absorber, fused silica, and gold) over 5 measured heights: (0.3, 0.8, 1.3, 1.8, 2.3) mm.

The full-wave FEM simulations modeled the measurement setup and calculated the S-parameters from the DC conductivity tensor (FIG. 29). The full-wave simulation used an FEM solver to calculate the electromagnetic fields over a specified mesh. To make the simulations as accurate as possible, we imported a 3D model of the rectangular waveguide and the plastic holder on the test-head. We did not import the 3D model of the aluminum motor (pictured in FIG. 30) because its features were complex to mesh. Instead, we defined a box of aluminum approximately equal in size to the motor in ($\hat{x}$, $\hat{y}$) (FIG. 29) to capture its effect on the electromagnetic fields. Next, we defined a wave port and excited the fundamental $TE_{10}$ mode (with a $Z_{pv}$ power-voltage characteristic impedance [25]) at one port of the rectangular waveguide and de-embedded the excitation port by the length of the waveguide. In this case, de-embedding means correcting for the phase and attenuation of the simulated signal. The result is to change the reference plane of the simulation to match the same plane in the measurement.

The simulated waveguide was at a height, h, above the MUT, which had a thickness, $t_{MUT}$, and assigned material properties (e.g., conductivity, permittivity). In simulation and measurement, we varied h to understand the impact on our measurements. When we simulated the test wafers, we included a 500 μm thick piece of fused silica under the MUT layer (simulated separately because it was not part of the composite). Behind the fused silica layer, we had an air volume whose thickness was equal to the thickness of the Rohacell slab. Rohacell is highly porous and can be treated as air at these frequencies and measurement conditions. After the air volume, we included the absorber (FIG. 19) and the planarizing table (FIG. 19) in the measurement setup, modeling them as a volume of air and conducting boundary condition, respectively. We set the convergence criteria to be a fractional S-parameter error of 1% and specified the maximum mesh size to be b/10, where b is the smaller dimension of the WR-42 waveguide.

Our MUTs were either isotropic (film of uniform material) or anisotropic (gold stripes on a less-conductive thin film). The isotropic materials were simple to simulate because they had isotropic conductivity (e.g., gold) or permittivity (e.g., fused silica), hence results were not dependent on the angle, θ, of the $\vec{E}$-field polarization. For these uniform samples we simulated the S-parameters as a function of height offset (h) and matched them to measurement to define the parameters: distance between the waveguide flange and the material surface, Rohacell and absorber thickness, and permittivity of fused silica wafer (FIG. 29).

The isotropic gold behaved as a short circuit reflect, however it was not a perfect reflect (|Γ|=1) because there was a gap between the waveguide flange and the materials. This gap allows some of the reflected wave to scatter away from the waveguide flange, but a gap is necessary to make non-contact measurements of the MUT. We measured the gap with shims and verified the physical measurement by parameterizing the offset in the simulation. We parameterized the simulation to verify the physical measurement because the measurement had a large uncertainty associated with it. Next, we measured the thickness of Rohacell and absorber and simulated it as a volume of air backed by a conductive boundary (conductivity of aluminum). Like our procedure for gold, we parameterized this air thickness to verify the physical measurement. Finally, we measured a bare fused silica wafer and parameterized the permittivity in simulation to match measurement. Once these physical parameters were set, we set up the simulation for our anisotropic MUTs.

We parameterized the orientation (θ) of the conductivity tensor of the MUT, where $\sigma_x$ and $\sigma_y$ were obtained from 3D DC composite simulation and circuit analysis in the previous section. Since these results were so close, we show simulations performed with the effective-medium conductivities from composite theory. We compare the simulated S-parameters with the measured S-parameters in the results (Section IV).

We tested the waveguide ellipsometry method with the following step-by-step procedure: 1. Measure short-open-load calibration standards at both a coaxial reference plane before the rotation joint and at the waveguide probe reference plane, then extract the S-parameters of the test-head. This step is only performed once. 2. Measure short-open-load calibration standards at the coaxial reference plane before the rotation joint to calibrate the VNA. This step is performed before each measurement campaign. Set standard sweep parameters for the measurements. All measurements are over 16 (x, y)-positions, 5 heights (h), 73 angles (θ, 5° steps), and 51 frequency points spaced linearly between 18 GHz and 26.5 GHz. The 16 (x, y)-positions were distributed over the sample and far enough from all edges to minimize edge effects. 3. Place the MUT in the measurement setup between the waveguide flange and the absorptive material (FIG. 19). 4. Measure the one-port S-parameters of the four test wafers and their quadrants. 5. Calibrate the raw measurements to the WR-42 reference plane with the S-parameters extracted in steps (1) and (2). 6. Average the calibrated S-parameters over the 16 different (x, y)-positions for each sample. 7. Match the measurement and simulation for the isotropic MUTs as a function of height offset between waveguide and MUT and frequency. We started with isotropic gold, absorber, and fused silica measurements. In simulation, we parameterized the following variables to assign values to physical parameters. (a) height offset from the gold measurement, (b) absorber and Rohacell height from the absorber measurement, and (c) permittivity of the fused silica from the fused silica wafer measurement. 8. Run the full-wave 3D simulation with a 200 nm thick MUT, and parameterize the conductivity over $10^9$ S/m to $10^{-9}$ S/m with 10 points at each decade. 9. Create a mapping function between the simulated S-parameters and the sheet resistance of the material. 10. Convert from measured S-parameters to sheet resistance with the mapping function. 11. Calculate the conductivity tensor components with a 3D composite simulation and/or circuit analysis then compare to results of mapping function. 12. Run the full-wave 3D simulation with conductivity tensor components obtained from 3D composite theory and circuit analysis and compare to measurement.

The calibration for waveguide ellipsometry moved the reference plane from somewhere inside the VNA to the end of the WR-42 waveguide for each angle position. The calibration procedure was a two-tier calibration (FIG. 30). The first-tier was a standard short-open-load (SOL) coaxial calibration to move the reference plane to the coaxial connector before the test-head. The second-tier was a WR-42 SOL calibration that rolled the reference plane to the end of the test-head as a function of angle, to account for any affects from the rotary joint on the robot arm that rotated the waveguide. We divided the calibration into two-tiers because measuring the WR-42 SOL standards required dismantling the test-head for each measurement.

Before each material measurement, we performed the first-tier calibration with a 2.4 mm coaxial short-open-load (SOL) calibration. The robot was in the same (x,y,z)-position for each calibration and the first MUT measurement position. Next, we rolled the reference plane from the first-tier reference plane to the WR-42 waveguide flange with the test-head's S-parameters. To obtain the S-parameters of the test-head, we measured WR-42 SOL components for each of the 73 angle positions and corrected them to the 2.4 mm reference plane. The S-parameters of the test-head are related to the model of the WR-42 calibration devices and the measured S-parameters by:

$$\Gamma_{meas} = S_{11} + \frac{\Gamma_T S_{12} S_{21}}{1 - S_{22}\Gamma_T} \quad (10)$$

where $\Gamma_T$ is the reflection coefficient of a given termination, which includes a short, matched load, and an open. $\Gamma_{meas}$ is the measured reflection coefficient for the loads corrected to the 2.4 mm reference plane. The three terminations can be expressed by a set of linear equations:

$$\begin{pmatrix} \Gamma_{ms}(\theta) \\ \Gamma_{mo}(\theta) \\ \Gamma_{ml}(\theta) \end{pmatrix} = \begin{pmatrix} & S_{11}(\theta) & \\ & S_{22}(\theta) & \\ S_{11}(\theta)S_{22}(\theta) - S_{12}^2(\theta) \end{pmatrix} \begin{pmatrix} 1 & \Gamma_{ms}(\theta)\Gamma_s(\theta) & -\Gamma_s(\theta) \\ 1 & \Gamma_{mo}(\theta)\Gamma_o(\theta) & -\Gamma_o(\theta) \\ 1 & \Gamma_{ml}(\theta)\Gamma_l(\theta) & -\Gamma_l(\theta) \end{pmatrix} \quad (11)$$

where the subscripts ms, mo, and ml indicate measurements for the short, open, and load calibration devices, respectively. The subscripts s, o, and l indicate the models for the short, open, and load devices, respectively. $S_{11}(\theta)$, $S_{22}(\theta)$, $S_{12}^2(\theta)$ are the components of the test-head's S-parameters. After we calibrated the reflection coefficient to the 2.4 mm reference plane, we translated the reference plane to the end of the WR-42 waveguide by modifying the S-parameters as:

$$\Gamma_c = \frac{\Gamma_m - S_{11}(\theta)}{S_{22}(\theta)\Gamma_m - S_{11}(\theta)S_{22}(\theta) + S_{12}(\theta)} \quad (12)$$

where the subscript c indicates the reflection coefficient corrected to the end of the waveguide, the subscript m is the measured reflection coefficient corrected to the 2.4 mm coaxial reference plane, and the S-parameters are those of the test-head (11). FIG. 30 shows the effect on the magnitude and phase of the reflection coefficient for all the isotropic materials including: gold, absorber, fused silica, and all MoSi$_2$ thicknesses.

The calibration procedure was important for the measurements because the measurements of the MUT are affected by different systematic errors along the measurement path. We removed these errors by calibrating the data (FIG. 30). For example, at the first reference plane with no calibration the data for different MUTs look very similar. After the first-tier calibration that translates the data to the 2.4 mm reference plane the data for the different MUTS becomes distinguishable. Taking this even further by applying the second-tier calibration to move the reference plane to the end of the test-head we can finally model this measured data in simulation and understand the effect of anisotropic electrical properties on the actual measurement.

To perform the measurements, we connected the test-head to a 40 GHz vector network analyzer (VNA). The waveguide aperture had to rotate relative to the MUT, hence the test head included a rotary motor, a phase-stable coaxial RF rotary joint, a 2.4 mm coaxial to WR-42 waveguide adapter, and a 2-inch section of waveguide that terminates in air. The test head was attached to a robotic arm via a 3D-printed housing (see FIG. 1).

Figure 19:
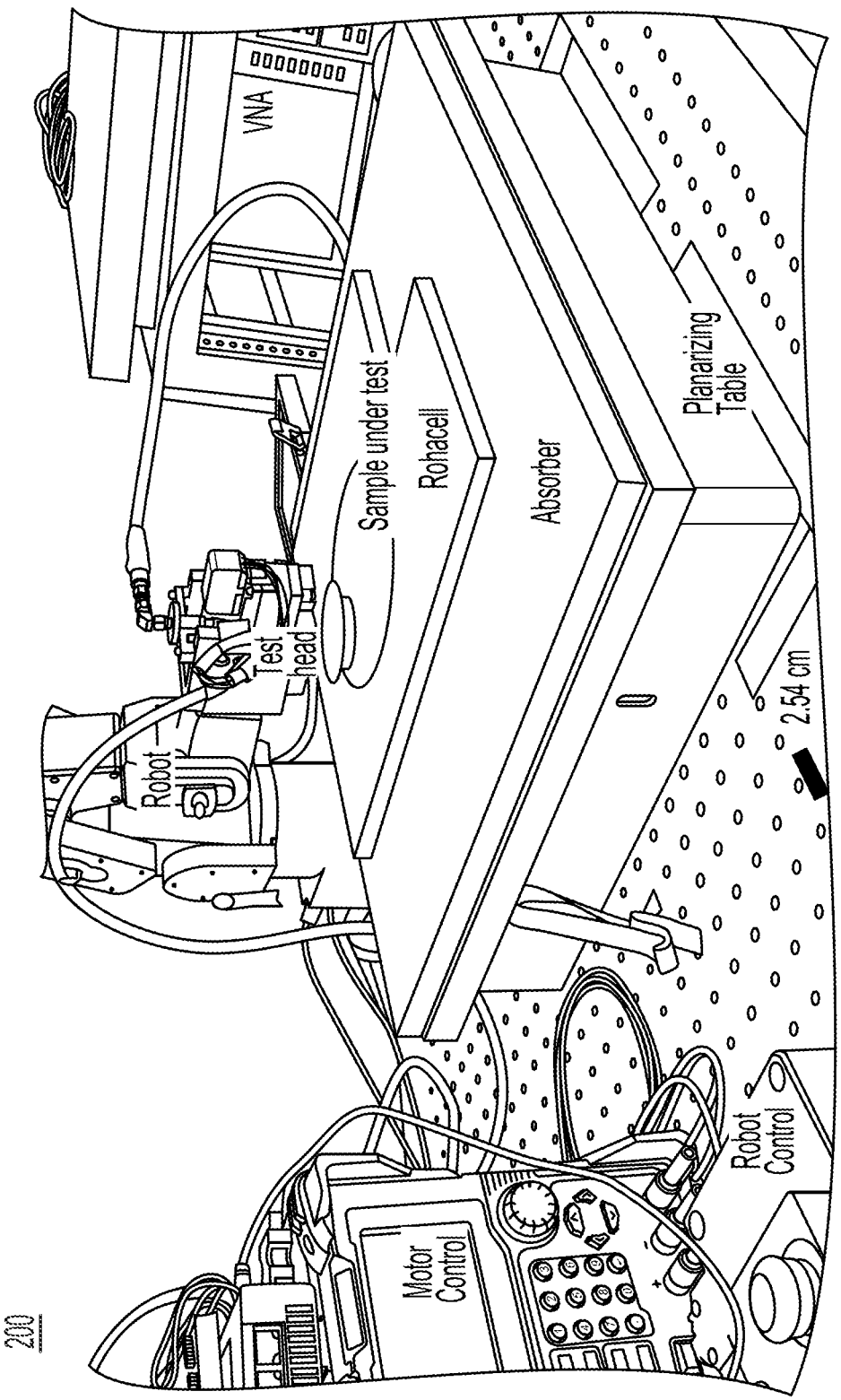
FIG. 19 shows a scanning microwave ellipsometer.

The robotic arm was set to (x, y, z)-coordinates with a 5 μm repeatability. The MUT was placed above a (10.2±0.5) mm thick piece of Rohacell ($\epsilon_r$=1) and a (18±5) mm thick piece of foam absorber (FIG. 19). Both the absorber and the Rohacell layers were much larger in the (x, y)-plane than the MUT. We added the Rohacell layer to serve as a stand-off, because an absorber is difficult to simulate and understand in the near-field. The Rohacell moved the absorber into the far-field and allowed us to simulate the setup as air on top of the aluminum table. The absorber was secured by silicone caulking on the edges to the metal table, whose surface was parallel to the waveguide probe aperture.

After securing the test-head to the robot and completing the absorber-Rohacell platform, there were four variables that we tested for each measurement: (x, y)-location, (z)-height (h), angle, and frequency, as described in the step-by-step procedure. The measurement setup was automated, iterating over robot position, relative angle position, and VNA data acquisition. We found that as we increased the height offset h, the change in reflection coefficient between the most reflective (gold) and the least reflective (absorber) decreased. Because of this, we chose to focus on the lowest frequency (18 GHz) and the smallest height gap, though we note that the analysis procedure would be similar for any height or frequency.

We showed the functionality of waveguide ellipsometry and created a mapping function with simulation between measured S-parameters and a bulk conductivity. These outcomes required developing a new procedure that measured the MUT as a function of angle, calibrated the data, and used composite theory in conjunction with full-wave simulation to verify the measurements and map them to material properties.

Figure 31:
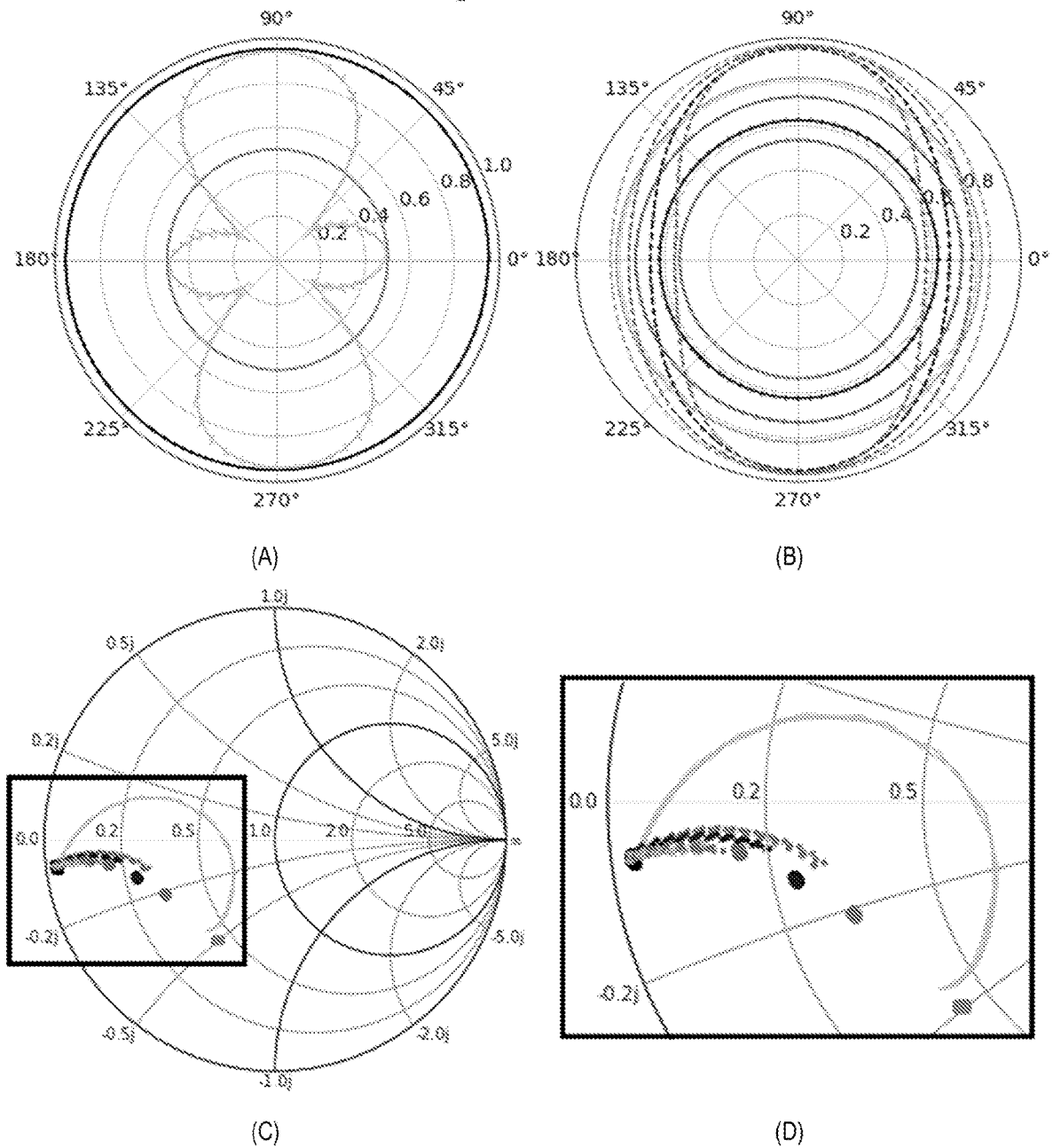
FIG. 31 shows calibrated measurements for control and test samples including the gold, fused silica, different thickness of $MoSi_2$, gold stripes on fused silica, and gold stripes on different thickness of $MoSi_2$. Samples were separated into (a) isotropic gold and absorber and gold stripes on fused silica, and (b) the isotropic $MoSi_2$ films and gold stripes on $MoSi_2$ films. The polar plot of the magnitude of the reflection coefficient has uncertainties equal to the standard deviation of the measurement between all 16 (x,y)-positions. The same data are represented in (c) a Smith chart of the complex impedances for each MUT and (d) a blown-up section of the Smith chart for better visibility.

It is useful to visualize the calibrated data of the anisotropic wafers in two different ways. The first is the magnitude of the reflection coefficient ($|\Gamma(\theta)|$) as a function of angle in a polar plot (FIG. 31). This plot is an intuitive way to visualize how the relative angle, θ, affects the measurement. However, the reflection coefficient is a complex number, so by just analyzing $|\Gamma(\theta)|$ we are ignoring the fact the electrical signal changes its magnitude and phase after reflecting off the MUT. A Smith chart allows us to visualize both magnitude and phase information (FIG. 31), but it is more difficult to discern the angle dependence. The isotropic materials on our test wafers have a reflection coefficient that does not vary with angle, which corresponds to a circle on the polar plot (FIG. 31) and clustered points on the Smith chart (FIG. 31). The anisotropic materials have a reflection coefficient that is a function of angle, which corresponds to a non-circular shape on the polar plot and an approximate arc on the Smith chart.

Both plots include the MUTs on the four wafers with a data point for each angle averaged over the 16 ($\hat{x},\hat{y}$)-plane positions. The uncertainty (shown in FIG. 31) is the standard deviation for each angle over these 16 positions. The upper-boundary on the reflection coefficient is set by the gold measurement (blue lines in FIG. 31 and blue points in FIG. 31), $|\Gamma|\approx1$ where some power was scattered away from the waveguide flange because of the height offset. The fused silica wafer is $|\Gamma|\approx0.5$ (pink lines in FIG. 31 and pink points in FIG. 31), and the absorber is $|\Gamma|\approx0.35$ (gray points in FIG. 29). The thickness of the MoSi$_2$ layers is inversely proportional to $Z_L$, so that the thickest MoSi$_2$ (smaller $Z_L$, green points in FIG. 31) was closer to gold, and the thinnest MoSi$_2$ (bigger $Z_L$, brown points in FIG. 31) was closer to fused silica, with an approximately linear spread in the value of $|\Gamma|$ between them. The anisotropic gold fiber samples have a reflection coefficient that depends on angle. The gold stripes on MoSi$_2$ (dotted lines in (FIG. 31 are elliptical on the polar plot and are bounded by the gold(90°) and their respective MoSi$_2$ thickness (0°). The gold stripes on the fused silica (gold lines in FIG. 31) have a maximum at the gold boundary (90°), move toward a resonance at approximately 45°, and finally converge to the fused silica boundary at 0°.

The data in FIG. 31 is useful for relative measurements. For example, one would expect a composite with well-aligned conductive fibers to have a high electrical anisotropy. Such a composite would be expected to behave like the gold stripes without $MoSi_2$. In contrast, a composite with random fiber orientations would likely look more isotropic, like one of the blanket films of gold or $MoSi_2$.

While qualitative comparisons might find applications in quality assurance or process control for composite manufacturing, it is preferable to map these relative measurements to material properties. To verify our measurement with known material properties, we combined full-wave simulation and composite theory. The simulation section outlined how we matched the isotropic MUTs, gold, fused silica, and absorber as a function of height (FIG. 29) to decrease the number of unknown parameters in the measurement setup. Next, we defined a MUT with a conductivity tensor with tensor components $\sigma_x$ and $\sigma_y$ from 3D composite simulation and circuit models. Because the values for the tensor components are so similar, we show the simulation with the 3D composite simulation results. We converted these conductivity tensor components to bulk sheet resistance $R_{sx}$ and $R_{sy}$, which are easier to compare over MUTs of different thicknesses (Table 2). The uncertainties were calculated based on the measurement uncertainty of the $MoSi_2$ thickness (rounded to the nearest nm for the simulation) (FIG. 27).

Looking at (FIG. 33) the three composites showed a reasonable match between measurement and simulation. We calculated the vector magnitude, the magnitude between the measurement and simulation defined by their real and imaginary parts, (FIG. 33). As the conductivity of the $MoSi_2$ layer decreases, the match between simulation and measurement gets worse. The worst case is gold stripes on bare fused silica. There are three possible reasons why there is a difference between simulation and measurement. The first is the conductivity tensor calculated from composite theory was calculated at DC and did not take frequency into account. The second reason is the DC simulation and circuit analysis do not take any capacitance between the fibers or inductance along the fibers into account. The final source of error is that the measurement is sensitive to the orientation of the wafer, which is oriented relative to the waveguide by hand. Mis-orientation of this nature was not part of the simulation and would affect the gold stripes on fused silica the most, because there is the largest angle-dependent difference in the S-parameters for the most anisotropic samples.

From the conductivity tensor components (FIG. 32) and the match between measurement and simulation (FIG. 33), it is clear that the measurement is sensitive to anisotropy in the conductivity tensor. It is also clear that it is possible to estimate the conductivity tensor of an MUT by sweeping the conductivity in a FEM simulation and comparing to measurements. With the simulation setup that emulated the measurement setup, we simulated a range of isotropic MUTs with a thickness of 200 nm and parameterized the isotropic conductivity between $10^9$ (S/m) and $10^{-9}$ (S/m) with 10 points for each decade (120 points in total) (gray line FIG. 34). We fit a phenomenological function with four fitting parameters a, b, c, and d to map between the sheet resistance and the real part of the reflection coefficient:

$$\mathbb{R}(\Gamma) = \frac{d}{a - e^{-b \cdot R_s}} - c, \quad (13)$$

where $\alpha=1.14$, $b=8.69*10^{-4}\Omega^{-1}$, $c=0.15$, and $d=-0.11$.

Figure 34:
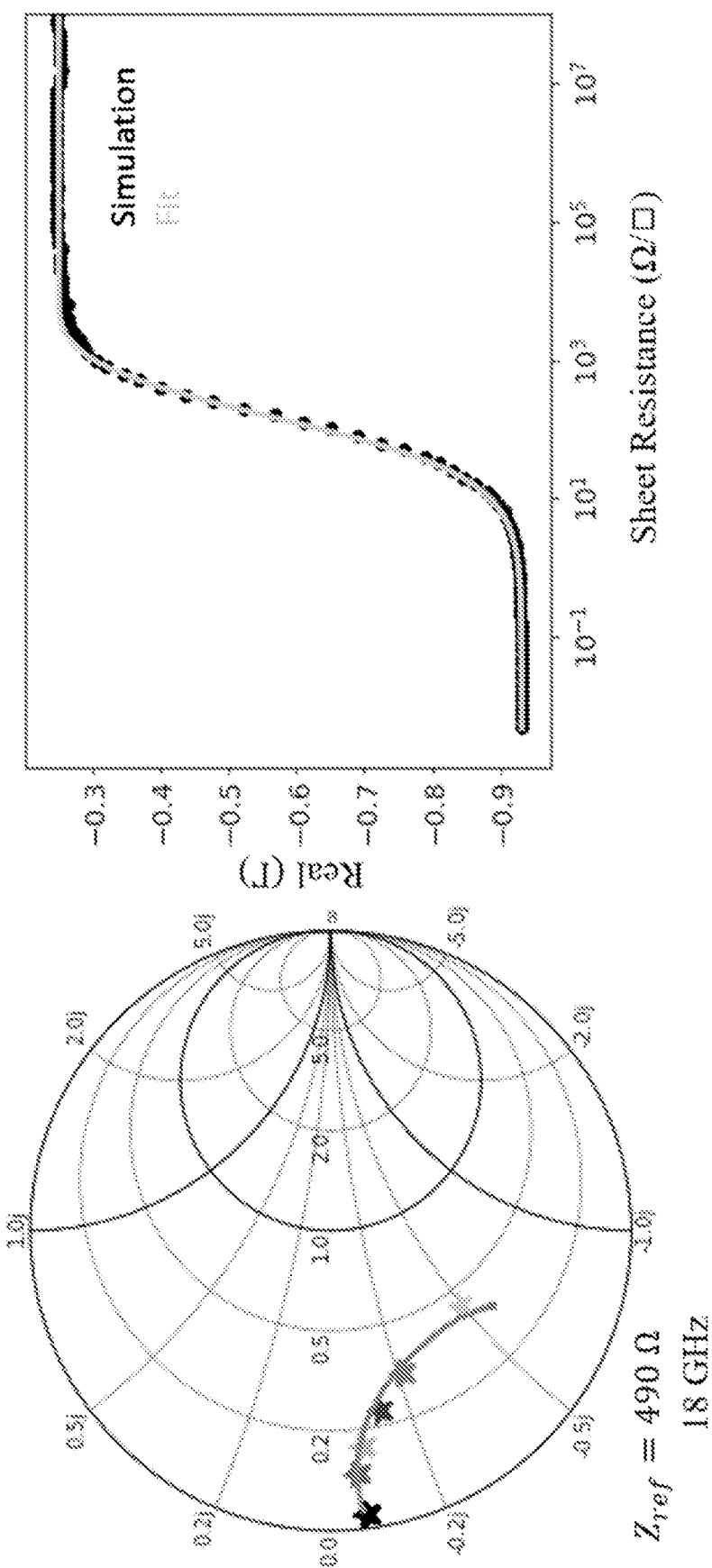
FIG. 34 shows a mapping function (a) (gray line) extracted with simulation between complex S-parameters and a 200 nm MUT with an isotropic conductivity with 320 points between $10^9$ (S/m) and $10^{-9}$ (S/m). The stars are the measured response of the isotropic materials gold, $MoSi_2$ of 185 nm, 80 nm, 45 nm, and 20 nm, and bare fused silica. (b) The mapping function between $\mathbb{R}(\Gamma)$ and the bulk sheet resistance ($\Omega/\square$)

From FIG. 34, we note that the measurement is not sensitive to significant changes to the conductivity tensor when the conductivity $\sigma_y$ is above $\sim 10^5$ Wm. For the thicknesses and conductivities of these materials, the sheet resistance is small compared to the waveguide impedance (FIG. 34). In this regime the materials all act like short-circuit reflects, making them difficult to distinguish. Because larger conductivities (smaller sheet resistances) are ill-conditioned, we only used the mapping function (FIG. 34) to extract the sheet resistance across the stripes, $R_{sx}$ (Table 2) as well as the uncertainty in the measurement as the test-head rotates (e.g., 0°, 180°, and 360°). The sheet resistance between the three different techniques were all within the uncertainty for the first three wafers. As noted earlier, the circuit model and DC simulation do not take capacitance or inductance into account as a function of frequency. This frequency dependence becomes more apparent as we increase the sheet resistance (decrease the thickness of the $MoSi_2$) and compare the theoretical results to the mapping function. For wafer #4 and bare gold stripes on fused silica, the theoretical values are larger than the mapping function, suggesting that the DC simulation does not account for additional parasitic circuit elements at high frequencies, such as capacitance between the gold stripes.

We can also characterize materials such as carbon fiber composites with a sheet resistance mapping function developed from the test wafers developed here. For example, compact circuit models might replace the full-wave electromagnetic simulation, which might simplify the analysis and increase the utility of our technique.

We demonstrated a non-contact electromagnetic characterization technique that we called waveguide ellipsometry. Our analysis verified the measured reflection coefficient with composite theory and simulation using the calculated effective conductivity tensor of thin conducting anisotropic composites. We automated our measurements of the complex reflection coefficient by developing a motorized test-head to change the angle of the $\vec{E}$-field with respect to the MUT. We explained how to relate our complex reflection coefficient as a function of angle to composite theory. To validate the technique, we designed, fabricated, and measured several test wafers that included both isotropic and anisotropic materials. Next, we validated the effective material properties obtained from waveguide ellipsometry against those from composite theory and circuit modeling. We found that the bulk sheet resistance components extracted with circuit model theory, DC composite simulations, and the mapping function agreed over all four test wafers. However, we also concluded that the measurement is not sensitive to significant changes to the conductivity tensor when the sheet resistance of the sample is below $\sim 10\Omega/\square$, which is a limitation of this particular setup.

We tested a microwave ellipsometer for measuring thin conducting anisotropic composites and related our measurements to conductivity through a combination of simulations and composite theory. Such tools will be useful for nondestructive testing, inline process control, and quantitative imaging of conducting sheets used in next-generation composites manufacturing.

Example 2. Nondestructive, Noncontact Quantification of Carbon Fiber Alignment and Orientation by Microwave Ellipsometry Short-fiber composites facilitate the manufacture of tailorable feedstock for small formed parts. In these composites, the alignment and orientation of the short fibers must be controlled to achieve the desired composite properties. To realize this control, process engineers need a fast, nondestructive, noncontact in-line measurement technique that quantifies alignment and orientation as the material is produced for on-the-fly feedback. Such a technique would enable real-time control of processing variables, resulting in higher quality composites. Here, we describe high-speed microwave ellipsometry to measure alignment and orientation. To evaluate our approach, we measured five short-fiber composites samples made from a four-layer stack of carbon-fiber mats. These samples included one known control sample and four blind samples that were unknown at the time of testing. The four blind samples were known to be either a control, a sample with all layers rotated by 5°, a sample with a single unknown layer rotated by 5°, or a sample with a single unknown layer rotated by 15°. Our results demonstrated effectiveness of this technique and discuss a path for real-time, large-scale imaging of fiber alignment and orientation.

To realize commercial tailorable feedstock, materials engineers need to produce highly aligned layers of fibers and they need to control the orientation of each layer in the ply feedstock. This implies that there are at least two process variables of interest: fiber alignment and fiber orientation.

Figure 35:
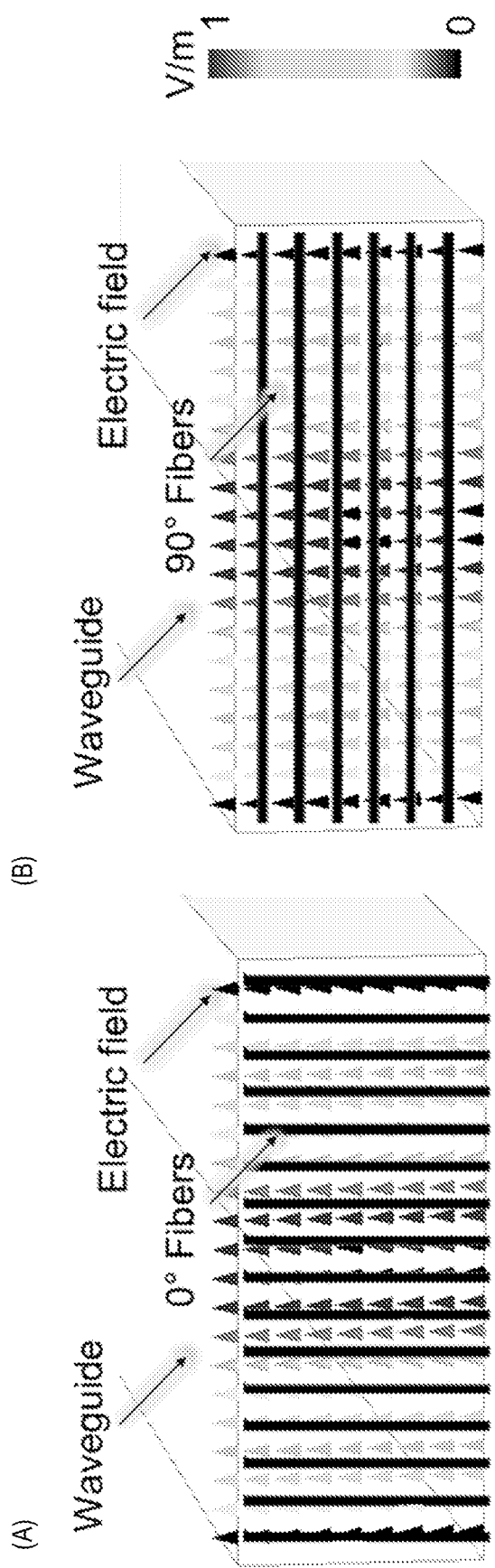
FIG. 35 shows how carbon fibers can be oriented relative to the fundamental model $TE_{10}$ of an electric field (arrows) in waveguide. (a) A parallel orientation, which is defined as 0°. (b) A perpendicular orientation, which is defined as 90°. The color bar indicates the strength of the electric field in V/m.

In this Example, alignment is a measurand that quantifies the average alignment of each carbon fiber in a layer relative to each other. A relative alignment with a value of one means that all the carbon fibers in a layer are parallel to one and another. A relative alignment with a value of zero means that all the carbon fibers are uniformly distributed by angle relative to each other. Likewise, we define orientation as the orientation of a layer relative to the direction of the electric field in the measurement (FIG. 35). A relative orientation is an angle that describes which direction the carbon fibers in all the layers point to relative to some applied electric field orientation. When multiple layers form a ply, the alignment and orientation values from each layer combine.

Imaging a ply on a light table is a common technique. To get spatial information, an image can be segmented. This optical technique can be fast, leveraging advances in real-time image processing (e.g., OpenCV). This optical technique is also transmission-based. As such, it does not work for samples that cannot pass light, cannot differentiate between layers, and it is difficult to implement for three dimensional samples. Yet another technique uses eddy current sensors. This eddy current approach has some tradeoffs, which include operating in the near-field with a small working distance and requiring the composite to have a conductivity within a specific range.

Microwave ellipsometry uses the relative reflected power of a microwave signal measured as a function of the angle between the carbon fibers and the polarized incident microwave radiation. When the electric field is parallel to the carbon fibers, the electric field moves charge along the length of the fiber. The current flow in this case is much the same as it would be in a conducting sheet, resulting in a combination of reflection and absorption of the electrical signal. When the electrical field is perpendicular to the carbon fibers, the electric field cannot move charge in the fiber as far, and instead charges must capacitively couple from fiber to fiber through the host matrix in the ply. In this case, the ply acts more like an insulator than a conductor, and there is a higher amount of transmission through the ply, in addition to some reflection and absorption. Later, we will show that the resultant relative reflected power versus multiple angles creates a squared-ellipse model on a polar graph, which can then be related to the alignment and orientation. The microwave ellipsometry approach can work on thick samples, it is comparatively easy to implement in three dimensions, it can work in the far field, and it can potentially work with a wide range of conductivities.

Microwave ellipsometry uses the relative reflected power, which is measured with a vector network analyzer (VNA). The VNA measures a relative reflection coefficient ($\Gamma$), which is related to the reference impedance of the port ($Z_r$) and the impedance of the sample ($Z_{sample}$). The resultant reflection coefficient is given as, $$\Gamma = \frac{Z_r - Z_{sample}}{Z_r + Z_{sample}}. \quad \text{Error! Bookmark not defined.}(1)$$

The relative reflected power is simply the square of the reflection coefficient. After we measured (1), we found that the general form of a squared ellipse modeled the relative reflected power as, $$P = \Gamma^2 = \left(\frac{a \cdot b}{\sqrt{a^2 \cos^2(\theta - \theta_o) + b^2 \sin^2(\theta - \theta_o)}}\right)^2, \quad \text{Error! Bookmark not defined.}(2)$$

where a is the minor axis, b is the major axis, and the orientation is described by $\theta_o$. From (2), we define the orientation as $\theta_o$, and the alignment as (FIG. 36), $$\chi_{ab} = 1 - \frac{a}{b} \quad \text{Error! Bookmark not defined.}(3)$$

Figure 36:
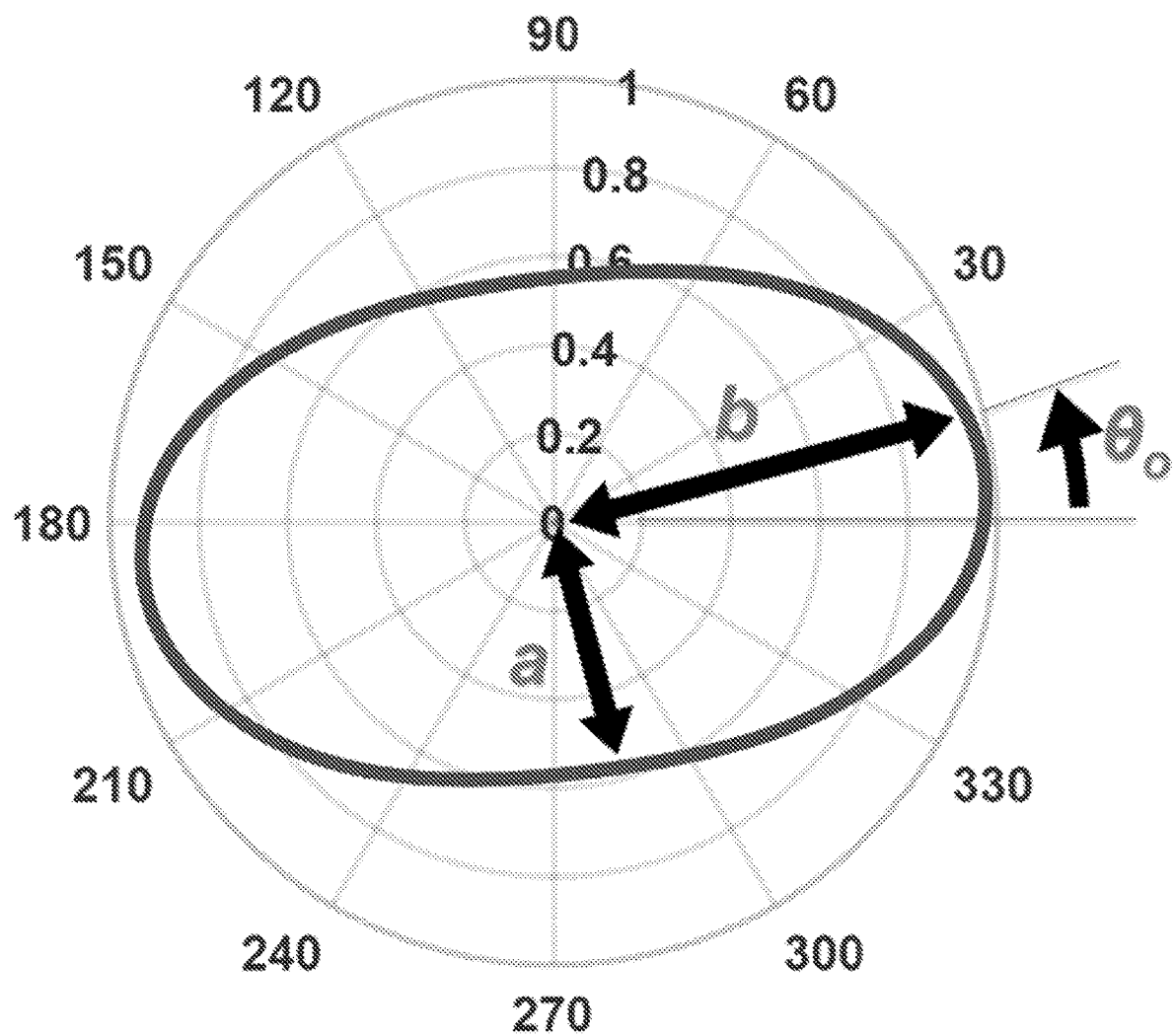
FIG. 36 shows a squared ellipse that models the relative reflected power as a function of angle, where the angle is defined as the angle between the electric field and the sample-under-test. The blue solid line is the squared-ellipse fit, $\theta_o$ is the orientation, a is the minor axis, and b is the major axis.

For a highly aligned, very conducting sample, when the electric field is aligned with b then b is close to one, and a is close to zero. Any nonzero value of a is then due to electrical conduction through the matrix of the ply, capacitive coupling between fibers and any reflection from the isotropic substrate material, which would tend to be the same for any angle. In this case, the value of $\chi_{ab}$ in (3) is close to 1. Conversely, for a sample that has highly conducting fibers that are uniformly distributed throughout the layer at random angles, the value of $\chi_{ab}$ is close to zero, since a is similar in value to b. This former case represents a layer (or ply) that is aligned, and the latter case represents a layer (or ply) that is not aligned. The value calculated is not absolute, at this point, we can only say that for a weakly conducting matrix an alignment closer to one indicates a more aligned sample. Samples with known alignments could calibrate this alignment value, allowing us to quantify alignments across different processes. That said, we assert that the alignment value calculated without calibration samples suffice for process control. FIG. 36 shows the squared-ellipse function as the blue solid line, and the minor and major axes are labeled with the orientation.

Our experimental setup used a rotation stage, a foam dielectric spacer, a WR-42 rectangular waveguide flange, a translation stage, and a VNA. We connected the VNA to the waveguide flange with a coaxial cable and contacted the waveguide flange to the material-under-test via a micromanipulator. After positioning the flange over the axis of rotation, we rotated the material-under-test to different fixed angles. At each angle, we measured Γ (Eq. 1) with the VNA over the fundament mode of the waveguide (18 GHz to 26.5 GHz). All data shown is at 18 GHz. This was repeated over several position on each sample to give an idea of local vs. global alignment for each sample. The number of measurements on each sample was N=5 for the control, Sample #2, and Sample #4. For Sample #1 and Sample #3, the number of measurements on each sample was N=10.

Figure 37:
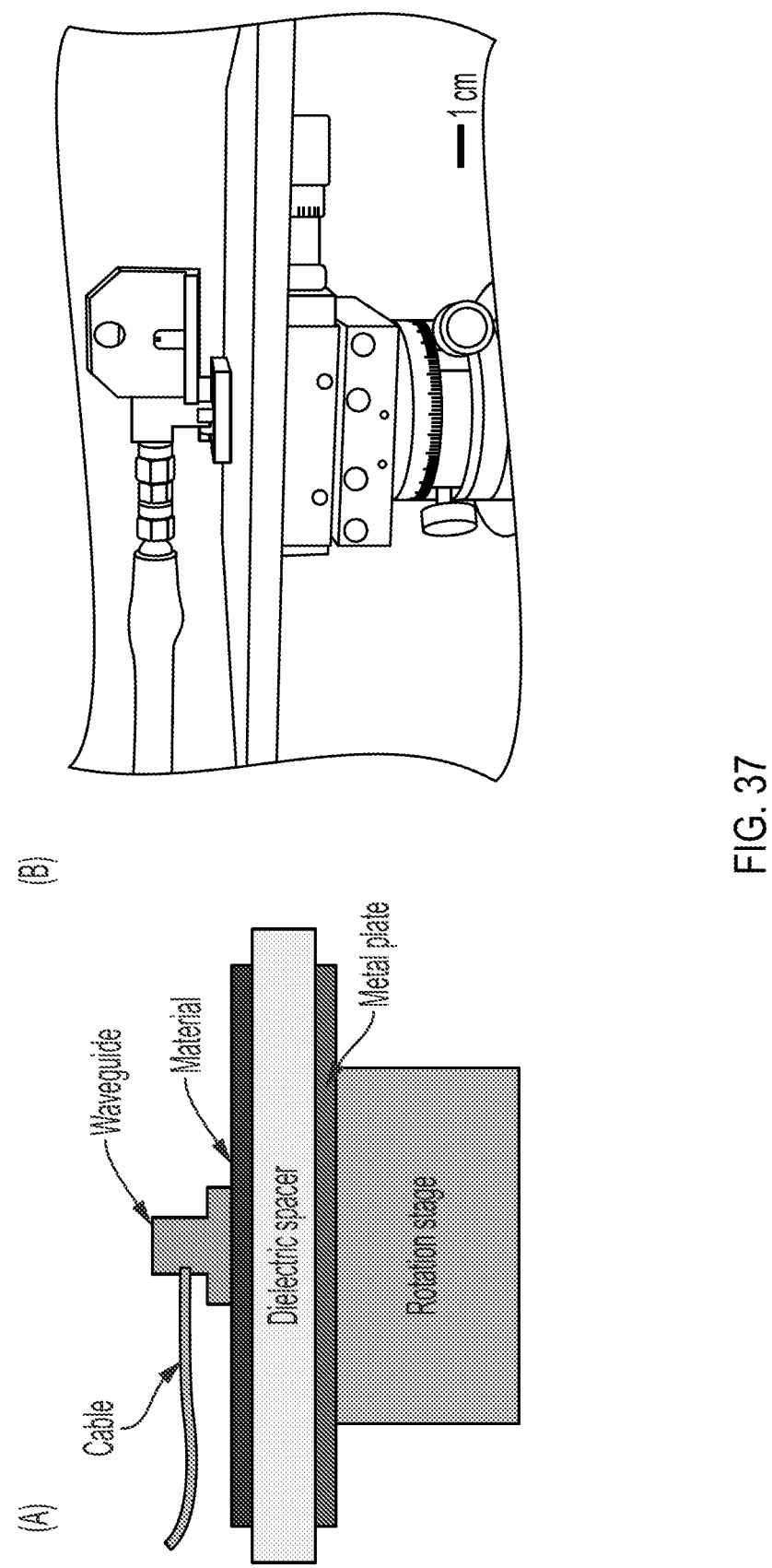
FIG. 37 shows a microwave ellipsometry measurement setup. (a) A schematic of the measurement setup. (b) A photograph of the measurement setup.

We show a schematic of the measurement setup in FIG. 3a and a photograph of the measurement setup in FIG. 37. In the next section, we provide a detailed step-by-step experimental procedure.

Figure 38:
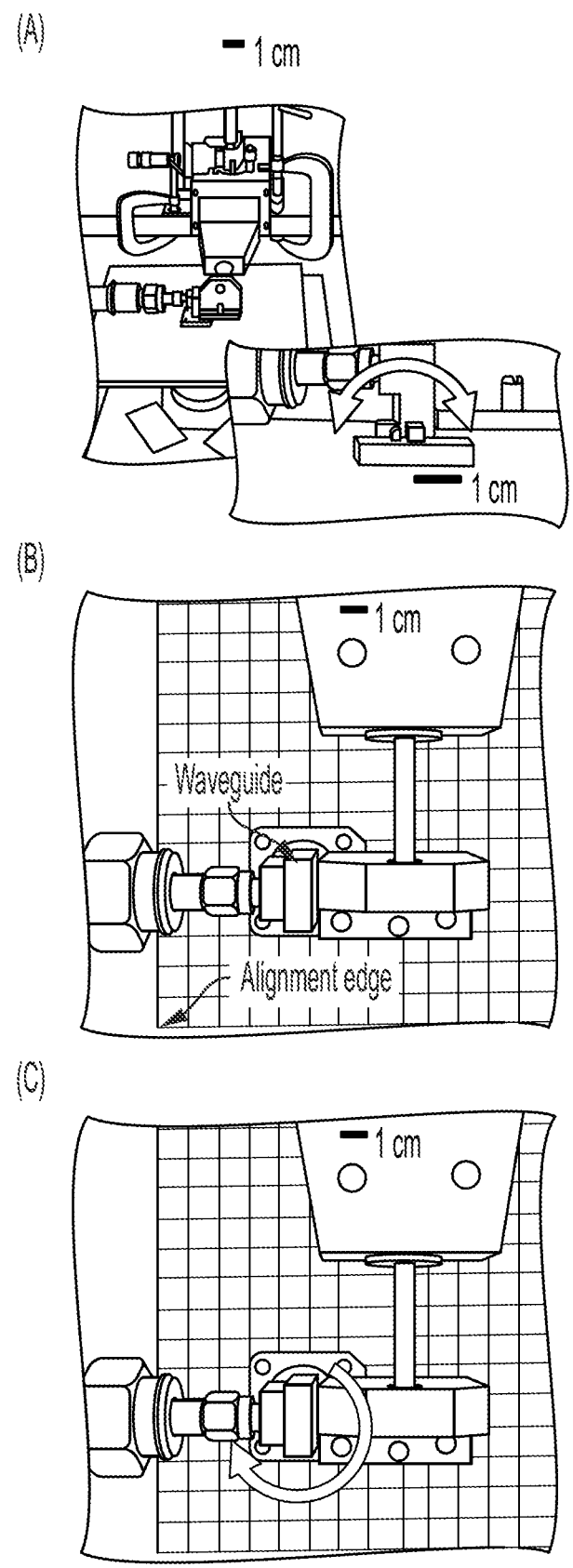
FIG. 38 shows selected steps from a process that includes (a) levelling the waveguide flange with a reference flat; (b) aligning an edge of the sample to the edge of graph paper that is affixed to the dielectric spacer with polyimide tape; and (c) rotating the sample.

A process for performing microwave ellipsometry includes performing a 1-port coaxial calibration (Short-Open-Load) at the end of the cable that connects to the waveguide flange; performing a waveguide calibration at the end of the waveguide flange; levelling the waveguide flange with a reference flat (FIG. 38); validating that the waveguide flange is at the center of the axis of rotation; performing a waveguide calibration at the end of the waveguide flange; place a sample on the dielectric spacer; aligning the sample to the edge of graph paper affixed to the dielectric spacer (FIG. 38). The graph paper is aligned to the sample with a reference edge we assumed to be cut at 0°; rotating the sample (FIG. 38); measuring Γ; repeating step 6 through step 9 for the chosen number of angles between 0° and 360°; flipping sample and repeat step 10 for the other side of the sample-under-test; squaring the measured values to compute the relative reflected power; fitting the data from step 9 to a squared-ellipse model; computing the alignment and orientation; and moving to a different position on the sample and repeat step 1 through step 8.

Figure 39:
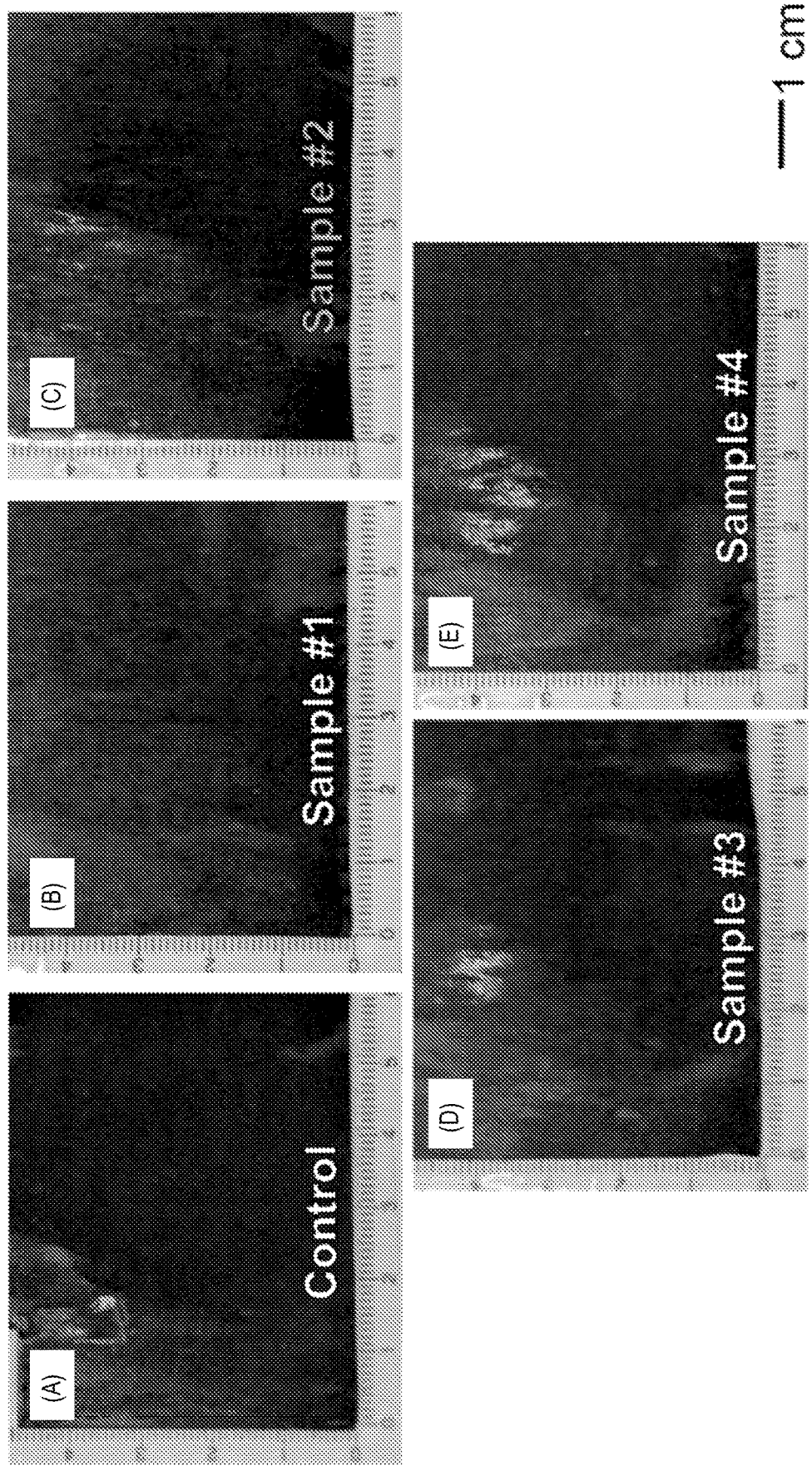
FIG. 39 shows four-layer short carbon fiber samples for testing the microwave ellipsometry measurement. (a) Control sample with each layer aligned to minimize the light transmitted through the ply. (b) Sample #1 was identical to the control. (c) Sample #2 had all the layers rotated by 5°. (d) Sample #3 had the second of four layers rotated by 5°. (e) Sample #4 had the second of four layers rotated by 15°.

We performed scanning microwave ellipsometry on four blind samples and a control sample (FIG. 39). The four blind samples had an unknown sample orientation and alignment at the time of measurement. Each sample consisted of four layers of aligned short carbon fibers. For an individual layer, we used IM7* carbon fiber that had been chopped to an average length of approximately (5.0±0.1) mm.

All blind samples were fabricated using the same method. First, an individual layer was fabricated. Second, these individual layers were consolidated to make a sample. To make the sample, we aligned each layer on a light table, controlling the layer-to-layer alignment with a protractor. Once we aligned the fibers, we impregnated and consolidated the sample with a thermoplastic polymer (polyetherimide—UItem 1000*) in autoclave for 4 hours at $2 \times 10^6$ Pa and 335 C. For the control sample, we aligned each layer to minimize the light transmitted through the sample, which we aligned and measured by eye. For the blind samples, Sample #1 was identical to the control, Sample #2 had all the layers rotated by 5°, Sample #3 had the second of four layers rotated by 5°, and Sample #4 had the second of four layers rotated by 15°. FIG. 39 shows the control and blind samples. Each sample was approximately 10 cm×7 cm.

Figure 40:
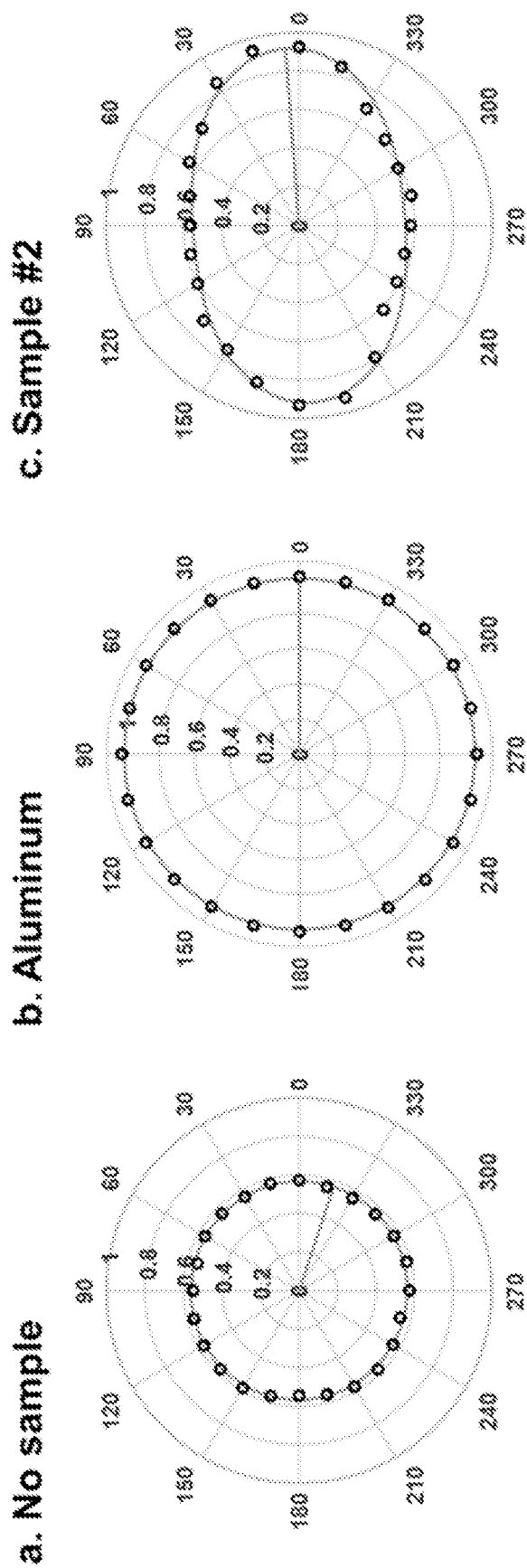
FIG. 40 shows microwave ellipsometry data at 18 GHz for no sample, an aluminum sheet, and Sample #2. (a) 'no sample' case measurements (blue circles) appears as a circle, has a radius less than one, and fits an isotropic model (red circle). (b) Aluminum case measurements (blue circles) appears as a circle, has a radius close to one, and fits an isotropic model (red circle). (c) Sample #3 measurements (blue circles) appears as an ellipse, has an orientation close to 5°, and fits an anisotropic model (red circle)

Before we measured the blind samples, we measured two controls: no sample, and a laminated aluminum sheet. We took the 'no sample' measurement by placing the waveguide flange in direct contact with the dielectric spacer. We took the 'aluminum' measurement by placing the waveguide flange in direct contact with a laminated aluminum sheet placed on top of the dielectric spacer. We expected that the 'no sample' case would look like a circle on the microwave ellipsometry graph with a smaller radius (FIG. 40), because the signal propagated and was absorbed or radiated out the sides of the dielectric spacer before a fraction of the power was reflected into the waveguide flange. We expected that the 'aluminum' case would also look like a circle on the microwave ellipsometry graph with a radius close to one (FIG. 40), because the signal was immediately reflected into the waveguide flange and more of the signal was reflected. In contrast with these isotropic samples, Sample #2 (FIG. 40) shows a rotated squared-ellipse, which is consistent with an aligned carbon fiber sample with a 5° orientation.

Here we note that (2) was true for the measurement configuration used for this work (FIG. 40), where the backing plane consisted of a dielectric and a metal plate. We can use a microwave absorber in lieu of the dielectric spacer, which requires a Cassini oval model in lieu of a squared ellipse model. Either approach can measure the alignment and orientation, but in the latter case the signal-to-noise is bigger.

After validating our measurements with the test cases, we measured all the blind samples, and the control sample. We then fit the microwave ellipsometry data to the model in (2), extracting the orientation ($\theta_o$) and alignment ($\chi_{ab}$). We computed uncertainty in the orientation ($\theta_o$) and alignment ($\chi_{ab}$) by propagating the error via a numeric Jacobian incorporating the measurement uncertainty and fit residuals. Unfortunately, the error in the orientation included the uncertainty of placing the sample on the dielectric spacer by hand, which added in quadrature to approximately ±1°. This contribution to the uncertainty was very large compared to the other sources of error. Table 1 shows a summary of our results.

Figure 42:
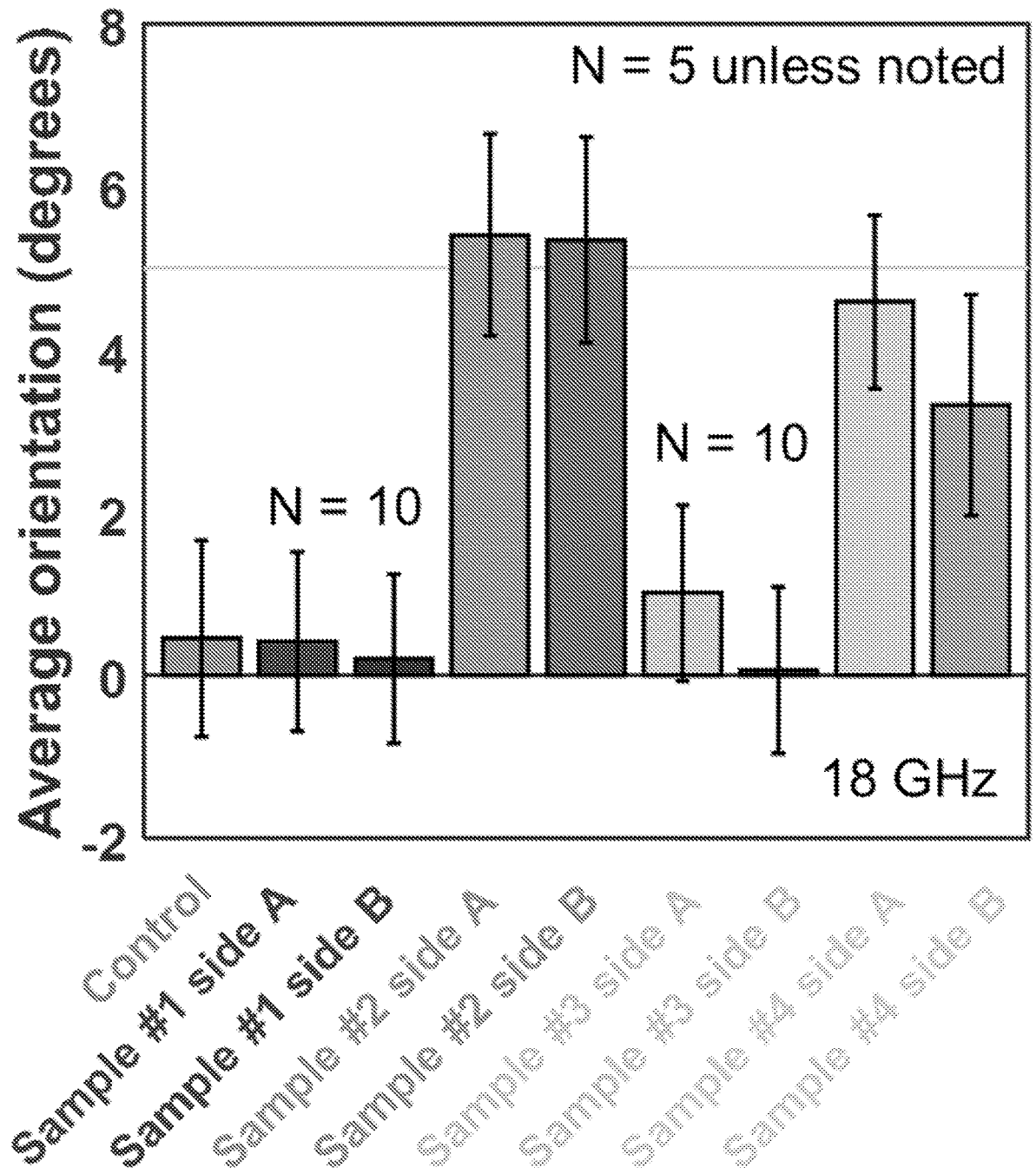
FIG. 42 shows absolute values for the average orientation for control and four blind samples. Side A and Side B corresponded to the top-facing and bottom-facing sides, respectively. The number of measurements on each sample was N=5 for the control, Sample #2, and Sample #4. For Sample #1 and Sample #3, the number of measurements on each sample was N=10. The measurement frequency was 18 GHz.

From FIG. 42, we determined that Sample #1 (blue) was identical to the control. Based on the orientation data, we also determined that Sample #2 had all layers rotated by 5°, and Sample #4 had one middle layer rotated by 15°. If the error in the orientation had been less than ±1°, we could have also concluded that Sample #3 had one middle layer rotated by 5°. Based on the volume of the ply misoriented by 5° (a quarter of the sample), we expected the overall misorientation to be 1.25°. This is consistent with the value obtained for Sample #3 Side A, however it is not true for Side B. Based on this discrepancy we speculate that this microwave technique can determine which layer is misaligned. However, this data is inconclusive based on the large uncertainties. In future work we will decrease the uncertainty and pair measurement with simulation. Likewise, for Sample #4, a quarter of 15°, 3.75°, is also consistent with the value obtained for Sample #4 Side B. For Sample #4, we hypothesize that layer rotated by 5° was also closer to Side B. Although this is a more reasonable hypothesize given the uncertainty values, future work will include more extensive measurements with lower uncertainties to confirm this hypothesis.

Figure 43:
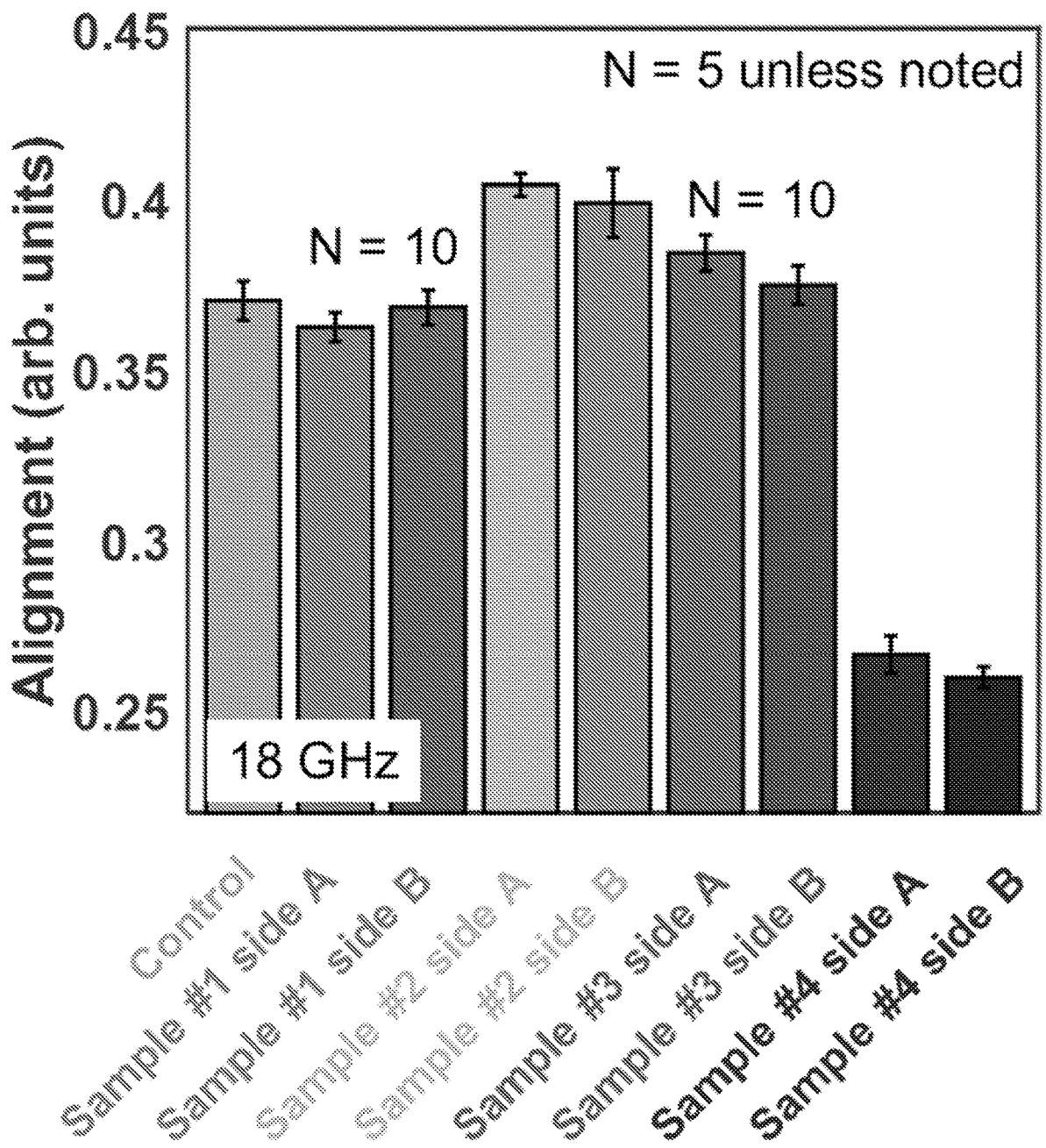
FIG. 43 shows absolute values for the average alignment for control and four blind samples. Side A and Side B corresponded to the top-facing and bottom-facing sides, respectively. The number of measurements on each sample was N=5 for the control, Sample #2, and Sample #4. For Sample #1 and Sample #3, the number of measurements on each sample was N=10. The measurement frequency was 18 GHz.

From FIG. 43, Sample #2 had the highest alignment value (2) compared to the other blind samples in the test. Sample #4 had the lowest alignment value compared to the other blind samples in the test. Based on FIG. 42, we expected that Sample #4 should have the lowest alignment, because this sample had a middle layer rotated by 15°. This sample shows that orientation and alignment become convolved when measuring multiple layers. From the perspective of the electric field (FIG. 35), the carbon fibers in this sample appeared more uniformly distributed. The other samples had similar alignment values compared to the uncertainty. We observed that Sample #3, which has a middle layer rotated by 5°, has a comparable alignment value to the control and Sample #1, which is identical to the control.

Even in this preliminary configuration the uncertainty in the alignment values from waveguide ellipsometry is small compared to the variance of the alignment value over the nominally aligned samples (Sample #1, Sample #2). This fact is important to note because it implies that alignment as measured by waveguide ellipsometry, can inform process control.

FIG. 43. Absolute values for the average alignment for control and four blind samples. Side A and Side B corresponded to the top-facing and bottom-facing sides, respectively. The number of measurements on each sample was N=5 for the control, Sample #2, and Sample #4. For Sample #1 and Sample #3, the number of measurements on each sample was N=10. The measurement frequency was 18 GHz.

Accordingly, we demonstrated quantitative measurements of alignment and orientation of short fiber composites by microwave ellipsometry. Next-generation processing techniques can involve in-line quality assurance tools for real-time feedback of processing variables, and formed parts require in situ characterization as the material is laid up to improve quality and process control. We showed that by acquiring the relative reflected power as a function of angle at 18 GHz we quantified alignment and orientation for in-line process control and for formed parts.

We measured four samples whose nominal misalignment was unknown at the time of test. After we applied the microwave ellipsometry technique, we successfully identified the alignment of each sample. By measuring both sides of each sample, we were able to speculate about which side of the sample had the nominally misaligned layer. We can integrate robotics to create three dimensional images of alignment and orientations. Additional efforts include the development of real-time scanning systems. Finally, we developed an uncertainty analysis and concluded that the uncertainties in the initial alignment of the sample relative to the waveguide flange was the dominant source of error.

Example 3. Application of Waveguide Ellipsometry to Carbon Fiber Composites

We show measurement results from two different types of composites in this paper. The first set of materials are test wafers fabricated and designed to emulate the carbon fiber composites used to help develop a mapping function between the measured S-parameters and the material properties of the carbon fiber composites. They are fabricated with well-known materials and uniform anisotropy. Once the test wafers were characterized and a mapping function was created, the second set of composites were four different carbon fiber composites samples. These included a single layer short carbon fiber composites (SCFC), multiple layer SCFC, a single layer continuous carbon fiber composite (CCFC), and a multiple layer CCFC.

We designed and fabricated four test wafers that were designed to mimic the geometry of the carbon fiber composites and develop a mapping function between measured S-parameters and sheet resistance. Each fused silica wafer had four quadrants (FIG. 45): quadrant (1) was (10.0±0.5) µm wide continuous gold stripes on molybdenum disilicide ($MoSi_2$), quadrant (2) was (10.0±0.5) µm continuous gold stripes deposited similarly on a fused silica substrate, quadrant (3) was a layer of $MoSi_2$ with no gold stripes, and quadrant (4) was a continuous layer of gold. The gold stripes were spaced with a center-to-center distance of (20.0±0.5) µm and aligned in what we defined as the y-direction. These gold stripes serve as an idealized representation of the conductive fibers in a composite material. Each of the four calibration wafers had the same four quadrant pattern, however, the thickness of the $MoSi_2$, both under the stripes (quadrant (1)) and by itself (quadrant (3)) ranged from 185 nm to 20 nm to achieve linearly spaced values of $|\Gamma|$ between the four layer thicknesses.

Figure 45:
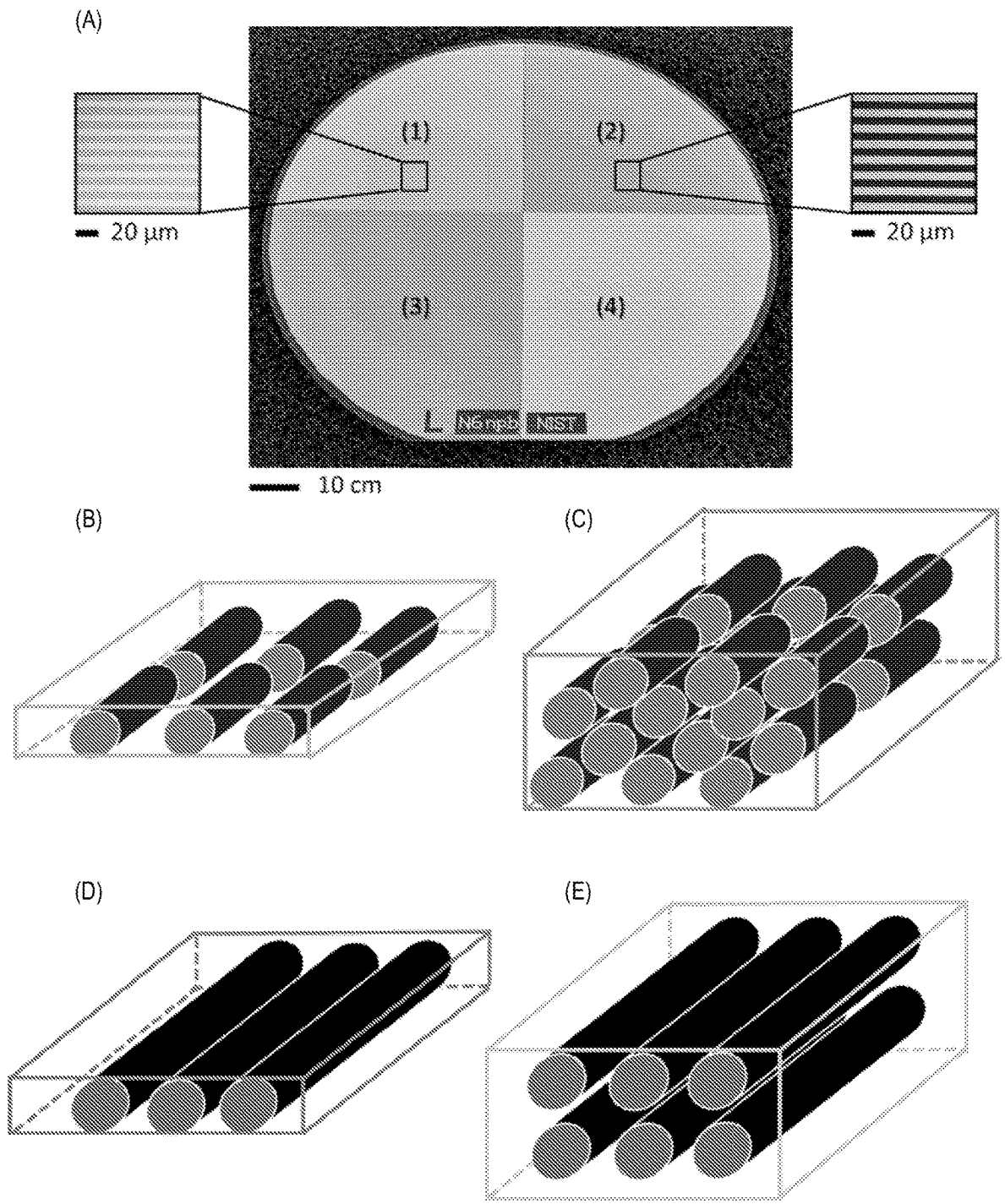
FIG. 45 shows samples measured for (a) a fabricated ideal sample and (b) a single-layer short carbon fiber, (c) a multiple layer short carbon fiber, (d) a single layer continuous fiber, and (e) multiple layer continuous fiber.

The first set of samples were loose short carbon fibers (FIG. 45) that were aligned. Each layer had carbon fibers chopped to approximately 5.0±0.1 mm in length. The second set of samples were all made from the loose short carbon fiber samples and then impregnated with the thermoplastic polymer (FIG. 45). Then each layer was aligned by hand on a light table with a protractor and the layers were consolidated in a four-layer ply (40 µm to 60 µm thick) over 4 hours at $2 \cdot 10^6$ Pa and 335° C. There is one control sample where all four layers were aligned relative to one another and oriented to 0°. The four other samples had unknown and alignment and orientation when they were initially given to us. We did know that one sample would be the same as the control, one sample would have the four layers aligned relative to one another and oriented to 5°, one sample would have one of the middle four layers misaligned by 5°, and the final sample would have one of the middle four layers misaligned by 15°.

The second set of samples was a commercial one-layer continuous IM7 fiber composite (FIG. 45) aligned and impregnated with an 8552 prepreg (FIG. 45) and a sample with multiple layers of the commercially available one-layer continuous IM7 carbon fiber composite (FIG. 45). The layers were laid up and put into a vacuum bag at 15 psig of pressure. It was then heated at (−16.1 to −15.0) ° C./min to 107.2° C. and held for 30 to 60 min. The pressure was raised to 85-100 psig so that the vacuum pressure reaches 30 psig. The sample was put into an autoclave at 30 psig and held at 176.7° C. for (125±10) minutes. It was then cooled at (−16.7 to −15.0) ° C./min to 65.6° C. and vented.

These four samples are an overview of a typical manufacturing processes, carbon fiber right after alignment and before impregnation with a matrix (single layer SCFC), a single layer of carbon fiber impregnated with a matrix (single layer CCFC), and multiple layers of carbon fiber aligned to make thinner and thicker ply (multiple layer SCFC and CCFC respectively).

Waveguide ellipsometry rotates a probe over an MUT so that the relative angle, θ, between the fiber orientation and linearly polarized E-field changes. Given a linearly polarized electric field incident on an MUT, the reflection coefficient can be expressed as a function of the characteristic impedance at the reference plane ($Z_0$) and the impedance of the MUT ($Z_{MUT}$)

$$\Gamma = \frac{Z_{MUT} - Z_0}{Z_{MUT} + Z_0}, \quad (1)$$

where $Z_{MUT}$, $Z_0$, and $\Gamma$ can be complex numbers. This relationship defines how the reflection coefficient will change as the relative angle between the fibers and the linearly polarized E-field changes as well as defining some constraints on the measurement technique. When $Z_{MUT}$ is too close to the impedance of the waveguide or too far away from the impedance of the waveguide, the magnitude of the reflection coefficient is poorly defined. For an isotropic material, as the linearly polarized E-field rotates above the MUT, $Z_{MUT}$ and $\Gamma$ are therefore not function of the relative angle, $\theta$. For an anisotropic material, $Z_{MUT}$ changes and is dependent on the effective conductivity tensor at that relative angle, $\theta$. When the incident E-field is polarized along the carbon fibers, the impedance is dominated by the impedance of the conductive fibers, so almost all the field is reflected to the aperture. When the incident E-field is polarized across the carbon fibers, the impedance is dominated by the impedance of the matrix, so there is less reflection and more loss. We characterized the relationship between electromagnetic response and MUT impedance of the carbon fibers with the help of test wafers, composite theory, and full wave simulation.

To evaluate the carbon fiber composites, first we measured and analyzed well-known anisotropic composites on test wafers. The test wafers were designed to mimic the carbon fiber composites in electrical behavior as well as physical geometry. The gold stripes on the test wafers are like the IM7 carbon fibers found in the composites, and the varying thicknesses of $MoSi_2$ mimic a combination of fiber misalignment, an electrical percolation network, and the conductivity of the matrix. We developed a model of the test wafers and represent the conductivity as an effective conductivity tensor:

$$\sigma = \begin{pmatrix} \sigma_x & 0 & 0 \\ 0 & \sigma_y & 0 \\ 0 & 0 & \sigma_z \end{pmatrix}, \quad (2)$$

where $\sigma_x$, $\sigma_y$, and $\sigma_z$ are the $\hat{x}$, $\hat{y}$, and $\hat{z}$ components of the conductivity tensor. This is a good approximation because the gold stripes and the IM7 fibers are significantly smaller in fiber diameter than the size of the probe in the measurement setup. Therefore average out the smaller features and treat the whole composite as an effective medium with an effective anisotropic conductivity tensor, $\sigma$. We applied a rotational matrix that rotates the matrix $\sigma$ (2) in the ($\hat{x}$, $\hat{y}$)-plane around the z-axis by some angle $\theta$. The $\sigma_{rot}$ matrix is a representation of the orientation of the test wafer with respect to the test head:

$$\sigma_{rot} = \begin{pmatrix} \sigma_x\cos^2\theta + \sigma_y\sin^2\theta & \sin\theta\cos\theta(\sigma_x - \sigma_y) & 0 \\ \sin\theta\cos\theta(\sigma_x - \sigma_y) & \sigma_x\sin^2\theta + \sigma_y\cos^2\theta & 0 \\ 0 & 0 & \sigma_z \end{pmatrix}. \quad (3)$$

We computed the components of the test wafer's effective conductivity tensor with a 3D DC composite theory simulation. From a 3D model of the composite and the conductivity ratio between the two phases, the simulation calculated the voltage at each node and solved the current continuity equations to satisfy the boundary conditions and minimize the dissipated energy over the full system. To verify the DC composite theory simulation, and to make the analysis more available, we derived circuit models to calculate the conductivity tensor [CITE]. We used the rotated conductivity tensor to verify measurements of the test wafer to composite theory with the help of 3D full wave finite element method (FEM) simulation.

We connected the test-head to a 40 GHz vector network analyzer (VNA). The test-head had to rotate relative to the material under test, so it included a phase stable RF rotational joint, a 2.4 mm coaxial to WR-42 waveguide adapter, and a 2-inch section of waveguide left unterminated. The test head included a rotary motor, all attached to a robotic arm with a 3D printed connecting piece. There was a small gap, approximately 300 μM, between the rectangular waveguide and the MUT. The MUT was either the test wafer, thin depositions of gold and $MoSi_2$ on fused silica, or carbon fiber composites attached to bare fused silica wafers to help with the consistency between the two samples. The MUT was placed above a (10.2±0.5) mm thick piece of Rohacell ($\epsilon_r=1$) and a (18±5) mm thick piece of foam absorber (FIG. 19). Both the absorber and the Rohacell layers were much larger in the xy-plane than the MUT. We added a stand-off of Rohacell because absorber is difficult to simulate and understand at near-field, by adding the Rohacell we were able to move the absorber from the near-field to the far-field. The absorber was secured by silicone caulking on the edges to a planarizing table that was metallic.

After the test-head was secured to the robot and the absorber platform was completed, there were four variables available for each measurement: (x, y) location, angle, and frequency. All samples were measured over 25 (x, y) positions distributed over the sample and far enough from the edge to minimize any edge effects and a constant height z. The robotic arm was set to an (x,y,z) coordinate with 5 μm repeatability. Each position was measured every 5° for a total of 73 angle positions (0° was measured twice), at one frequency, 18 GHz. This technique is not limited to 18 GHz, we only show this data to establish procedure and minimize the amount of data in this paper. We made all the measurements with a control program that iterated over robot position, relative angle position, and VNA data acquisition. The data was calibrated to the reference plane at the end of the WR-42 waveguide. Calibration procedures are important for electromagnetic measurements because they move the measurement reference plane to a known position. Without this known position, any conclusions from the measurements can be incorrect or misleading. Our calibration procedure was a two-step procedure including a step that account for the rotational angle theta.

Figure 46:
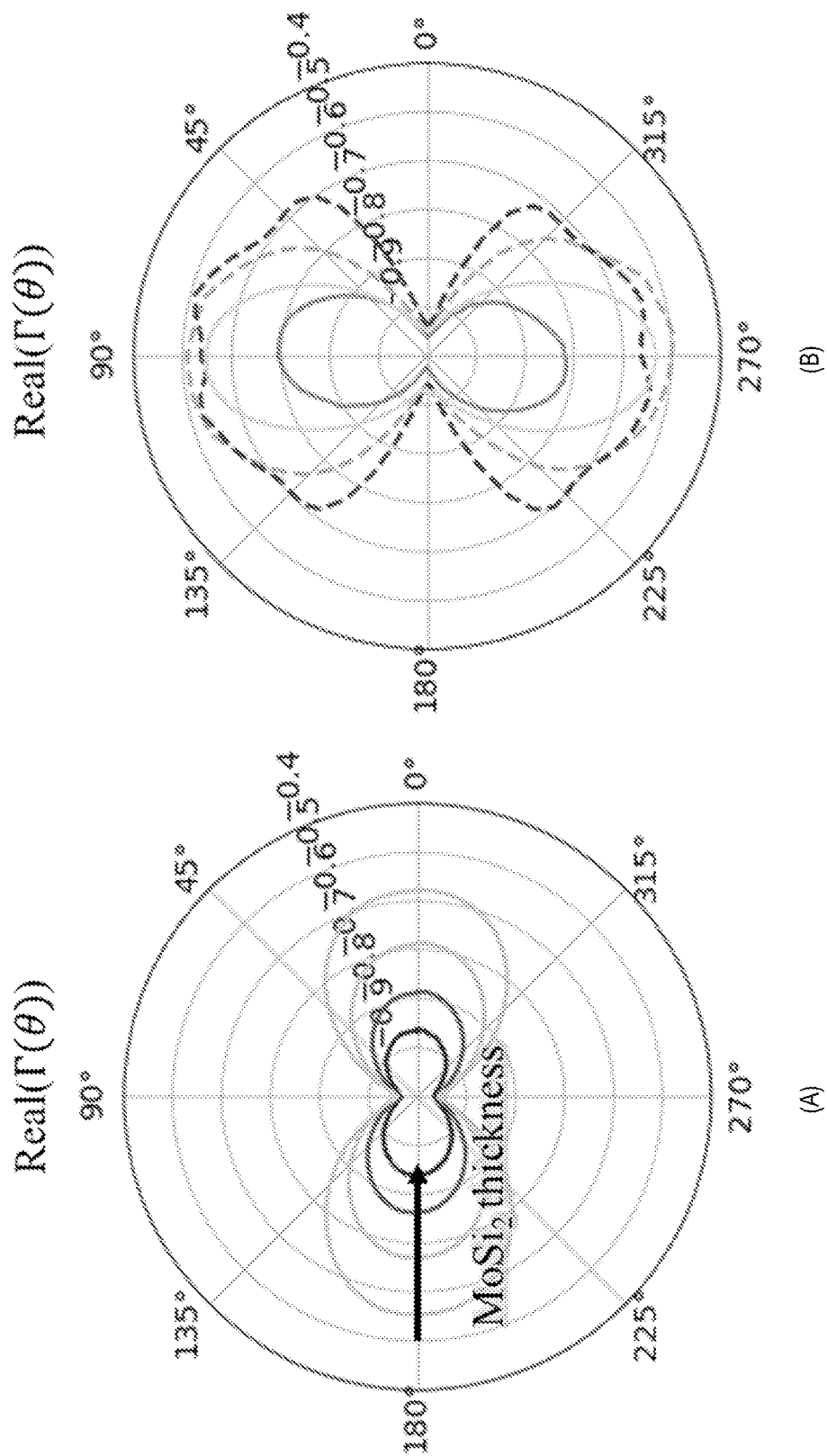
FIG. 46 shows $R(\Gamma(\theta))$ for (a) test wafers with gold stripes on different thickness of $MoSi_2$ and (b) short carbon fiber composites (SCFC) and continuous carbon fiber composites (CCFC)
Figure 47:
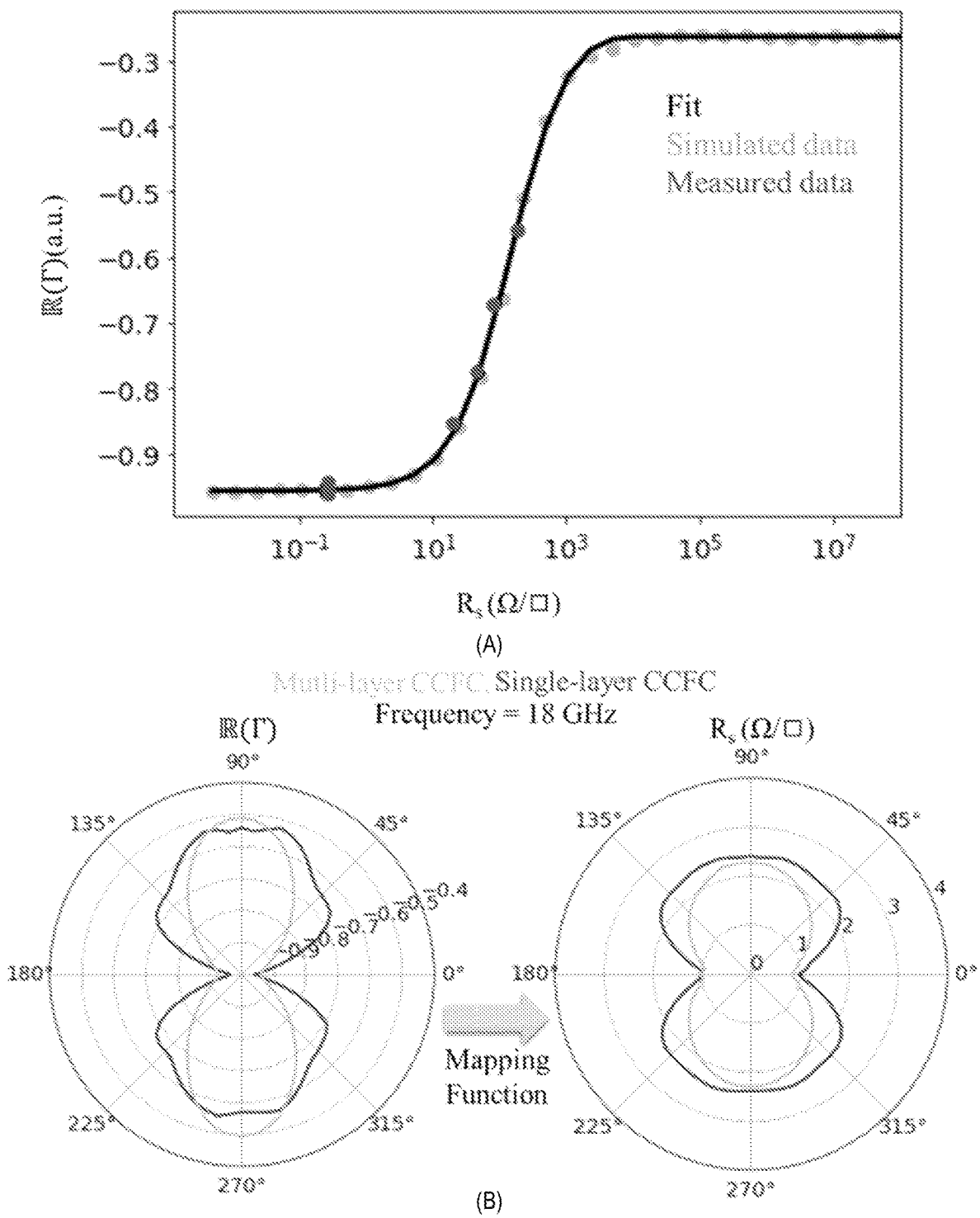
FIG. 47 shows (a) a mapping function between $\mathbb{R}(\Gamma)$ and $R_s(\Omega/\square)$ with the simulated data, measured data from the test wafers, and the phenomenological fit (black line). (b) The implementation of the mapping function of one spatial position and two different carbon fiber composites. The left-hand plot is $\mathbb{R}(\Gamma(\theta))$ while the right-hand plot is $R_s(\theta)$ on a log scale.

The mapping function related the effective sheet resistance to the measured reflection coefficient using the test wafers and a full-wave FEM simulation. The full-wave FEM simulation modeled the measurement setup and calculated the S-parameters defined a conductivity for the MUT. The FEM simulation was a 3D composition of the test head including the rectangular waveguide, plastic hold, and metal motor components. The MUT's sheet resistance was parameterized over a large range ($10^{-2}$ to $10^8$)S/m and the simulation calculated Real($\Gamma(\theta)$) (light dots FIG. 47). We took the Real($\Gamma(\theta)$) and related it to the sheet resistance which is proportional to the Real($Z_{MUT}$). The relationship between Real($\Gamma(\theta)$) and the sheet resistance was verified using the effective sheet resistance (along the fibers, $R_{sy}$ and across the fibers, $R_{sx}$) calculated from the test wafer geometry and their measured S-parameters (FIG. 46). We used the simulated data for the mapping function because the test wafer did not give us enough points for a reliable fit. The high sheet resistance was also the thinnest deposition of $MoSi_2$. The mapping function between sheet resistance ($R_s(\theta)$) and the R($\Gamma(\theta)$) had a phenomenological fit:

$$\mathbb{R}(\Gamma(\theta)) = \frac{c}{a + e^{-bR_s(\theta)}} - d \quad (4)$$

where a, b, c, and d are fit parameters. When the mapping function was applied to the carbon fiber composite samples, we get a similar shape as the real($\Gamma(\theta)$), where smaller values of $\mathbb{R}(\sharp(\theta))$ correspond to small values of $R_s$ and visa versa (FIG. 47). The carbon fiber composites are now defined as $R_s(\theta)$, where $R_s(\theta)$ can be calculated using Ohm's law:

$$\begin{pmatrix} J_x \\ J_y \end{pmatrix} = \begin{pmatrix} \sigma_x \cos^2\theta + \sigma_y \sin^2\theta & (\sigma_x - \sigma_y)\sin(\theta)\cos(\theta) \\ (\sigma_x - \sigma_y)\sin(\theta)\cos(\theta) & \sigma_x \sin^2\theta + \sigma_y \cos^2\theta \end{pmatrix} \begin{pmatrix} E_x \\ E_y \end{pmatrix}. \quad (5)$$

If we only take the E-field excited in the $\vec{x}$-direction that couples back into the fundamental mode of the rectangular waveguide, we simplify the expression to express the bulk sheet resistance with five fit parameters a, b, $\theta_1$, $R_{sx}$, and $R_{sy}$:

$$R_s(\theta) = a(R_{sx}\cos^2(\theta-\theta_1) + R_{sy}\sin^2(\theta-\theta_1)) + b(R_{sx}-R_{sy})\sin(\theta-\theta_1)\cos(\theta-\theta_1). \quad (6)$$

Figure 48:
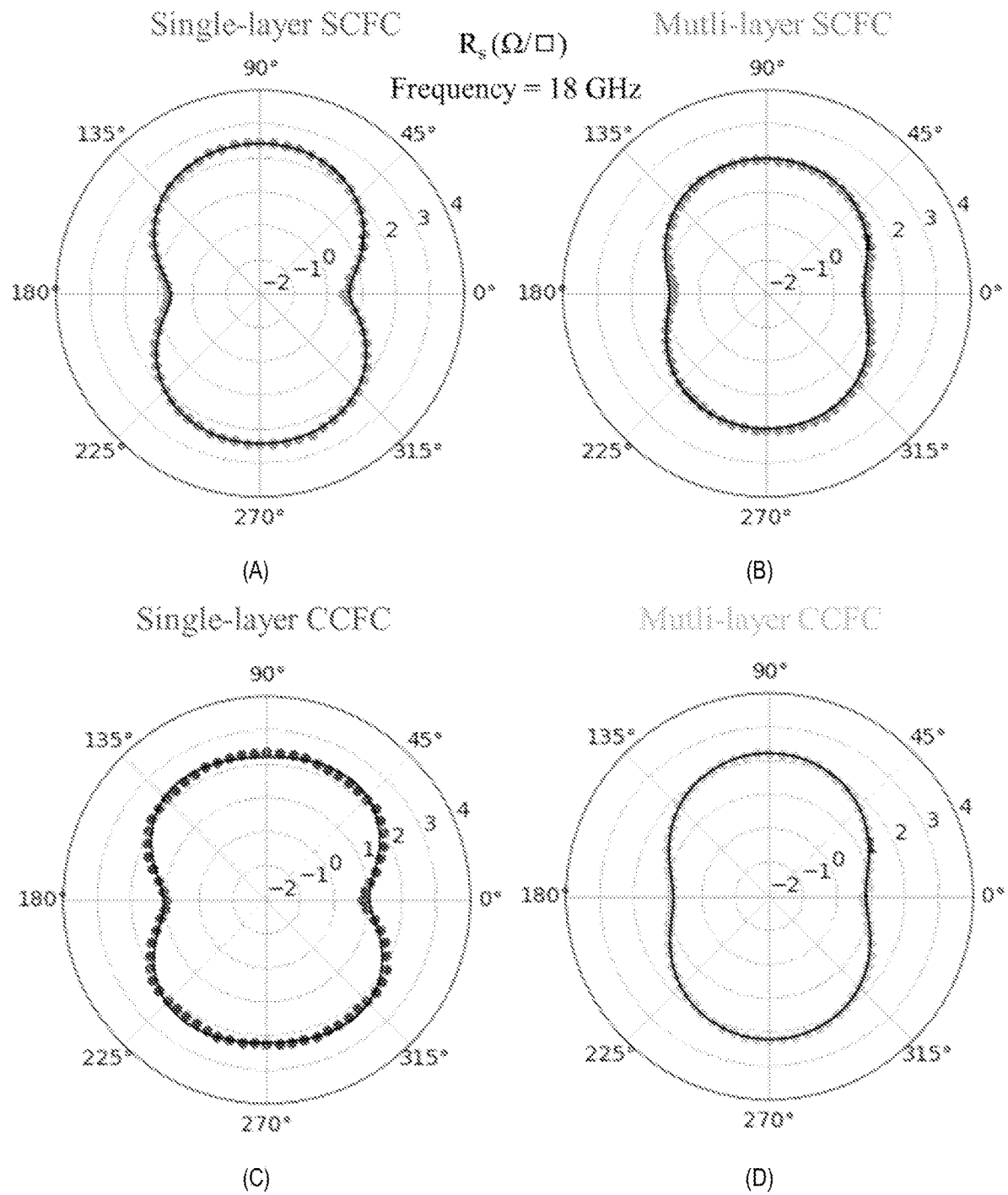
FIG. 48 shows $R_s(\theta)(\Omega/\square)$ for (a) single layer short carbon fiber composite (SCFC), (b) multiple layer SCFC, (c) single layer continuous carbon fiber composite (CCFC), and (d) multiple layer CCFC. Graphs are for one spatial position and a fit (solid line) over mapped data (dots)

The sheet resistance for the carbon fiber composites was fit (FIG. 48) using this physical model to extract parameters $\theta_1$, $R_{sx}$, and $R_{sy}$. Each spatial position on the carbon fiber composites has an orientation, $\theta_1$, and an alignment factor related to the sheet resistance in the x and y directions $R_{sx}/R_{sy}$. Both factors are important to characterize the material and recognize points of structural weakness.

Figure 49:
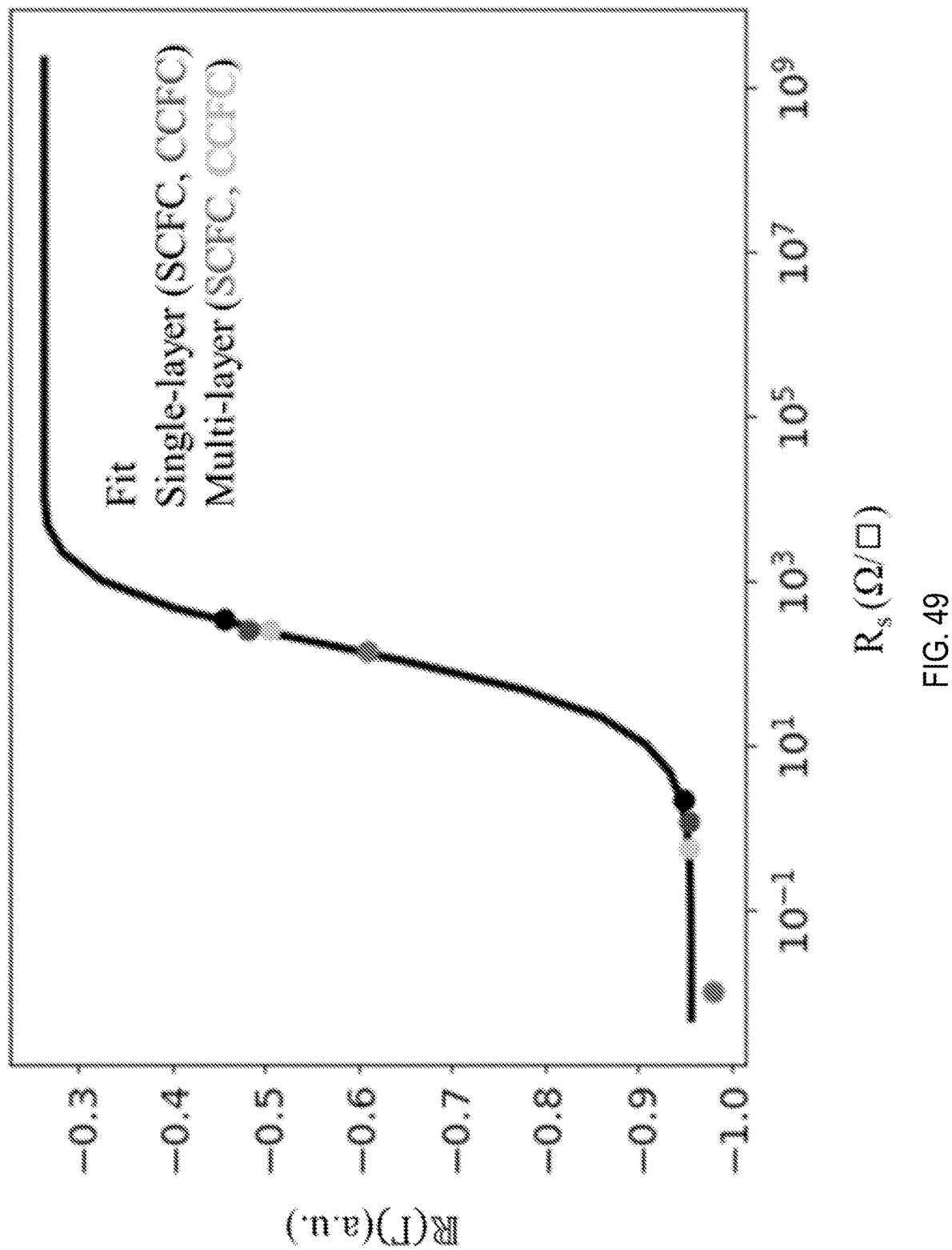
FIG. 49 shows $\mathbb{R}(\Gamma)$ versus $R_s$ including the fit (black line) and measurements for the different carbon fiber composites. Data points are colored based on the composite. The points at the lower end correspond to $\mathbf{f}(0°)$ and $\Gamma(90°)$ for each of the samples.

The scanning microwave ellipsometer electromagnetically detected four different carbon fiber samples. We developed a phenomenological mapping function between measured S-parameters and sheet resistance, derived a physical fit for $R_s(\theta)$ and, measured and mapped four different carbon fiber composites. FIG. 49 shows the fit function $\mathbb{R}(\theta)$ vs $R_s(\theta)$ with points at $R_s(0°)$ and $R_s(90°)$ for each of the carbon fiber composites. The measured sheet resistance along the conductive fibers was ill-conditioned, and the sheet resistance was sensitive to offset height on the order of tens of microns, smaller than the step size of the robotic arm. Future work could include a way to track the height and a height dependent mapping function. Given these constraints, we measured each carbon fiber composite and extracted the fit parameters $\theta_1$, $R_{sx}$, and $R_{sy}$ (FIG. 44).

The first composite we measured was single layer SCFC. The carbon fiber was aligned but not embedded within a matrix with a thickness between 10 and 15 μm thick and about a 30% carbon fiber density (FIG. 50). This carbon fiber composite is the first step in the fabrication procedure for any carbon fiber composite. The alignment, $R_{sx}/R_{sy}$, is uniform over the sample, while the orientation, $\theta_1$, has some nonuniformity (FIG. 50). Compared to the other three samples, the range of $\mathbb{R}(\theta)$ (FIG. 49) is well within the measure-able sheet resistance. The non-uniformity of the samples could point to a weakness of this setup for this composite sample. Perhaps for carbon fiber composites where there is low density conductive fiber, a larger aperture would give a better average over spatial position and decrease the nonuniformity of the orientation.

Figure 51:
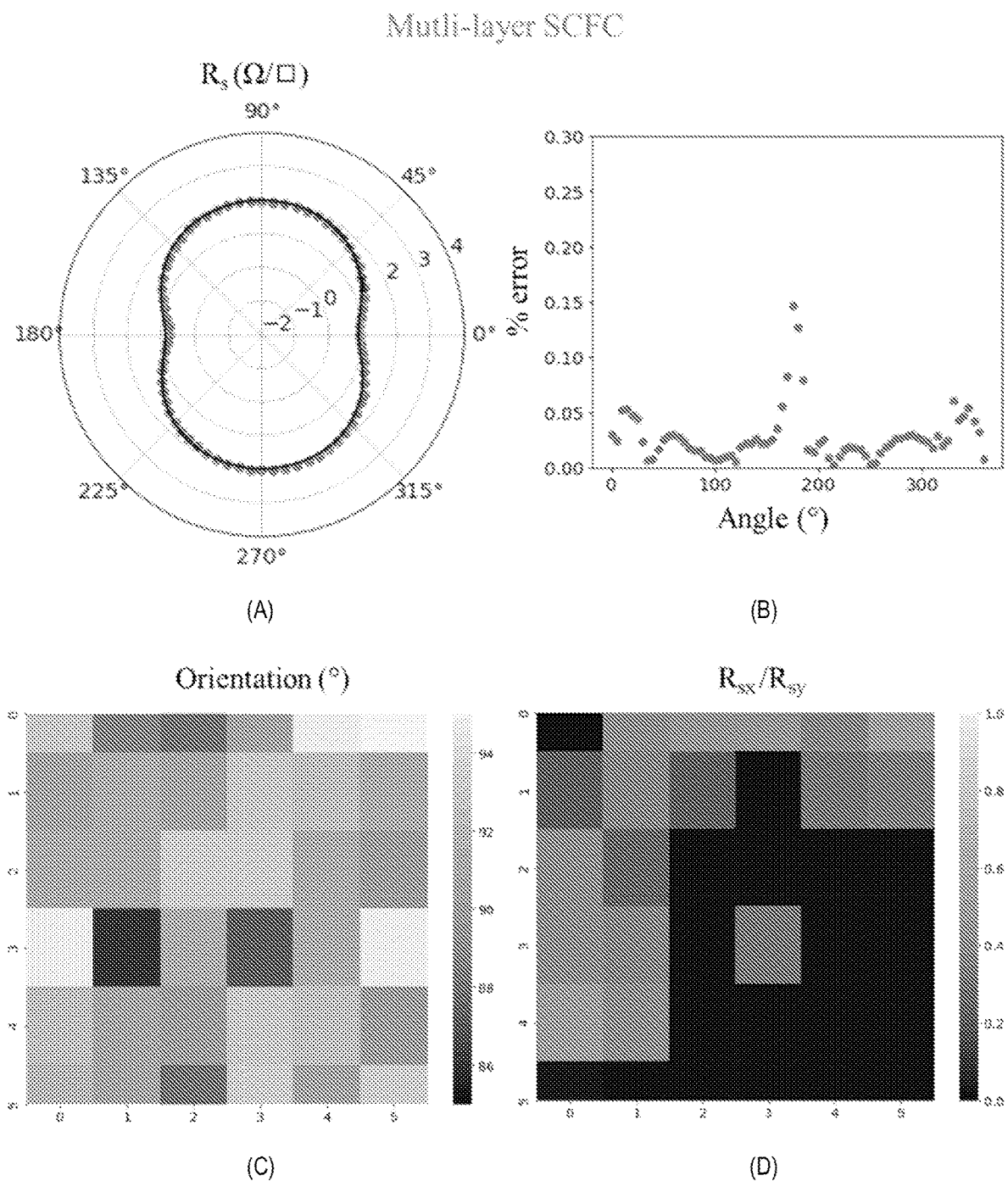
FIG. 51 shows multiple layer SCFC with (a) the mapped data with fit for one spatial position, (b) the percent error as a function of angle for the same spatial position, (c) a plot of the orientation for each spatial position, and (d) a plot of the ratio between the sheet resistance across and along the fibers ($R_{sx}/R_{sy}$)
Figure 52:
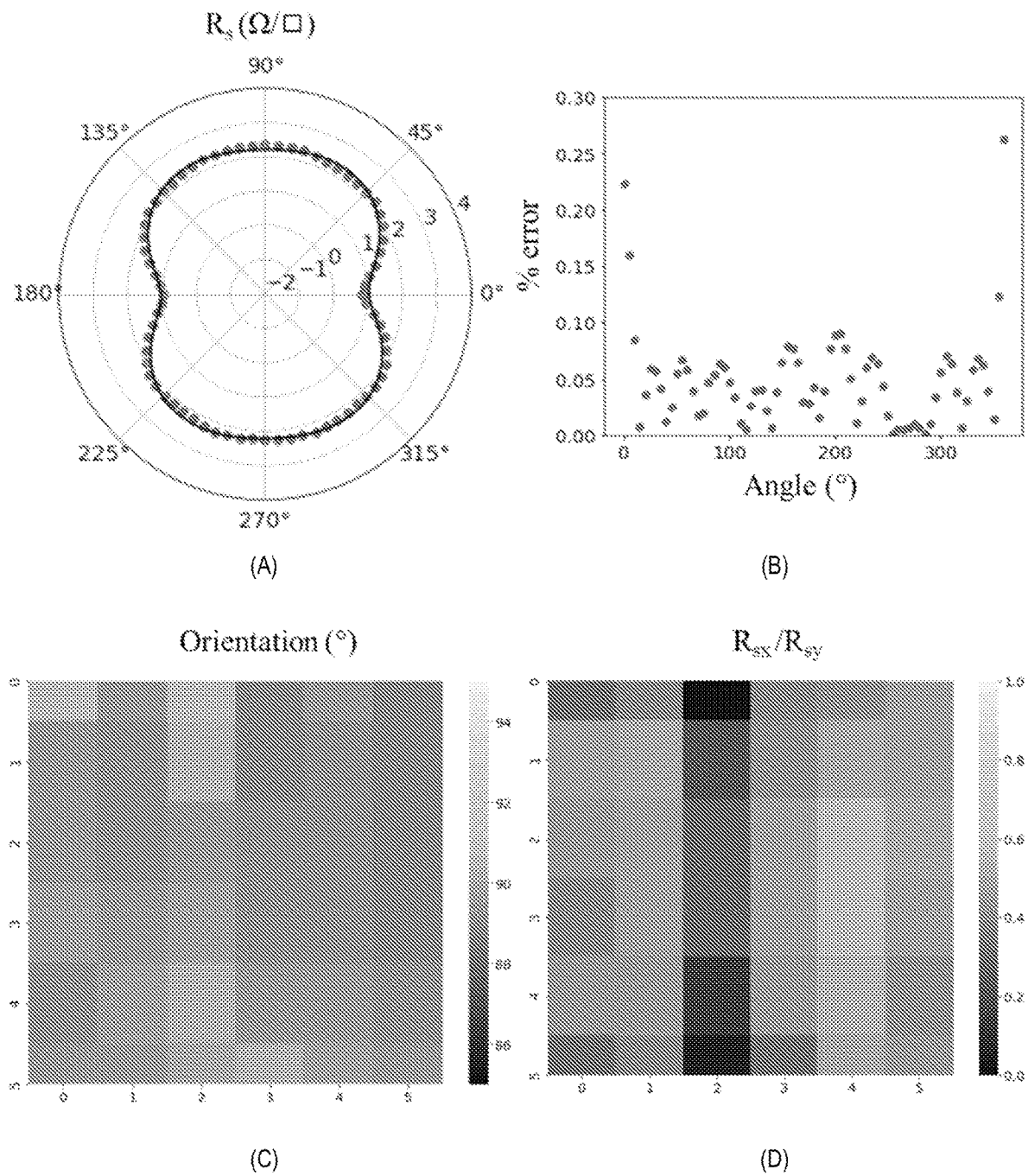
FIG. 52 shows a single layer CCFC with (a) the mapped data with fit for one spatial position, (b) the percent error as a function of angle for the same spatial position, (c) a plot of the orientation for each spatial position, and (d) a plot of the ratio between the sheet resistance across and along the fibers ($R_{sx}/R_{sy}$)
Figure 53:
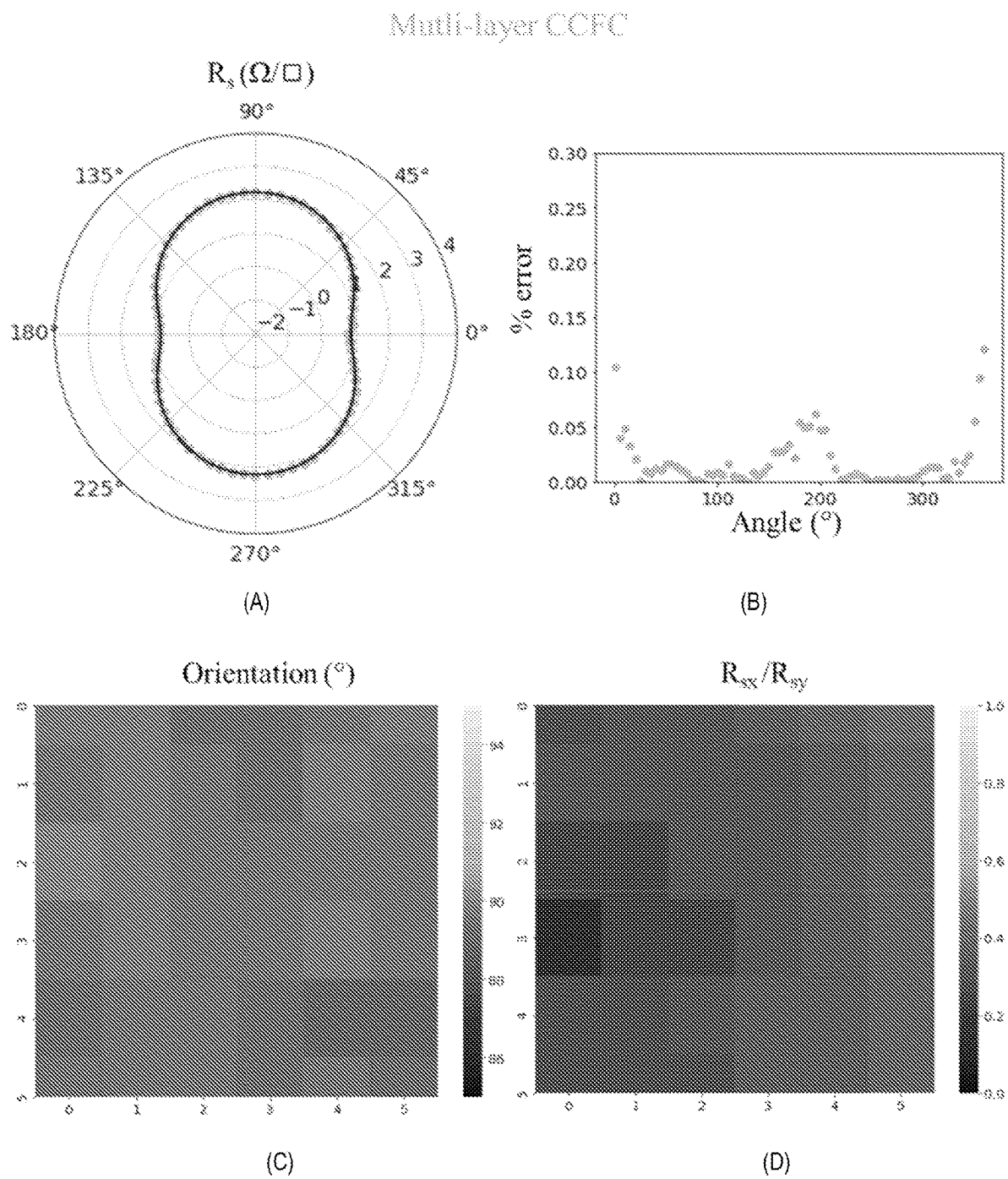
FIG. 53 shows a multiple layer CCFC with (a) the mapped data with fit for one spatial position, (b) the percent error as a function of angle for the same spatial position, (c) a plot of the orientation for each spatial position, and (d) a plot of the ratio between the sheet resistance across and along the fibers ($R_{sx}/R_{sy}$).

The second composite was a (40 to 60) μm thick composite where the carbon fibers were embedded in an ultem matrix and the layers were aligned by hand. There is less uniformity (FIG. 51) of both alignment and orientation compared to the single layer SCFC, suggesting that somewhere between the initial alignment and the layup of four layers individual clumps of fiber get disoriented. The alignment is low (FIG. 51), which also suggests that the layers are not well aligned relative to one another compared to the alignment of the initial single layer SCFC. The test wafers were designed to look like this geometry, and the shape of the original data (FIG. 46) supports this. This means for future work we can use the percolation network fabricated with the different $MoSi_2$ layers to better understand how the fibers could align better The third sample was a single layer CCFC approximately 80 to 100 μm thick with tightly packed fibers. The fit (FIG. 52) is not the typical shape we have seen with the other samples. The ellipse is more compact, suggesting that even at angles not along or across the fibers, there is some current excited along the densely packed fibers. The alignment and orientation of the continuous carbon fiber composite is more uniform than the two previous short carbon fiber samples. This sample is thicker than the skin depth of carbon fiber conductivity along the fibers, making the sheet resistance along the fibers ($R_{sy}$) potentially inaccurate. Despite this, the fit is good, and the extracted parameters have some information.

The final sample was a multiple layer CCFC fabricated out of multiple single layer CCFCs and aligned by hand to be approximately 1 mm thick. The alignment is overall slightly smaller than the single layer CCFC, following the trend of the SCFC and suggesting that there is some misalignment that occurs during the multiple layer alignment process for both sets of composites.

We demonstrated non-contact electromagnetic characterization on four different carbon fiber composite samples, measured carbon fiber composites, and extracted material properties directly related to strength. To achieve this our analysis included the introduction of a mapping function between measured data (Real($\Gamma(\theta)$)) and a material characteristic ($R_s(\theta)$), a physical fit for $R_s(\theta)$, and the extraction of orientation and alignment. We compared the measurements of four different carbon fiber composite samples and analyzed the effectiveness of the measurement technique for each.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A scanning microwave ellipsometer comprising:
a microwave ellipsometry test head comprising:
    a polarization controller that receives an input electrical signal, produces a polarization-controlled microwave radiation from the input electrical signal, receives reflected microwave radiation resulting from the polarization-controlled microwave radiation, and produces output electrical signal from reflected microwave radiation;
    a transmission line in communication with the polarization controller and that receives the polarization-controlled microwave radiation from the polarization controller, produces transmitted microwave radiation from the polarization-controlled microwave radiation, receives sensor-received microwave radiation resulting from the transmitted microwave radiation, and produces a reflected microwave radiation from the sensor-received microwave radiation; and
    a sensor in communication with the transmission line and that receives the transmitted microwave radiation from the transmission line, produces sensor microwave radiation from the transmitted microwave radiation, subjects a sample to the sensor microwave radiation, receives a sample reflected microwave radiation from the sample that results from subjecting the sample with the sensor microwave radiation, and produces a sensor-received microwave radiation from the sample reflected microwave radiation, wherein a polarization of the sensor microwave radiation is controlled by the polarization controller;
an electrical signal measurement system in electrical communication with the microwave ellipsometry test head and that produces the input electrical signal, communicates the input electrical signal to the microwave ellipsometry test head, receives the output electrical signal from the microwave ellipsometry test head, produces an electrical readout signal from the output electrical signal such that a magnitude of reflection coefficient Γ and an angle of reflection coefficient Γ of the sample reflected microwave radiation reflected from the sample is determined from the electrical readout signal, and produces a position control signal; and
a position controller in communication with the electrical signal measurement system and that receives the position control signal from the electrical signal measurement system, adjusts a relative position of the sensor and the sample based on the position control signal, and moves the sensor relative to the sample so that the sensor scans a surface of the sample.

2. The scanning microwave ellipsometer of claim 1, wherein position controller adjusts the relative position by moving the sensor relative to the sample selectively along three orthogonal linear directions or in three independent angular coordinates.

3. The scanning microwave ellipsometer of claim 1, wherein the position controller is in mechanical communication with the microwave ellipsometry test head through disposition of the microwave ellipsometry test head on the position controller.

4. The scanning microwave ellipsometer of claim 1, wherein the position controller is in mechanical communication with the sample through disposition of the sample on the position controller.

5. The scanning microwave ellipsometer of claim 1, wherein the sample is disposed on a first position controller, and the microwave ellipsometry test head is disposed on a second position controller,
    wherein the first position controller and the second position controller are independently controlled by the electrical signal measurement system respectively via a first position control signal and a second position control signal.

6. The scanning microwave ellipsometer of claim 1, wherein a shape of the sample comprises a planar surface, a regular three-dimensional surface, or an irregular three-dimensional surface that is subject to the sensor microwave radiation from the sensor.

7. The scanning microwave ellipsometer of claim 1, further comprising the sample.

8. The scanning microwave ellipsometer of claim 1, wherein the sensor comprises a waveguide aperture, a waveguide horn antenna, a waveguide spot-focusing or gaussian-beam antenna, or a combination comprising at least one of the foregoing sensors.

9. The scanning microwave ellipsometer of claim 1, wherein the polarization controller comprises an orthomode transducer, a waveguide rotary joint, or a combination comprising at least one of the foregoing sensors.

10. The scanning microwave ellipsometer of claim 1, wherein the position controller comprises a roller on which the sample is disposed, wherein the roller rotates to move the sample relative to the sensor of the microwave ellipsometry test head.

11. The scanning microwave ellipsometer of claim 1, wherein the position controller comprises a robotic arm on which the sensor is disposed, wherein the robotic arm moves the sensor relative to the sample.

12. The scanning microwave ellipsometer of claim 1, further comprising a microwave ellipsometer calibrant in communication with the sensor from which the scanning microwave ellipsometer is calibrated.

13. The scanning microwave ellipsometer of claim 12, wherein the microwave ellipsometer calibrant comprises a substrate and a plurality of sectors disposed on the substrate, wherein each sector provides a known material and known positional anisotropy of microwave reflection coefficient Γ.

14. The scanning microwave ellipsometer of claim 13, wherein the plurality of sectors comprises:
    a first sector that comprises a first material disposed as first stripes and a second material disposed as second stripes such that the first stripes and the second stripes are alternatingly disposed to provide a first anisotropic sheet resistivity;
    a second sector that comprises a third material disposed as third stripes and a fourth material disposed as fourth stripes such that the third stripes and the fourth stripes are alternatingly disposed to provide a second anisotropic sheet resistivity;

a third sector that comprises a fifth material disposed to provide a first isotropic sheet resistivity; and a fourth sector that comprises a sixth material disposed to provide a second isotropic sheet resistivity.

15. A process for performing scanning microwave ellipsometry with the scanning microwave ellipsometer of claim 1, the process comprising:

receiving, by the polarization controller, the input electrical signal;

producing, by the polarization controller, the polarization-controlled microwave radiation from the input electrical signal;

receiving, by the polarization controller, the reflected microwave radiation resulting from the polarization-controlled microwave radiation;

producing, by the polarization controller, the output electrical signal from the reflected microwave radiation;

receiving, by the transmission line, the polarization-controlled microwave radiation from the polarization controller;

producing, by the transmission line, transmitted microwave radiation from the polarization-controlled microwave radiation;

receiving, by the transmission line, the sensor-received microwave radiation resulting from the transmitted microwave radiation;

producing, by the transmission line, the reflected microwave radiation from the sensor-received microwave radiation;

receiving, by the sensor, the transmitted microwave radiation from the transmission line;

producing, by the sensor, the sensor microwave radiation from the transmitted microwave radiation;

controlling the polarization of the sensor microwave radiation by the polarization controller;

subjecting the sample to the sensor microwave radiation;

receiving, by the sensor, the sample reflected microwave radiation from the sample that results from subjecting the sample with the sample reflected microwave radiation;

producing, by the sensor, the sensor-received microwave radiation from the sample reflected microwave radiation;

producing, by the electrical signal measurement system, the input electrical signal;

communicating, by the electrical signal measurement system, the input electrical signal to the microwave ellipsometry test head;

receiving, by the electrical signal measurement system, the output electrical signal from the microwave ellipsometry test head;

producing, by the electrical signal measurement system, the electrical readout signal from the output electrical signal;

producing, by the electrical signal measurement system, the position control signal;

receiving, by the position controller, the position control signal from the electrical signal measurement system;

adjusting the relative position of the sensor and the sample based on the position control signal; and scanning over the surface of the sample with the sensor microwave radiation from the sensor as the sensor is moved relative to the sample to perform scanning microwave ellipsometry of the sample.

16. The process of claim 15, further comprising determining, from the electrical readout signal, the magnitude of reflection coefficient $\Gamma$ and the angle of reflection coefficient $\Gamma$ of the sample reflected microwave radiation from the sample.

17. The process of claim 15, further comprising adjusting, by the position controller, the relative position by moving the sensor relative to the sample selectively along three orthogonal linear directions and in three independent angular coordinates.

18. The process of claim 15, further comprising:

calibrating the scanning microwave ellipsometer with a microwave ellipsometer calibrant that comprises:

a substrate and a plurality of sectors disposed on the substrate, wherein each sector provides a known material and known positional anisotropy of microwave reflection coefficient $\Gamma$, wherein the plurality of sectors comprises:

a first sector that comprises a first material disposed as first stripes and a second material disposed as second stripes such that the first stripes and the second stripes are alternatingly disposed to provide a first anisotropic sheet resistivity;

a second sector that comprises a third material disposed as third stripes and a fourth material disposed as fourth stripes such that the third stripes and the fourth stripes are alternatingly disposed to provide a second anisotropic sheet resistivity;

a third sector that comprises a fifth material disposed to provide a first isotropic sheet resistivity; and a fourth sector that comprises a sixth material disposed to provide a second isotropic sheet resistivity, by:

scanning the sensor over the sectors over the microwave ellipsometer calibrant as the microwave ellipsometer calibrant is subjected to the sensor microwave radiation;

acquiring the sample reflected microwave radiation from the microwave ellipsometer calibrant; and determining the angle of reflection coefficient $\Gamma$ and the magnitude of reflection coefficient $\Gamma$ for the input electrical signal acquired from the output electrical signal for the sample reflected microwave radiation from the microwave ellipsometer calibrant to produce correction factors to apply to an arbitrary output electrical signal acquired from a sample.

19. A microwave ellipsometer calibrant to calibrate a scanning microwave ellipsometer, the microwave ellipsometer calibrant comprising:

a substrate and a plurality of sectors disposed on the substrate, wherein each sector provides a known material and known positional anisotropy of microwave reflection coefficient $\Gamma$, wherein the plurality of sectors comprises:

a first sector that comprises a first material disposed as first stripes and a second material disposed as second stripes such that the first stripes and the second stripes are alternatingly disposed to provide a first anisotropic sheet resistivity;

a second sector that comprises a third material disposed as third stripes and a fourth material disposed as fourth stripes such that the third stripes and the fourth stripes are alternatingly disposed to provide a second anisotropic sheet resistivity;

a third sector that comprises a fifth material disposed to provide a first isotropic sheet resistivity; and a fourth sector that comprises a sixth material disposed to provide a second isotropic sheet resistivity.

* * * * *